(12) United States Patent
Nohmi

(10) Patent No.: US 10,989,589 B2
(45) Date of Patent: *Apr. 27, 2021

(54) INTERFEROMETRIC VIBRATION OBSERVATION DEVICE, VIBRATION OBSERVATION PROGRAM, RECORDING MEDIUM, VIBRATION OBSERVATION METHOD AND VIBRATION OBSERVATION SYSTEM

(71) Applicant: ALOUETTE TECHNOLOGY INC., Tokyo (JP)

(72) Inventor: Hitoshi Nohmi, Mitaka (JP)

(73) Assignee: ALOUETTE TECHNOLOGY INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/897,431

(22) Filed: Jun. 10, 2020

(65) Prior Publication Data
US 2020/0326230 A1    Oct. 15, 2020

Related U.S. Application Data

(63) Continuation of application No. 15/427,573, filed on Feb. 8, 2017, now Pat. No. 10,718,659, which is a
(Continued)

(30) Foreign Application Priority Data

Aug. 19, 2014    (JP) .................................. 2014-166603
Oct. 3, 2014    (WO) .................. PCT/JP2014/005066

(51) Int. Cl.
  *G01H 17/00*    (2006.01)
  *G01H 9/00*    (2006.01)
(Continued)

(52) U.S. Cl.
  CPC .............. *G01H 17/00* (2013.01); *G01H 9/00* (2013.01); *G01M 5/0066* (2013.01);
(Continued)

(58) Field of Classification Search
  None
  See application file for complete search history.

(56) References Cited

U.S. PATENT DOCUMENTS

| 4,630,051 A | 12/1986 | Adams et al. |
| 8,384,583 B2 | 2/2013 | Leva et al. |

(Continued)

FOREIGN PATENT DOCUMENTS

| JP | 62-502065 A | 8/1987 |
| JP | 4-331328 A | 11/1992 |

(Continued)

OTHER PUBLICATIONS

Hogbom, "Aperture Synthesis with A Non-Regular Distribution of Interferometer Baselines", Astronomy and Astrophysics Supplement, vol. 15, pp. 417-426, 1974.
(Continued)

*Primary Examiner* — Whitney Moore
(74) *Attorney, Agent, or Firm* — Westerman, Hattori, Daniels & Adrian, LLP

(57) ABSTRACT

An interferometric vibration observation device includes a transmitting unit, a receiving unit and a signal processing unit. The transmitting unit transmits a transmission signal toward an observation object. The receiving unit receives a reflection wave from the observation object with a plurality of receiving antennas and generates a reception signal for each of the receiving antennas. The signal processing unit obtains a phase plane of the reflection wave to an antenna plane from a phase difference between the reception signals, identifies an arrival direction and a signal strength of the
(Continued)

reflection wave, calculates a phase variation of the reflection wave from a certain direction, and generates an observation signal representative of displacement of the observation object or a certain site of the observation object.

20 Claims, 39 Drawing Sheets

Related U.S. Application Data continuation-in-part of application No. PCT/JP2015/003859, filed on Jul. 30, 2015.

(51) Int. Cl.
    *G01M 5/00*     (2006.01)
    *G01S 7/06*     (2006.01)
    *G01S 13/36*     (2006.01)

(52) U.S. Cl.
    CPC ............ *G01M 5/0091* (2013.01); *G01S 7/06* (2013.01); *G01S 13/36* (2013.01)

(56) References Cited

U.S. PATENT DOCUMENTS

| | | |
|---|---|---|
| 8,686,362 B2 | 4/2014 | Bakhtiari et al. |
| 2006/0220946 A1 | 10/2006 | Nohmi |
| 2006/0260407 A1 | 11/2006 | Donskoy et al. |
| 2010/0290063 A1 | 11/2010 | Bakhtiari et al. |
| 2013/0139597 A1 | 6/2013 | Lin et al. |
| 2014/0225765 A1 | 8/2014 | Inomata et al. |
| 2015/0226604 A1 | 8/2015 | Mataga et al. |

FOREIGN PATENT DOCUMENTS

| | | |
|---|---|---|
| JP | 10-221159 A | 8/1998 |
| JP | 11-166972 A | 6/1999 |
| JP | 2004-184377 A | 7/2004 |
| JP | 2005-283440 A | 10/2005 |
| JP | 2006-177907 A | 7/2006 |
| JP | 2013-122385 A | 6/2013 |
| JP | 2013-167555 A | 8/2013 |
| WO | 86/05279 A1 | 9/1986 |
| WO | 01/14825 A1 | 3/2001 |
| WO | 2014/051030 A1 | 4/2014 |

OTHER PUBLICATIONS

Kuras et al., "Application of Interferometric Radar to Examination of Engineering Objects Vibration", Faculty of Mining Surveying and Environmental Engineering AGH University of Science and Technology in Krakow, pp. 209-216, Jun. 27, 2015.

Tsolis et al., "Radar Vibrometry: Investigating the Potential of RF microwaves to measure vibrations", University College London, 4 pages, Jun. 27, 2014.

International Search Report dated Dec. 22, 2014 issued in counterpart International Application No. PCT/JP2014/005066 (2 pages).

Written Opinion of International Search Authority dated Nov. 2, 2015 issued in counterpart International Application No. PCT/JP2015/003859 (3 pages).

International Search Report dated Nov. 2, 2015 issued in counterpart International Application No. PCT/JP2015/003859 (1 page).

Written Opinion of International Search Authority dated Dec. 22, 2014 issued in counterpart International Application No. PCT/JP2014/005066 (3 pages).

Notification of Transmittal of Copies of Translation of the International Preliminary Report on Patentability (Form PCT/IB/338) issued in counterpart International Application No. PCT/JP2014/005066 mailed Mar. 2, 2017, with Forms PCT/IB/373 and PCT/ISA/237. (11 pages).

Notification of Transmittal of Copies of Translation of the International Preliminary Report on Patentability (Form PCT/IB/338) issued in counterpart International Application No. PCT/JP2015/003859 mailed Mar. 2, 2017, with Forms PCT/IB/373 and PCT/ISA/237. (11 pages).

Polytec Gmbh: "PSV-500-NB Compact Scanning Vibrometer", Polytec GmbH, Aug. 1, 2013, pp. 1-4; cited in Partial Supplementary European Search Report.

Bakhtiari, S. et al.,"Milllimeter Wave Sensor for Far-Field Standoff Vibrometry", AIP Conference Proceedings, Jan. 1, 2009, pp. 1641-1648; cited in Partial Supplementary European Search Report.

Partial Supplementary European Search Report dated Mar. 1, 2018, issued in counterpart European Application No. 15834032.3. (16 pages).

Office Action dated Mar. 6, 2018, issued in counterpart Japanese Application No. 2016-543800, with partial machine translation. (7 pages).

Extended European Search Report dated Apr. 24, 2019, issued in counterpart EP Application No. 18214747.0. (12 pages).

Office Action dated Jun. 17, 2019 issued in original U.S. Appl. No. 15/427,573 (14 pages).

Office Action dated Dec. 10, 2019 issued in original U.S. Appl. No. 15/427,573 (14 pages).

FIG.25
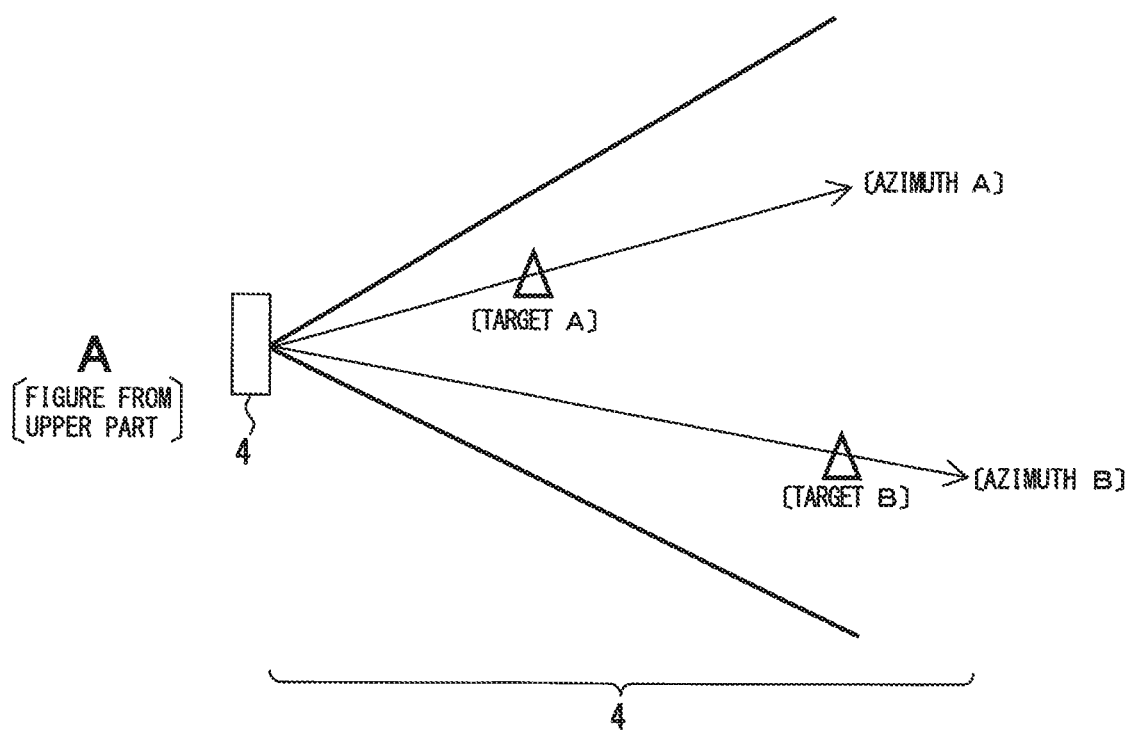
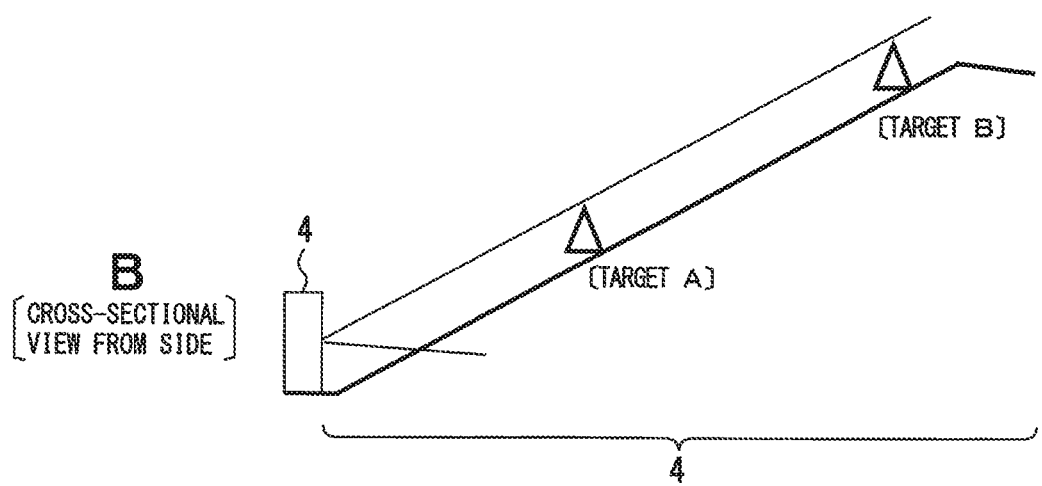

FIG.30
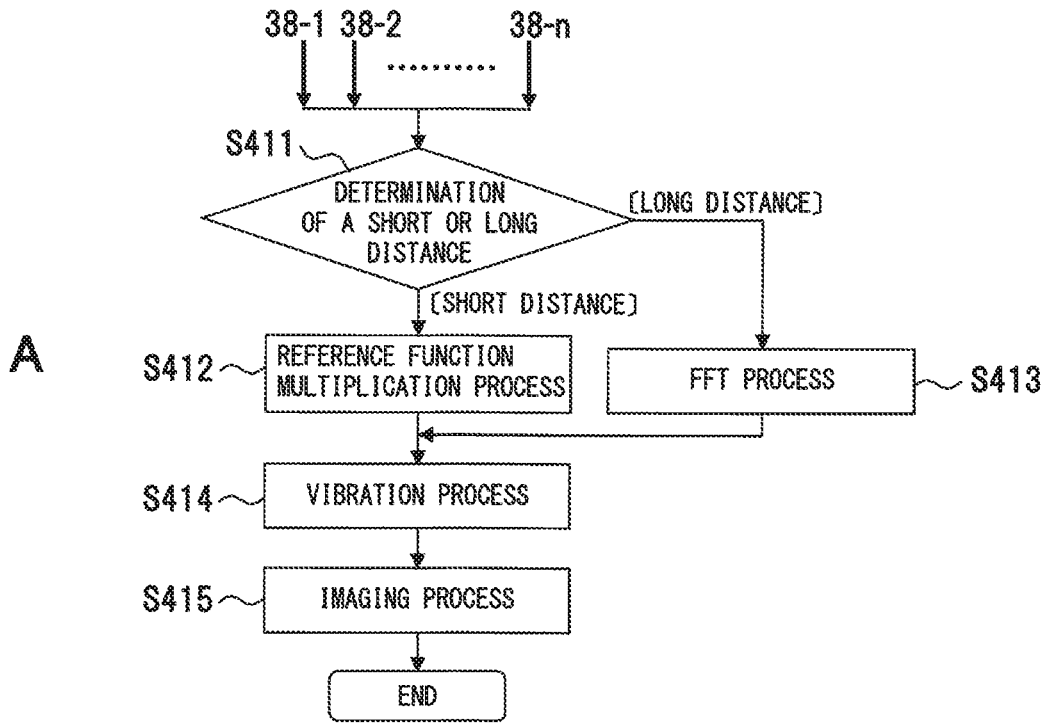
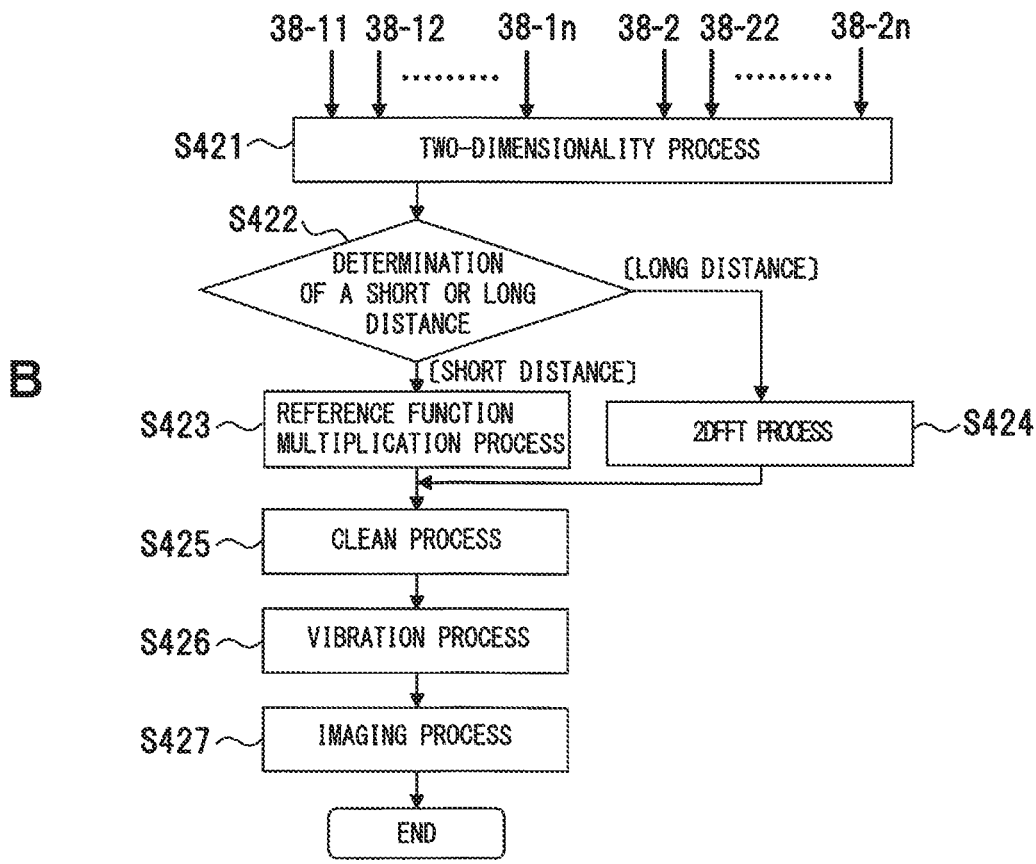

FIG.35
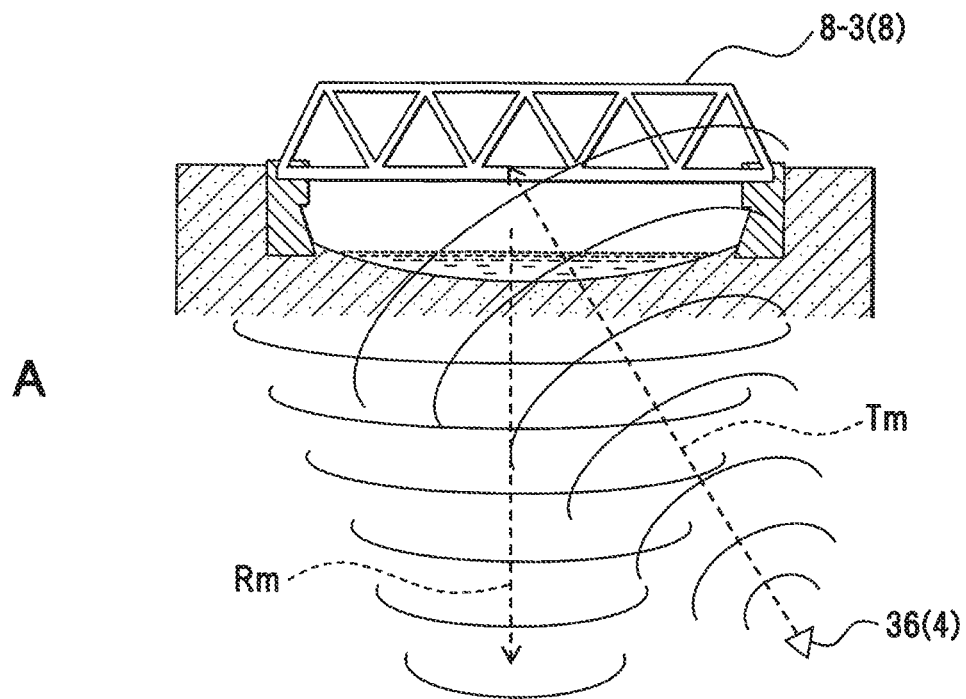
A
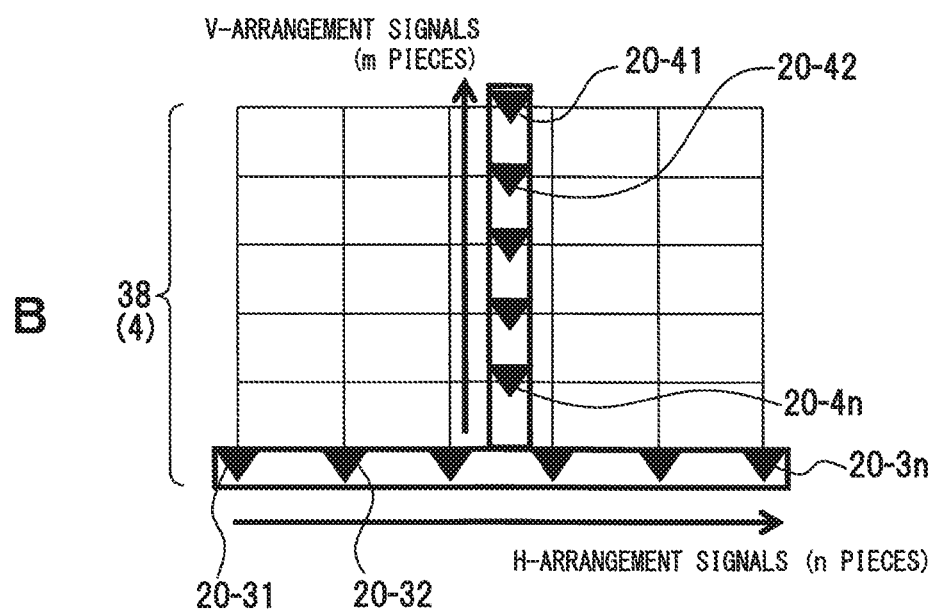
B

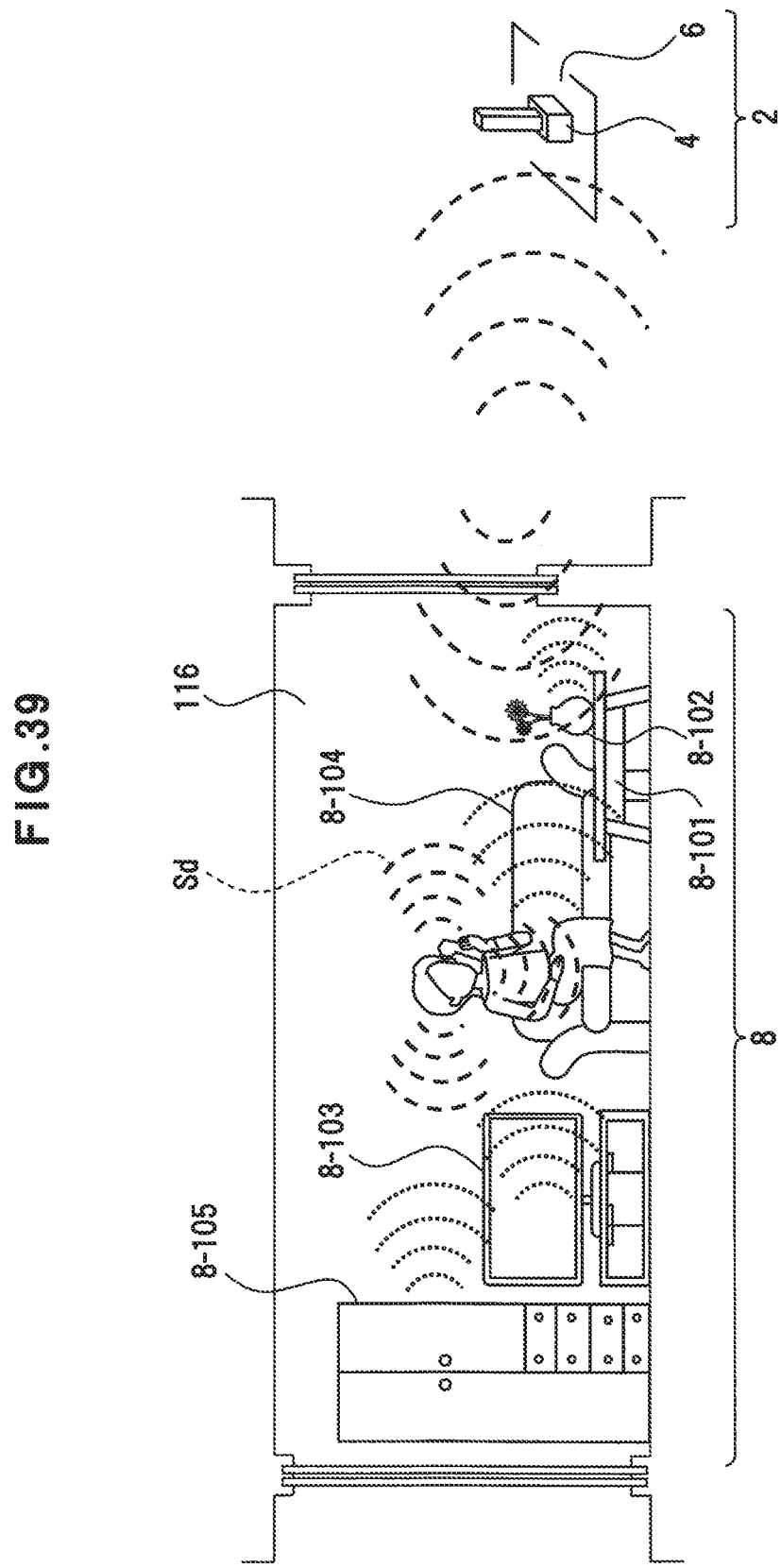

INTERFEROMETRIC VIBRATION OBSERVATION DEVICE, VIBRATION OBSERVATION PROGRAM, RECORDING MEDIUM, VIBRATION OBSERVATION METHOD AND VIBRATION OBSERVATION SYSTEM

CROSS-REFERENCE TO RELATED APPLICATIONS

This application is a continuation application of U.S. application Ser. No. 15/427,573, filed on Feb. 8, 2017, which is a continuation-in-part of International Application No. PCT/JP2015/003859, filed on Jul. 30, 2015, which is entitled to the benefit of priority of Japanese Patent Application No. 2014-166603, filed on Aug. 19, 2014 and International Application No. PCT/JP2014/005066, filed on Oct. 3, 2014, the contents of which are hereby incorporated by reference.

BACKGROUND OF THE INVENTION i) Field of the Invention

The present invention relates to a vibration observation technique to observe a displacement, a minute variation, etc. of a landform or a large construction such as a bridge or an elevated road, for example.

ii) Description of the Related Art

For investigation of strength and aging degradation of structures such as bridges or elevated roads, vibrations applied from actual traffic etc. are observed to analyze the amplitudes of the vibrations, the frequency of the vibrations, etc. To observe vibrations of a large structure, a vibration measurement sensor such as an accelerometer is attached to a certain observation site (target) of the structure. As the number of targets increases, the frequency of vibration measurement sensors increases.

Instead of such direct measurement using a sensor, a remote sensing method using a micro wave signal is known. With this remote sensing method, minute displacement and shaking of a large structure can be measured from a distance of several hundred meters or more by applying a micro wave signal to a construction etc. and analyzing the reflection signal thereof. With this measurement method, if measurement is performed at a frequency equal to or greater than twice the cycle of shaking occurring in a building, a status of displacement and shaking can be analyzed.

With regard to such measurement, it is known to apply a plurality of CW (Continuous Wave: non-modulated continuous wave) signals different in wavelength to a vibrating observation object and analyze a reflection wave thereof so as to highly accurately measure the distance of the object as well as vibration and amplitude (e.g., US Patent Application Publication No. 2013/0139597 and U.S. Pat. No. 8,686, 362). In this method, the vibration and the strength thereof are merely measured at a certain point of the observation object.

For observation of a minute displacement of a three-dimensionally spreading observation object such as a landslide and a dam body, a system using a ground-based synthetic aperture radar (GB-SAR) is known (e.g., U.S. Pat. No. 8,384,583). This system applies a radio wave to an observation object while moving a transmitting/receiving unit of a synthetic aperture radar so as to measure a reflection wave from the observation object, identifies an observation object point two-dimensionally in terms of direction and distance through a synthetic aperture process using a phase change of a signal received at a scanning point on a rail, and detects a distance change in a slant range direction of the observation object from a change in phase value of the observation object acquired from each scan.

It is known to take a three-dimensional image of a target by using a radar (e.g., Japanese Laid-Open Patent Publication No. 2006-177907 and Japanese Laid-Open Patent Publication No. 62-502065). In this three-dimensional image process, antennas and receiving units are two-dimensionally spread out to determine a target direction from a phase relationship of reflection waves received by the receiving antennas and to obtain a distance from a propagation time of the reflection waves. The speed information of the target is measured from a Doppler shift applied to the reflection waves. This method is not capable of vibration measurement of a substantially stationary object such as a structure.

With regard to measurement techniques as described above, Non-Patent Literatures 1, 2, and 3 are known. The Non-Patent Literature 1 is Kuras P. and two others, "APPLICATION OF INTERFEROMETRIC RADAR TO EXAMINATION OF ENGINEERING OBJECTS VIBRATION", [online], Faculty of Mining Surveying and Environmental Engineering AGH University of Science and Technology in Krakow, [retrieved on Jun. 27, 2014], Internet <URL: http://yadda.icm.edu.pl/yadda/element/bwmetal.element.baztech-article-PWAB-0005-0004/c/httpwww_rog_gik_pw_edu_plphocadownloadnr8724.pdf>. The Non-Patent Literature 2 is K A Tsolis and one other, "Radar Vibrometry: Investigating the Potential of RF microwaves to measure vibrations", [online], University College London, [retrieved on Jun. 27, 2014], Internet <URL: http://www.ee.ucl.ac.uk/lcs/previous/LCS2004/34.pdf>. The Non-Patent Literature 3 is J. A. HOGBOM, "Aperture synthesis with a non-regular distribution of interferometer baselines", Astronomy and Astrophysics Supplement, Vol. 15, 1974, p. 417.

BRIEF SUMMARY OF THE INVENTION

In the remote sensing of minute vibrations of an observation object described above, observation points are separated and identified based on distance, and the vibrations and the strength thereof at a certain point are measured. To measure vibrations at multiple points at the same time, radar reflectors are attached to an observation object for identification of locations, and respective reflection points are identified through reflection strength and distance. An observation form as described above has a problem that when the observation object has a two- or three-dimensional spread, minute vibrations at arbitrary points in the whole observation object cannot be measured at the same time.

Additionally, in the case of a huge observation object, attaching the reflectors to multiple observation positions is dangerous, and moreover, an influence of a weather condition etc. cannot be disregarded, resulting in a problem that stationary measurement is accompanied by difficulties.

By using a flying mobile object such as a helicopter as a platform, even a huge observation object can be observed and the restriction on observation objects can be reduced. However, the observation from the platform is subjected to a vibration from the mobile object used as the platform and has a problem that this vibration disturbs the vibration observation.

In view of the problems described above, it is therefore a first object of an aspect of the present invention to observe a vibration of a two- or three-dimensionally spreading observation object such as a bridge and an elevated road and to visualize a result of the observation.

In view of the problems described above, it is a second object of an aspect of the present invention to observe a vibration of a two- or three-dimensionally spreading observation object such as a bridge and an elevated road by using a vibrating and shaking platform and to visualize a result of the observation.

An aspect of an interferometric vibration observation device of the present invention may include a transmitting means transmitting a transmission signal from a transmitting antenna toward an observation object; a receiving means receiving a reflection wave from the observation object with a plurality of receiving antennas and generating a reception signal for each of the receiving antennas; and a signal processing means obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of a vibration of the observation object or a certain site of the observation object.

An aspect of a recording medium of the present invention provides a computer-readable recording medium recording a vibration observation program for driving a computer to observe a vibration or a displacement of an observation object, and the computer may be driven to execute the processes of transmitting a transmission signal from a transmitting antenna toward an observation object; receiving a reflection wave from the observation object with a plurality of receiving antennas and generating a reception signal for each of the receiving antennas; and obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of a vibration of the observation object or a certain site of the observation object.

An aspect of a vibration observation method of the present invention may include transmitting a transmission signal from a transmitting antenna toward an observation object; receiving a reflection wave from the observation object with a plurality of receiving antennas and generating a reception signal for each of the receiving antennas; and obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of a vibration of the observation object or a certain site of the observation object.

An aspect of an interferometric vibration observation device of the present invention may include a processing means mounted on a vibrating or shaking platform, the processing means generating an image from observation data representative of a vibration of an observation object or a certain site of the observation object, determining a fixed point from the image, calculating a vibration of the platform from vibration analysis of the fixed point, and removing the vibration from the observation data.

An aspect of a recording medium of the present invention provides a computer-readable recording medium recording a vibration observation program for driving a computer to observe a vibration or a displacement of an observation object, and the computer may be driven to execute the processes of transmitting a transmission signal toward an observation object from a transmitting antenna mounted on a vibrating or shaking platform; receiving a reflection wave from the observation object with a plurality of receiving antennas mounted on the platform and generating a reception signal for each of the receiving antennas; obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of a vibration of the observation object or a certain site of the observation object; determining a fixed point from the image acquired from the observation data; and calculating a vibration of the platform from vibration analysis of the fixed point, and removing the vibration from the observation data.

An aspect of a vibration observation method of the present invention may include transmitting a transmission signal toward an observation object from a transmitting antenna mounted on a vibrating or shaking platform; receiving a reflection wave from the observation object with a plurality of receiving antennas mounted on the platform and generating a reception signal for each of the receiving antennas; obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of a vibration of the observation object or a certain site of the observation object; determining a fixed point from the image acquired from the observation data; and calculating a vibration of the platform from vibration analysis of the fixed point, and removing the vibration from the observation data.

An aspect of a vibration observation system of the present invention may include a vibrating or shaking platform; and a vibration observation device mounted on the platform, the vibration observation device generating an image by acquiring observation data representative of a vibration and a shaking of an observation object or a certain site of the observation object, determining a fixed point from the image, calculating a vibration and a shaking of the platform from vibration analysis of the fixed point, and removing the vibration from the observation data.

Other objects, characteristics, and advantages of the present invention will become more apparent with reference to the accompanying drawings and embodiments.

BRIEF DESCRIPTION OF DRAWINGS

FIG. 25 is a diagram of an arrangement relationship between an observation device and targets to be observed.

FIG. 30 is a flowchart of a signal process of the signal processing unit.

FIG. 35 is a diagram of an example of a vibration observation according to a sixth embodiment.

FIG. 39 is a diagram of an application example of an interferometric vibration observation device according to a seventh embodiment.

DETAILED DESCRIPTION OF THE INVENTION

First Embodiment

Figure 1:
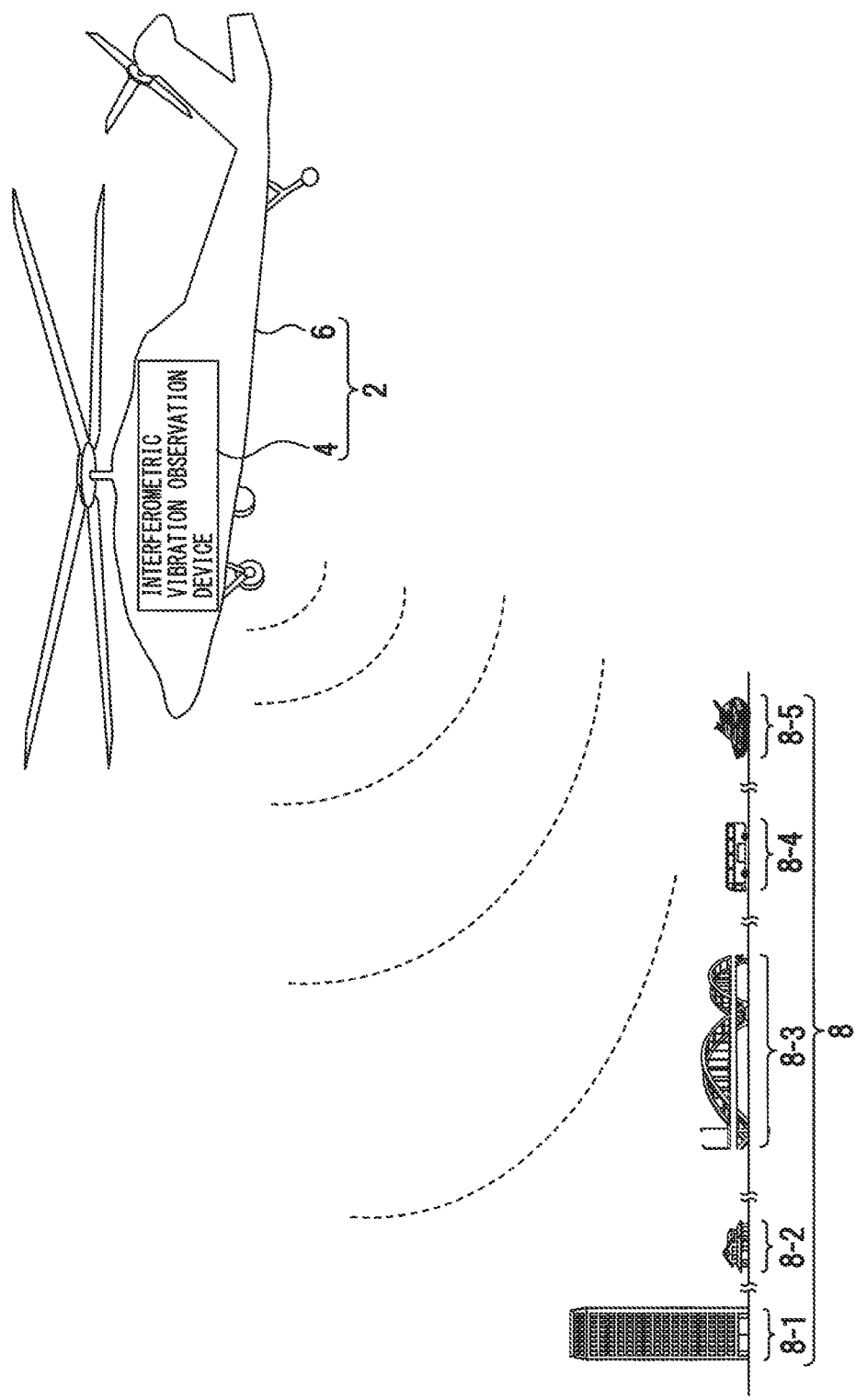
FIG. 1 is a diagram of a vibration observation system according to a first embodiment.

FIG. 1 shows an example of a vibration observation system according to a first embodiment. The shown configuration is an example and the present invention is not limited to this configuration.

This vibration observation system 2 includes an interferometric vibration observation device (hereinafter simpler referred to as the "observation device") 4 and, in FIG. 1, the observation device 4 is mounted on a platform 6. The platform 6 is, for example, a vibrating and shaking mobile object such as a helicopter. Therefore, this vibration observation system 2 is configured as a system observing a vibration of an observation object 8 from the vibrating and shaking platform 6 by using the observation device 4.

The observation device 4 has such functions as acquiring observation data representative of a vibration of an observation object or a certain site thereof through the medium of a radio wave Fw so as to generate an image, determining a fixed point from the image, calculating the vibration and shaking of the platform 6 from vibration analysis of the fixed point, and removing the vibration and shaking from the observation data. In the case of the vibration measurement from the vibrating and shaking platform 6, the vibration and shaking of the platform 6 are added to the observation data and, therefore, the vibration and shaking are calculated to remove the vibration and shaking of the platform 6 from the observation data so as to avoid the influence of the vibration and shaking of the platform 6.

The platform 6 equipped with the observation device 4 may be any means allowing the observation device 4 to face the observation object 8 from the sky, for example, and is not limited to the helicopter described above. The platform 6 may be a mobile object or a flying object such as a drone or an airplane.

The observation object 8 may be any of structures such as a high-rise building 8-1, a house 8-2, a bridge 8-3, or a dam and mobile objects such as an automobile 8-4 or a tank 8-5, and may be any object that can be looked down from the platform 6 such as a helicopter, for example.

Figure 2:
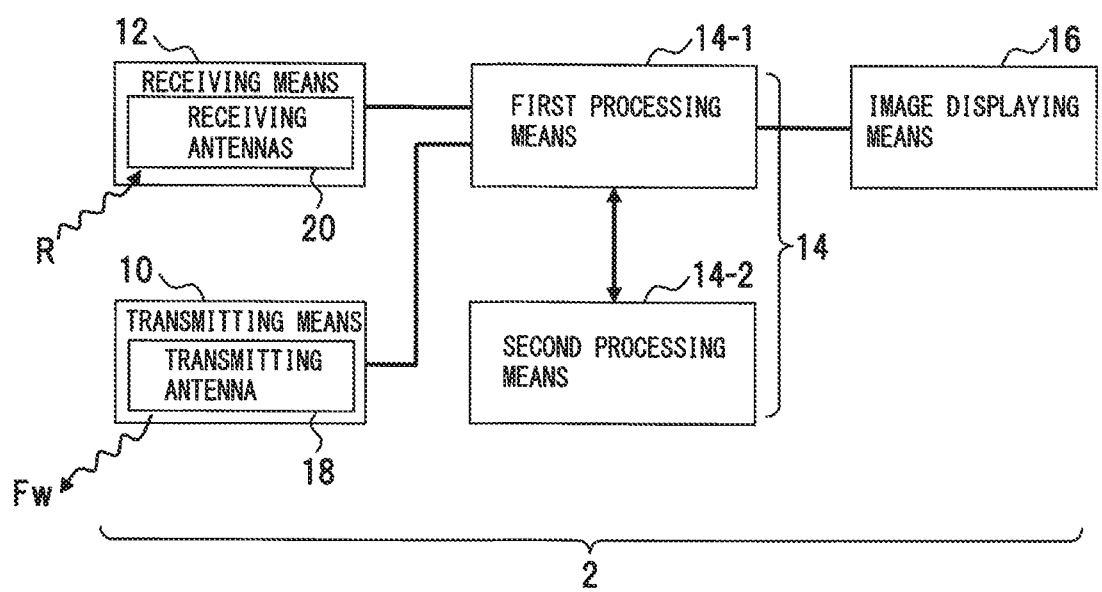
FIG. 2 is a diagram of an example of an interferometric vibration observation device.

FIG. 2 shows an example of the observation device 4. This observation device 4 includes a transmitting means 10, a receiving means 12, a signal processing means 14, and an image displaying means 16.

The transmitting means 10 includes at least one transmitting antenna 18 and transmits the radio wave Fw serving as a transmission signal toward the observation object 8. The transmitting means 10 may include a transmitting unit, e.g., transmitter, and the transmitting antenna 18.

The receiving means 12 includes a plurality of receiving antennas 20 and receives a reflection wave R from the observation object 8 to generate a reception signal for each of the receiving antennas 20. The receiving means 12 may include a receiving unit, e.g., receiver, and a plurality of receiving antennas 20.

The signal processing means 14 is an example of a processing means. This signal processing means 14 generates a transmission signal and processes a reception signal of the receiving means 12 to generate observation data. This signal processing means 14 includes a first processing means 14-1 and a second processing means 14-2. The signal processing means 14 may be a signal processing unit or a processor.

The processing means 14-1 calculates a phase plane of a reflection wave to an antenna plane from a phase difference between the reception signals to identify an arrival direction and a signal strength of the reflection wave, calculates a phase variation of the reflection wave from a certain direction, and generates observation data representative of the vibration of the observation object 8 or a certain site thereof. As a result, the image displaying means 16 generates an image from the observation data acquired by the processing means 14-1 and displays the image. The image displaying means 16 may be an image displaying unit, or an image display function or a display of a personal computer.

The processing means 14-2 determines a fixed point from an image, calculates a vibration and a shaking of a platform such as the helicopter 6 from vibration analysis of this fixed point, and removes the vibration from the observation data. As a result, the image acquired by the image displaying means 16 is corrected to an image acquired by removing the vibration and shaking of the platform from the observation data acquired by the processing means 14-1.

Figure 3:
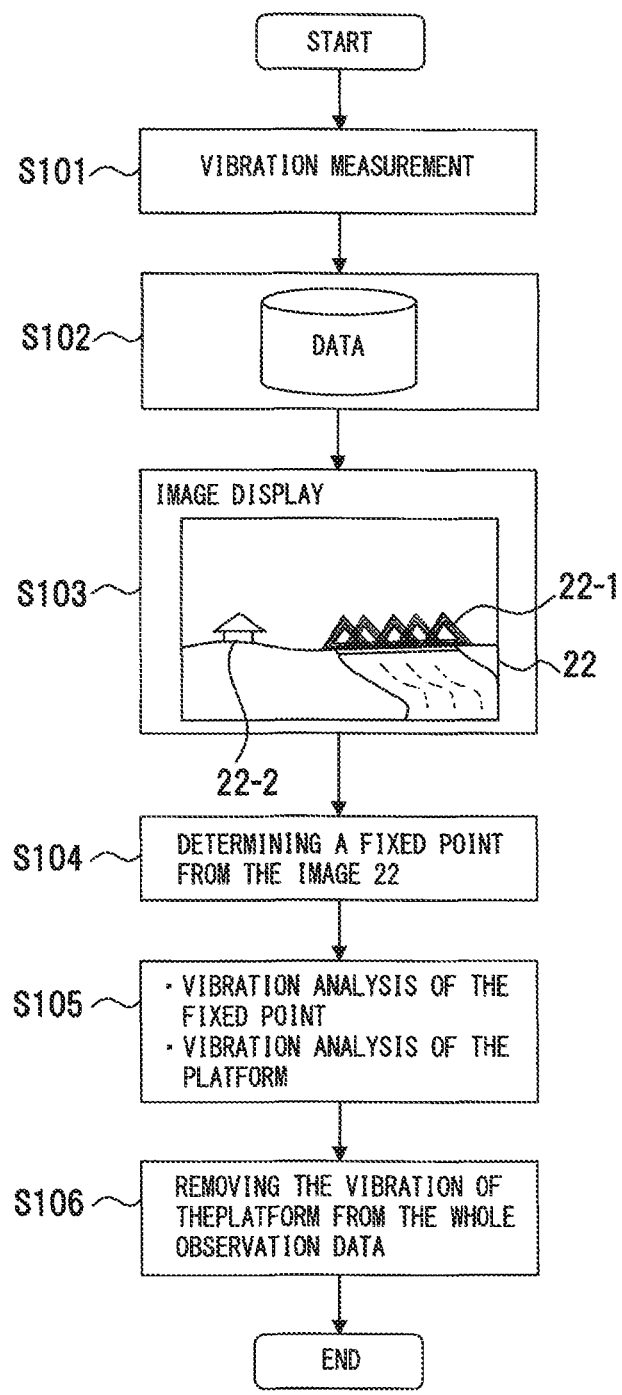
FIG. 3 is a flowchart of a process procedure of vibration observation.

FIG. 3 shows a process procedure of vibration observation. This process procedure is an example of a vibration observation method or a vibration observation program of the present invention.

In this process procedure, a vibration is measured by using the observation device 4 (S101) to generate observation data (S102). This observation data is used for displaying an image 22 on the image displaying means 16 (S103). This image 22 represents an observation object area.

From this image 22 of the observation object area, a fixed point is determined (S104). This fixed point may be selected from the image 22 by using a site or a fixed object other than the observation object 8 as a target. An object vibrating in a sufficiently long cycle as compared to the vibrations of the observation object 8 and the platform 6 can be considered as a fixed object. For example, when the image 22 includes a bridge image 22-1, a building image 22-2, etc., and the bridge image 22-1 is assumed as an observation object, the building image 22-2 is not the observation object and is supposed to have sufficiently small vibration as compared to the bridge image 22-1, and therefore may serve as a target of a fixed point P.

Subsequently, multiple pieces of fixed point data are analyzed. Fixed point data not correlated with another fixed point data is possibly vibrating and can be removed from the fixed point data to improve data accuracy.

The vibration analysis of the determined fixed point P is performed to determine the vibration of the platform 6 from this vibration analysis (S106).

The vibration of the platform 6 is removed from the whole observation data (S107). The image 22 may be corrected by using the observation data acquired by removing the vibration of the platform 6.

Figure 4:
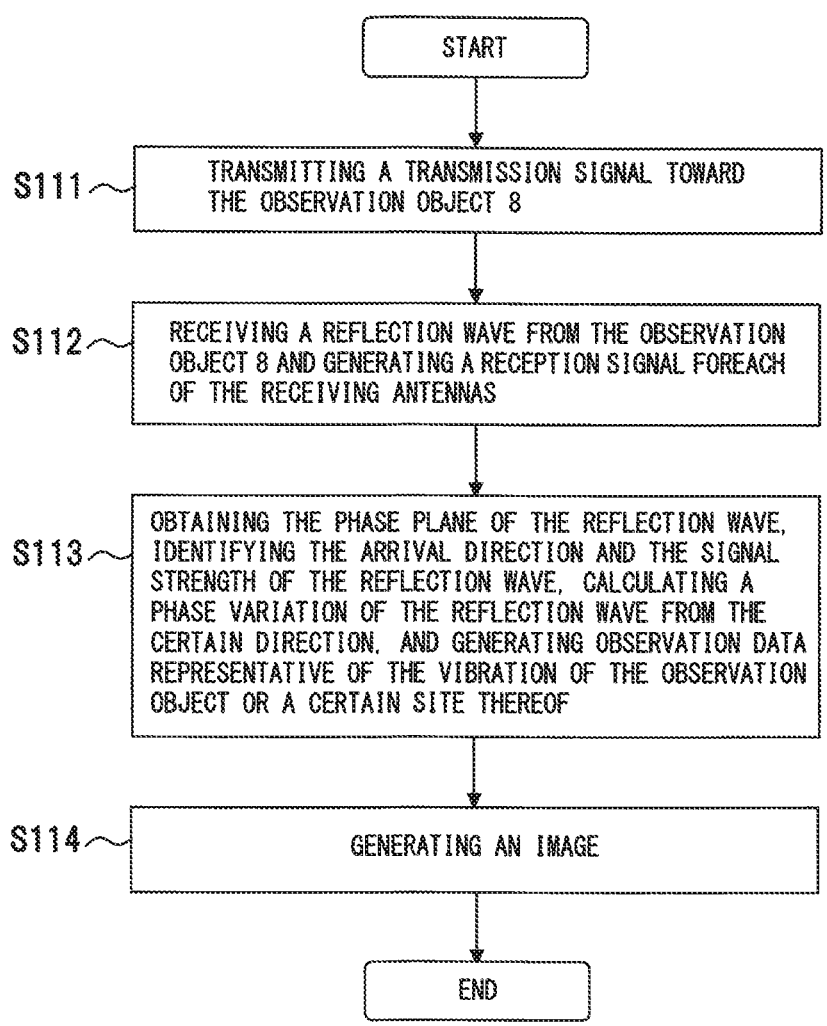
FIG. 4 is a flowchart of a process procedure of observation data image generation.

FIG. 4 shows a process procedure of observation data image generation. This process procedure includes a specific process procedure from the vibration measurement (S101) to the image display (S103) of the processing means 14-1. In this process procedure, when the vibration measurement is started, a transmission signal is transmitted toward the observation object 8 (S111). A reflection wave from the observation object 8 is received and a reception signal is generated for each of the receiving antennas (S112).

The phase plane of the reflection wave is obtained, the arrival direction and the signal strength of the reflection wave are identified, a phase variation of the reflection wave from the certain direction is calculated, and observation data representative of the vibration of the observation object or a certain site thereof is generated (S113). An image is generated from the observation data (S114).

Figure 5:
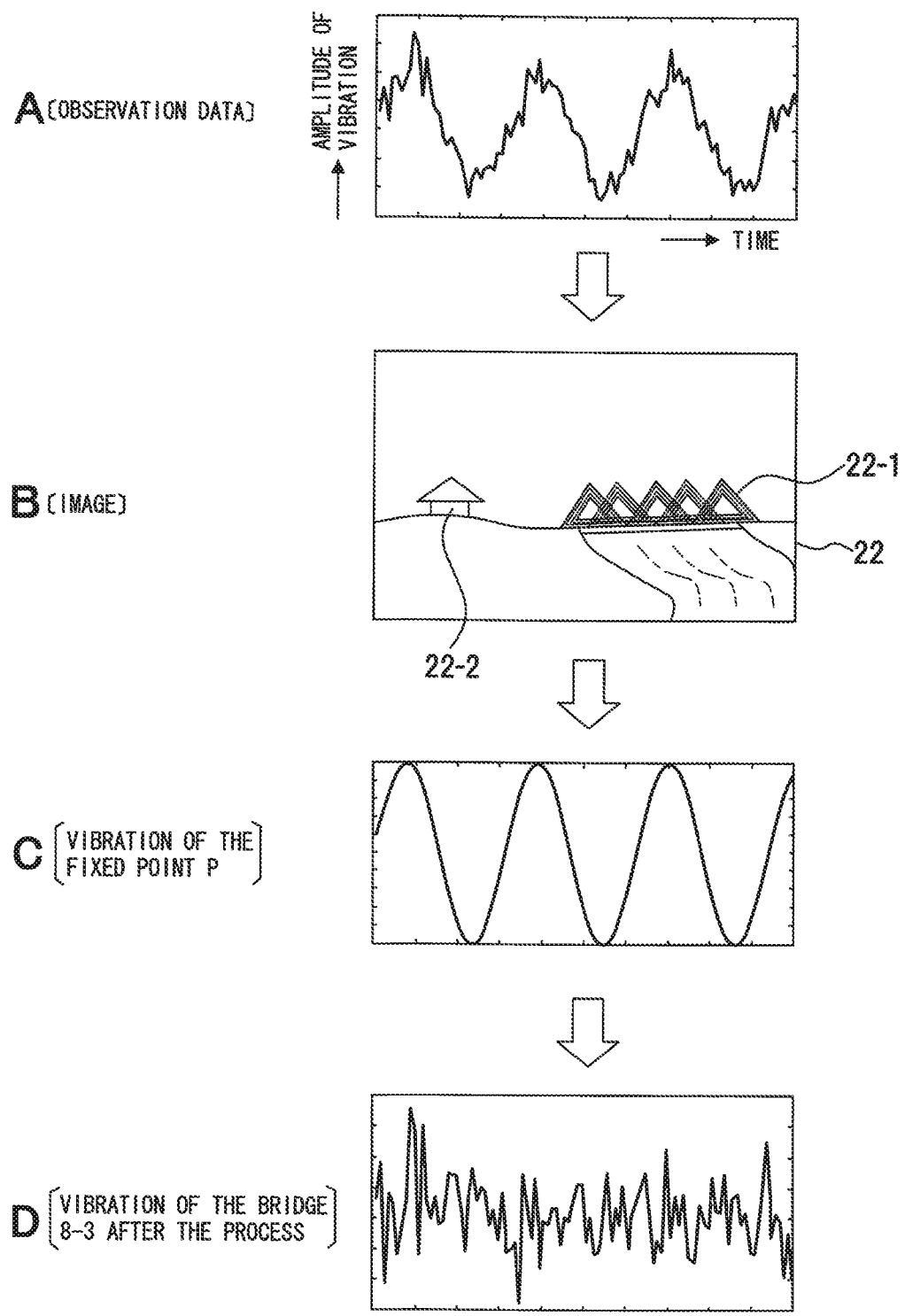
FIG. 5 is a diagram of observation data, an image, a fixed point, and processed observation data.

FIG. 5 shows observation data, an image, a fixed point, and processed observation data. In A, C, and D of FIG. 5, the horizontal axis indicates time and the vertical axis indicates amplitude of vibration.

According to the observation device 4, observation data shown in A of FIG. 5 is acquired by the processing means 14-1. Because of the influence of the vibration of the platform 6, this observation data includes the vibration of the platform 6.

From this observation data, the image 22 is acquired as shown in B of FIG. 5, for example. As described above, the image 22 represents an observation area and includes the bridge image 22-1 and the building image 22-2 in this example.

Assuming that the observation object is the bridge 8-3, the bridge image 22-1 representative of the bridge 8-3 has the vibration of the platform 6 superimposed thereon.

The fixed point P is determined from this image 22 and, by way of example, the building image 22-2 is set as the fixed point P. C of FIG. 5 shows the vibration of the fixed point P. The vibration of the fixed point P is analyzed to determine the vibration and shaking of the platform 6. The vibration of the fixed point P can be considered as the vibration and shaking of the platform 6.

As a result of a process of removing the vibration of the platform 6 form the observation data, the observation data with the influence of the vibration and shaking of the platform 6 removed is acquired.

After the vibration and shaking are removed from the observation data, the vibration of the bridge 8-3 after the process is acquired as shown in D of FIG. 5.

<Vibration Measurement and Vibration Correction of Platform 6 (Mobile Object)>

Figure 6:
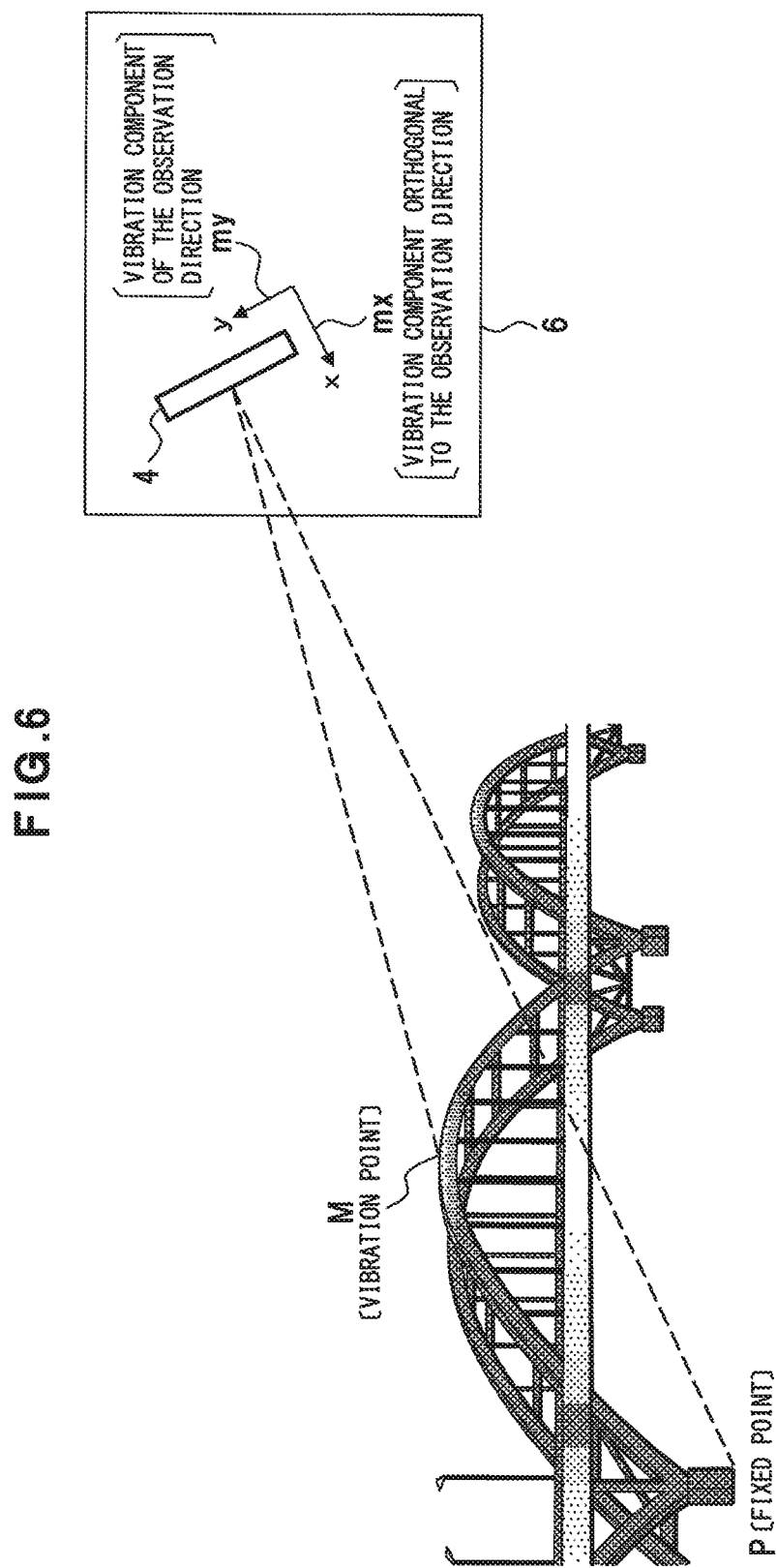
FIG. 6 is a diagram of a relationship between an observation object and the interferometric vibration observation device on a platform.

FIG. 6 shows a relationship between an observation object and the interferometric vibration observation device on the platform.

With regard to the observation device 4, x- and y-axes indicate an observation direction and a direction orthogonal to the observation direction, respectively. Additionally, mx and my indicate a vibration component in the observation direction and a vibration component in the direction orthogonal to the observation direction, respectively.

The observation object 8 is the bridge 8-3, for example. In this case, a vibration point M exists at a beam portion of the bridge 8-3, and a fixed point P exists at a bridge girder portion. A vibration strength is displayed on the bridge 8-3 with gradation in accordance with a vibration strength scale 24. The vibration point M is a site with a largest vibration and the fixed point P is a site with a smallest vibration.

It is assumed that during an observation period, a movement amount of the platform 6 due to the vibration is sufficiently small as compared to an observation distance from the platform 6 to the observation object 8 (target). The vibration of the platform 6 can be divided into an observation-direction component mx and an orthogonal-direction component my orthogonal to the component mx in the observation direction. The vibration of the orthogonal-direction component my has no influence on change in distance to the observation object 8. Therefore, the vibration does not affect the phase of the observation image.

Since the observation direction component mx of the vibration generates a change in distance between the observation device 4 and the observation object 8, the phase of the reflection wave from the fixed point P changes and the vibration thereof is observed.

The observation device 4 acquires the image 22, and three-dimensional and four-dimensional images are acquired for this image 22 from the function of the observation device 4. An image signal used for generating the image 22 can be recorded as a complex signal indicative of a reflection strength and a phase of a reflection point of the observation object 8.

Figure 7:
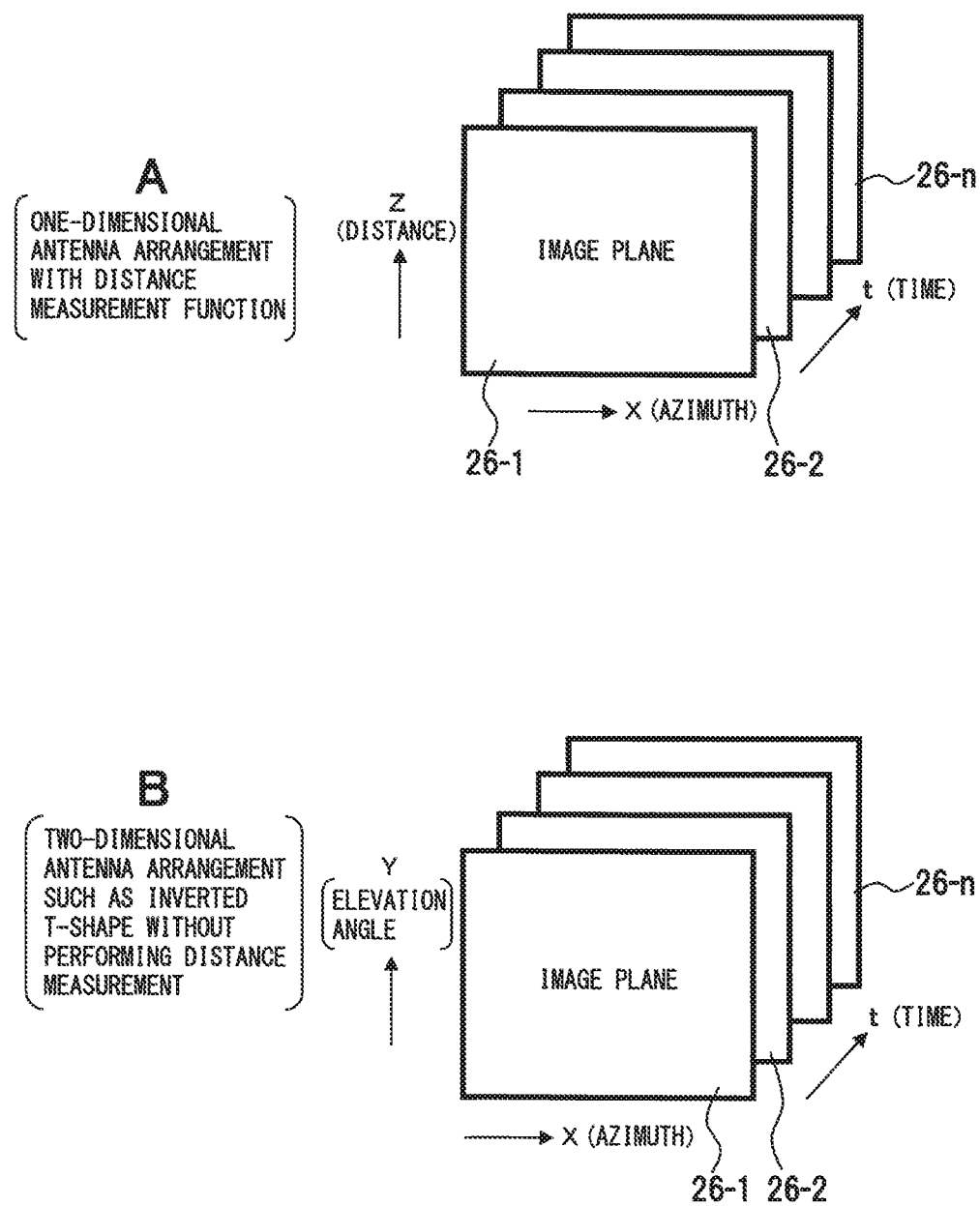
FIG. 7 is a diagram of a three-dimensional output image.

A and B of FIG. 7 show three-dimensional output images.

As shown in A of FIG. 7, output images acquired from one-dimensional antenna arrangement with a distance measurement function can represent a distance on a vertical axis (z), an azimuth on a horizontal axis (x), and a time axis (t) in depth. The time axis indicates time. A plurality of image planes 26-1, 26-2 . . . 26-n is formed on the time axis.

As shown in B of FIG. 7, in the case of two-dimensional antenna arrangement such as a lattice shape, an inverted T-shape, an L-shape, or an inverted T-shape without performing distance measurement representative of a distance such as using a CW signal, the acquired output images can represent an elevation angle on a vertical axis (y), an azimuth on a horizontal axis (x), and a time axis (t) in depth. Similarly, a plurality of the image planes 26-1, 26-2 . . . 26-n is formed on the time axis (t).

Figure 8:
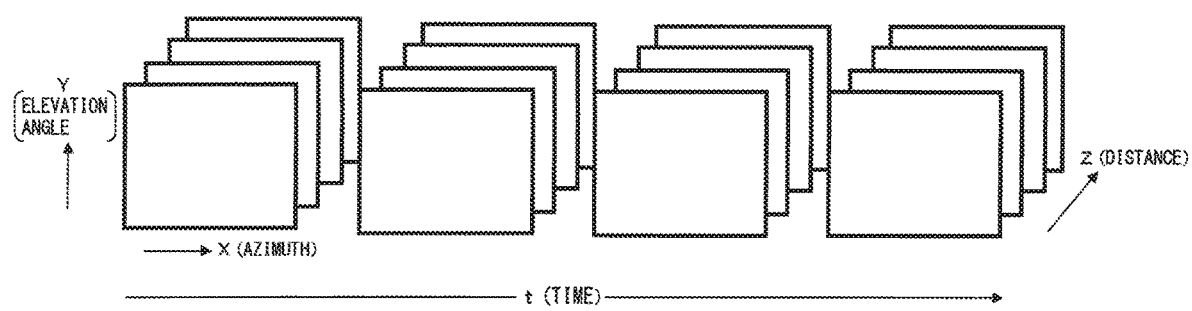
FIG. 8 is a diagram of a four-dimensional output image.

FIG. 8 shows four-dimensional output images. This output form represents output images of two-dimensional antenna arrangement performing distance measurement representative of a distance by using a pulse or an FMCW signal as a transmission signal. A value f of each pixel is represented by an elevation angle on a vertical axis (y), an azimuth on a horizontal axis (x), a distance (z) in depth, and time (t), as f(x,y,z,t).

Regardless of the image format, φ(t) is a phase of a signal at a position (x,y,z) of the fixed point P of the observation object 8.

When R(t) is a displacement in the observation direction of the platform 6 equipped with the observation device 4, λ is a wavelength of a transmission wave of the observation device 4, and R is a distance from the observation device 4 to the fixed point P of the observation object 8, the phase φ(t) of the fixed point P is represented by the following equation.

[Math. 1]
$$\phi(t) = 2\pi \cdot \frac{2(R + \Delta R(t))}{\lambda} \quad (1)$$

when the image signal is f(x,y,z,t) and a correction of removing the vibration of the platform 6 is made to this image signal f(x,y,z,t), g(x,y,z,t) denoting the image signal after the vibration correction can be represented by using a phase signal extracted from the observation signal of the fixed point P as follows.

$$g(x,y,z,t) = f(x,y,z,t) \cdot \exp\{-j\phi(t)\} \quad \text{[Math. 2]}$$

From this arithmetic operation, an image with the vibration of the platform 6 removed can be acquired. In other words, a first image acquired from the image signal f(x,y,z,t) is corrected to a second image by removing the vibration of the platform 6.

A vibration A(t) of the observation object 8 at a position (X1,Y1,Z1) can be obtained by using Eq. (4) from a change in phase data of a time-series image signal g(X1,Y1,Z1,t) at the point obtained from Eq. (3). From this arithmetic operation, an image with the vibration of the platform 6 removed is acquired.

In this case, sine a radar performs measurement in a round trip distance, a variation of a half wavelength corresponds to a 2π phase rotation.

[Math. 3]
$$\phi(t) = \arg(g(X1, Y1, Z1, t)) \quad (3)$$

$$A(t) = \left(\frac{\lambda}{(2 \cdot 2\pi)}\right) \cdot \text{unwrap}(\phi(t)) \quad (4)$$

where arg is a function for obtaining an argument of complex data and unwrap is a function for unwrapping of a phase angle.

<Example of Image Process>

Figure 9:
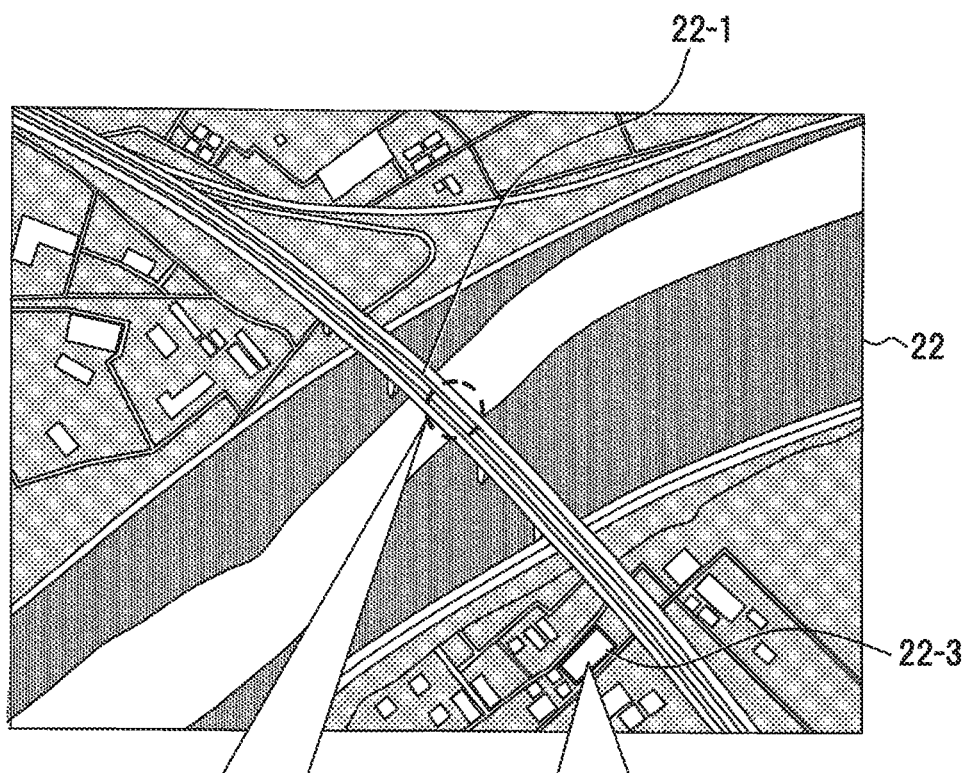
FIG. 9 is a diagram of an example of an image generated from observation data and vibration removal from the image.

FIG. 9 shows an example of an image generated from observation data and vibration removal from the image. The image 22 is an image acquired by the observation device 4 mounted on the platform 6.

This image 22 includes the bridge image 22-1 acquired from the bridge 8-3 that is the observation object 8, and the high-rise building image 22-3 that is the other observation object 8.

In the vibration observation of the bridge 8-3, for example, the frequency of vibrations of the bridge girder portion of the bridge 8-3 may be defined as the vibration of the platform 6 and subtracted from the observation data (vibration data) of the bridge 8-3.

In the vibration observation of the high-rise building 8-1, for example, the frequency of vibrations of a lower portion of the high-rise building 8-1 may be defined as the vibration of the platform 6 and subtracted from the observation data (vibration data) of the high-rise building 8-1.

In this way, a target is identified that can be considered as a stationary object near the observation object 8 on the observation image, and an observation result (vibration) of this point represents the vibration of the platform 6 equipped with the observation device 4.

A vibration value acquired from a fixed object can be subtracted from the observation data of the observation object 8 so as to acquire the observation data (the frequency of vibrations) of the observation object 8 not affected by the vibration of the platform 6.

Effects of First Embodiment

According to the first embodiment, the following effects are acquired.

(1) A mobile object such as a helicopter and a balloon can be used as the platform 6 to observe the vibration of the observation object 8. The observation device 4 has a higher degree of freedom of vibration observation as compared to the observation when the device 4 is installed on the stable ground. The radio wave emitted from the transmitting antenna 18 is reflected by the observation object 8 and received by the receiving means 12 of the observation device 4. From transmitted/received signal phases, the distance to the observation object 8 can highly frequently and precisely be measured to observe the vibration of the observation object 8.

(2) The observation area can be displayed and recorded as a radar image, for example. A target representative of each of the observation objects 8 in the radar image can be identified three-dimensionally in terms of azimuth, elevation, and distance, and a time change in minute distance can be recorded as vibration.

(3) Since the observation device 4 is mounted on the platform 6 that is a mobile object such as a helicopter and a balloon, the vibration of the observation object 8 can continuously be observed while the platform 6 is flying and moving. As a result, the vibration of the observation object 8 can be observed in a mountainous region where it is difficult to install the observation device 4, on the sea, or from the sky, and the vibration observation range can be dramatically expanded.

(4) When the mobile object such as the helicopter is used as the platform 6 and the observation device 4 is mounted on the platform 6, the observation is affected by the vibration and shaking of the platform 6 and a fixed object on the observation object 8 side, for example, on the ground, is observed as if the object is vibrating. Since this vibration is the vibration of the platform 6, this vibration can be measured and removed from the observation data so as to observe the vibration of the observation object 8. For the fixed object enabling the identification of the vibration of the platform 6, a target may be selected that serves as some kind of the fixed point P in the observation area where the observation object 8 is present.

(5) In this vibration observation, it is desirable to observe points that can be considered as fixed points as much as possible. By correlating such a large number of fixed point data, a point with a low correlation value may be considered as having a possibility, or a high possibility, of vibrating and may be excluded. As a result, the observation accuracy of the observation data can be improved.

(6) The fixed point P differs depending on the observation object 8. An object vibrating in a cycle equal to or greater than 100 times the vibration of the observation object 8 or the platform 6 equipped with the observation device 4 can be considered as the fixed object. For example, structures such as an iron bridge, an elevated bridge, and an elevated road have vibrations of several [Hz] to several dozen [Hz]. In this case, reinforced concrete buildings etc. are supposed to have vibrations of 0.1 [Hz] or less and can be considered as the fixed objects.

(7) By analyzing the vibration characteristics, the observation object 8 can be identified. For measurement of engine and screw vibrations of a vessel, a portion of the same vessel associated with a smaller vibration can be utilized as a stable point. Characteristics of a vessel can be identified. However, in the case of observation of a minute displacement of a land slide, a crustal change, and a large construction such as a dam, it is difficult to observe a vibration unless a stable point with a lower vibration can be ensured.

(8) The observation object 8 can be selected from various objects including those subtly vibrating due to wind etc., such as a high building, those not vibrating due to wind etc., such as a residential house, bridges vibrating due to passing vehicles, those vibrating due to engine vibration and running such as a bus and a tank, and those not vibrating such as a bridge girder, a ground surface, and a road.

Second Embodiment

Figure 10:
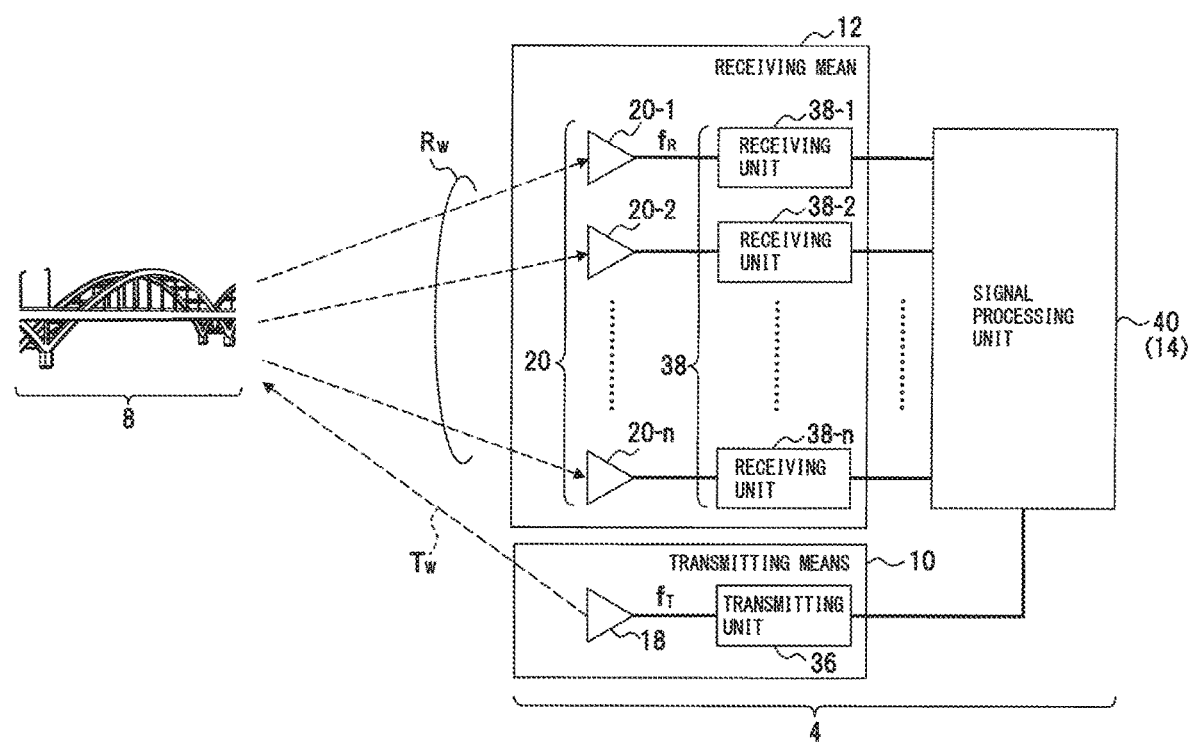
FIG. 10 is a diagram of an interferometric vibration observation device according to a second embodiment.

FIG. 10 shows the observation device 4 according to a second embodiment. The configuration shown in FIG. 10 is an example and the present invention is not limited to this configuration.

This observation device 4 is used for observation of vibration generated in the observation object 8 such as a bridge or a certain observation site (target) therefor. This vibration observation includes observation of continuous vibrations, irregular vibrations, vibrations of intermittent displacement etc., or displacement generated in the observation object 8 or the target thereof.

The observation device 4 includes a transmitting unit 36, a receiving unit group 38, and a signal processing unit 40. The transmitting unit 36 is provided with, for example, a single transmitting antenna 18 and outputs a transmission signal $f_T$ to this transmitting antenna 18. A transmission wave $T_w$ is transmitted from the transmitting antenna 18 to the observation object 8. The transmission wave $T_w$ is, for example, a micro wave signal.

The receiving unit group 38 includes two or more receiving units 38-1, 38-2 . . . 38-n. The receiving units 38-1, 38-2 . . . 38-n are respectively provided with receiving antennas 20-1, 20-2 . . . 20-n, so that a reflection wave $R_w$ from the observation object 8 is received by each of the receiving antennas 20-1, 20-2 . . . 20-n, and a reception signal $f_R$ is acquired as a receiving-unit output signal for each of the receiving antennas 20-1, 20-2 . . . 20-n and provided to the signal processing unit 40.

The signal processing unit 40 uses the reception signals acquired by the receiving units 38-1, 38-2 . . . 38-n from the respective receiving antennas 20-1, 20-2 . . . 20-n to obtain a phase plane of the reflection wave to the antenna plane from a phase difference between the reception signals so as to identify an arrival direction and a signal strength of the reflection wave and calculates a phase variation of the reflection wave from a certain direction to generate an observation signal representative of a displacement or a vibration of the observation object 8 or a certain site thereof. The observation object 8 may be the whole observation object 8, or a vibration displacement of a certain observation site, i.e., a target, of the observation object 8 may be defined as the object.

Figure 11:
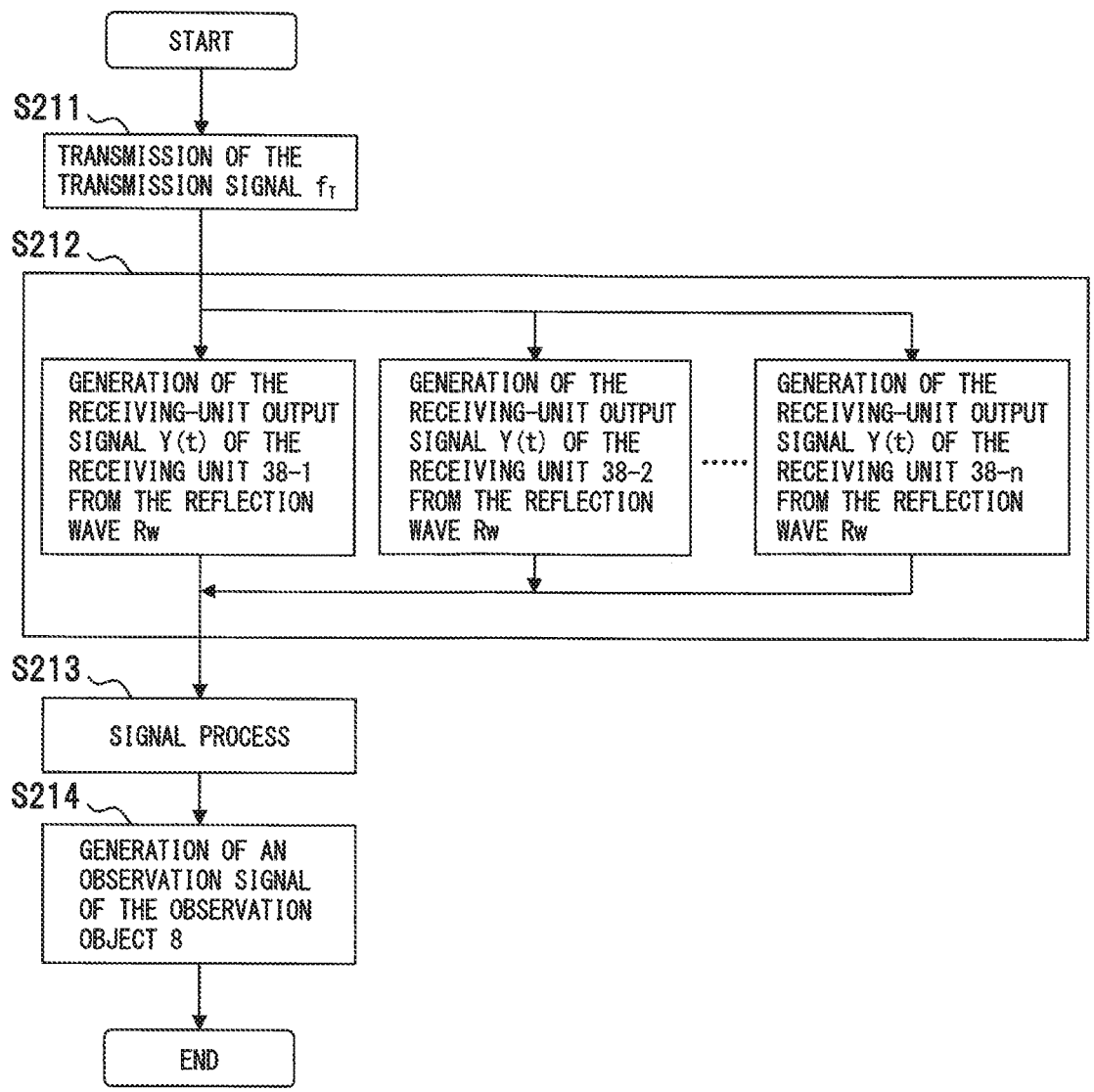
FIG. 11 is a flowchart of a process procedure of interferometric vibration observation.

FIG. 11 shows an example of a process procedure of the interferometric vibration observation of the observation object 8. This process procedure is an example of the vibration observation program or the vibration observation method of the present invention and is an example of an information process executed by the signal processing unit 40 or a computer mounted on the observation device 4. This vibration observation program is stored in a computer readable recording medium, for example.

In this process procedure, transmitting unit 36 transmits the transmission signal $f_T$ from the transmitting antenna 18 toward the observation object 8 (S211). The receiving antennas 20-1, 20-2 . . . 20-n receive the reflection wave $R_w$, and the receiving-unit output signals Y(t) described above are generated from the reception signals $f_R$ acquired by the receiving units 38-1, 38-2 . . . 38-n in synchronization with the transmission timing of the transmission signal $f_T$ (S212). The receiving-unit output signals Y(t) are provided from the receiving units 38-1, 38-2 . . . 38-n to the signal processing unit 40, and the signal processing unit 40 executes a signal process for generating an observation signal (S213).

For this signal process (S213), the following process is executed for the receiving-unit output signals acquired by the receiving units 38-1, 38-2 . . . 38-n from the respective receiving antennas 20-1, 20-2 . . . 20-n.

a) A phase plane of the reflection wave to the antenna plane is obtained from a phase difference between the receiving-unit output signals so as to identify an arrival direction and a signal strength of the reflection wave.

b) A phase variation of the reflection wave from the certain direction is calculated to generate an observation signal representative of a vibration of the observation object 8 or a certain site thereof (S214).

Effects of Second Embodiment

According to the second embodiment described above, the following effects are acquired.

(1) It is not necessary to attach a reflector to the two- or three-dimensionally spreading observation object 8, and the vibrating points and the vibration characteristics of the observation object 8 can be observed by using a plurality of reception signals acquired from the observation object 8. Therefore, a vibrating condition of the whole or a portion of a large structure etc. can be comprehended, and the maintenance management of the structure etc. can quickly and accurately be provided based on this vibrating condition. Additionally, it can be determined from the observation signal whether vibration factor exists on the structure side and whether an external factor such as traffic and wind exists in the case of a structure such as a bridge or an elevated road.

(2) Since the transmission signal $f_T$ from the transmitting antenna 18 may be applied to the whole of the observation object 8 without spatial scanning so as to perform digital beamforming of the receiving antennas 20-1, 20-2 . . . 20-n, an image representative of the observation object 8 can be implemented with high resolution and the vibration measurement can be imaged at constant time intervals. As a result, vibration observation and displacement observation can be performed with high accuracy. It is noted that frequencies are scanned in the case of FMCW.

(3) Vibration characteristics of one or two or more targets of the observation object 8 can be obtained by frequency conversion and analysis of the reception signals $f_R$ collected in time series in accordance with the reflection waves $R_w$ from the identified observation positions, so that the observation accuracy can be improved.

(4) By using the observation signal generated by the signal processing unit 40, an image representative of the observation object 8 or a certain site thereof can be generated, and the vibration thereof can be visualized. This visualization enables visual recognition of vibrations of the observation object 8 and the target thereof.

(5) The observation object 8 can be a landform as well as a large construction such as a bridge, a high-rise building, or an expressway, and the exterior shape, vibration, or displacement thereof can remotely be observed.

(6) Since it is not necessary to attach equipment such as a reflector on the observation object 8 or the targets thereof and the accompanying equipment such as a reflector is not required for the observation object 8, a work related to the equipment becomes unnecessary and the safety of the vibration observation is improved.

(7) The transmission signal $f_T$ may be any of a CW (Continuous Wave) signal, a pulse signal, or an FMCW (Frequency Modulated Continuous Wave) signal, for example.

(8) A receiving antenna array 20 may have a plurality of receiving antennas 20-1, 20-2 . . . 20-n in one-dimensional arrangement or two-dimensional arrangement, for example, and a two-dimensional or three-dimensional image of the observation object 8 and a certain site thereof can be acquired from signal analysis of the reception signals acquired from these receiving antenna arrangements.

Third Embodiment

Figure 12:
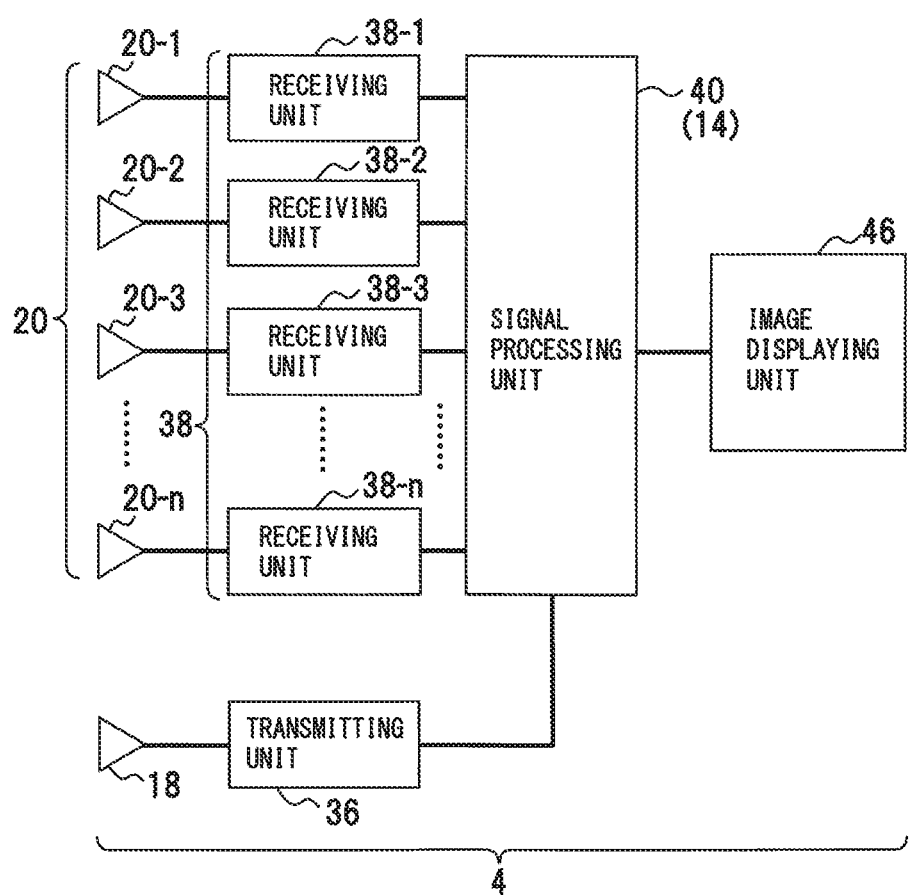
FIG. 12 is a diagram of a configuration example of an interferometric vibration observation device according to a third embodiment.

FIG. 12 shows the observation device 4 according to a third embodiment. In FIG. 12, the same portions as FIG. 1 are denoted by the same reference numerals.

The observation device 4 of the embodiment includes an image displaying unit 46 on the output side of the signal processing unit 40 of the observation device 4 shown in FIG. 10 and uses the observation signal acquired by the signal processing unit 40 to display an observation image on the image displaying unit 46. The image displaying unit 46 may be installed inside the observation device 4 or an image display function may be implemented by using an external device such as a personal computer.

Figure 13:
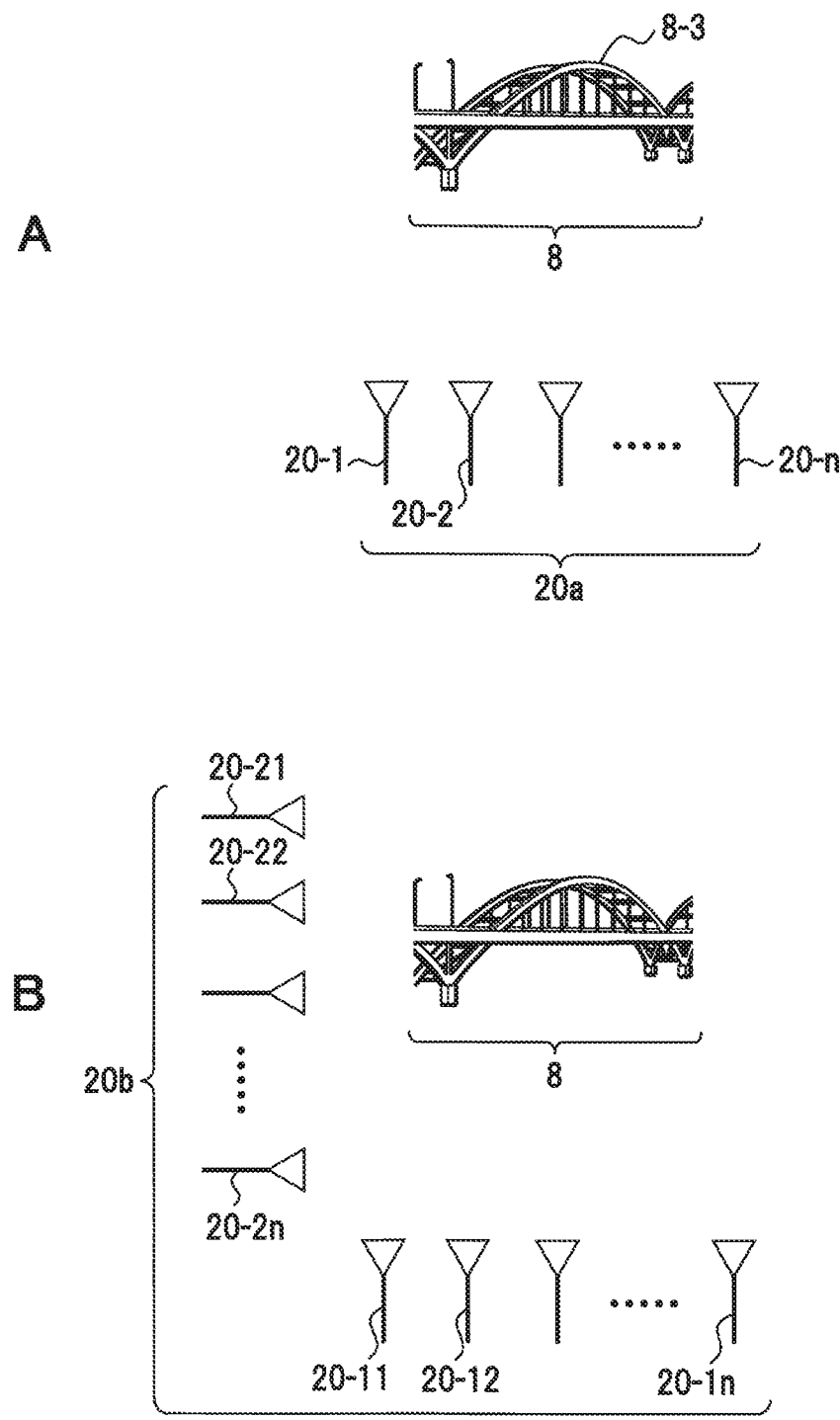
FIG. 13 is a diagram of examples of one-dimensionally arranged receiving antennas and two-dimensionally arranged receiving antennas.

FIG. 13 shows an example of the receiving antenna array 20 used in this embodiment. For example, the receiving antenna array 20 may be used as a one-dimensionally arranged receiving antenna 20a as shown in A of FIG. 13 or may be used as a two-dimensionally arranged receiving antenna 20b as shown in B of FIG. 13. The two-dimensionally arranged receiving antenna 20b includes an antenna array of a plurality of horizontally-arranged receiving antennas 20-11, 20-12, . . . 20-1n and an antenna array of a plurality of vertically-arranged receiving antennas 20-21, 20-22, . . . 20-2n. These antenna arrays may orthogonally be arranged, for example.

For the one-dimensionally arranged receiving antenna 20a and the two-dimensionally arranged receiving antenna 20b, a transmission signaling system can be selected from three systems, which are a CW signaling system, a pulse signaling system, and an FMCW signaling system. By combining the one-dimensionally arranged receiving antenna 20a or the two-dimensionally arranged receiving antenna 20b with the transmission signaling system, vibration measurement described in Table 1 is enabled.

TABLE 1

| | one-dimensionally arranged receiving antenna | two-dimensionally arranged receiving antenna |
|---|---|---|
| CW system | one-dimensional information (azimuth) | two-dimensional information (azimuth, elevation angle) |
| FMCW system | two-dimensional information (azimuth, distance) | three-dimensional information (azimuth, elevation angle, distance) |
| pulse system | two-dimensional information (azimuth, distance) | three-dimensional information (azimuth, elevation angle, distance) |

In the FMCW system and the pulse system, the observation object 8 can be identified and classified based on the azimuth and the distance to the observation object 8, and a plurality of the observation objects 8 located in the same direction can be concurrently be measured.

In this embodiment, the image displaying unit 46 is installed on the output side of the signal processing unit 40. This image displaying unit 46 is supplied with the observation signal output from the signal processing unit 40 and displays an image representative of the observation object 8 and the vibration of a certain site of the observation object 8. For the image displaying unit 46, for example, an image display function or a display of a personal computer can be used.

Figure 14:
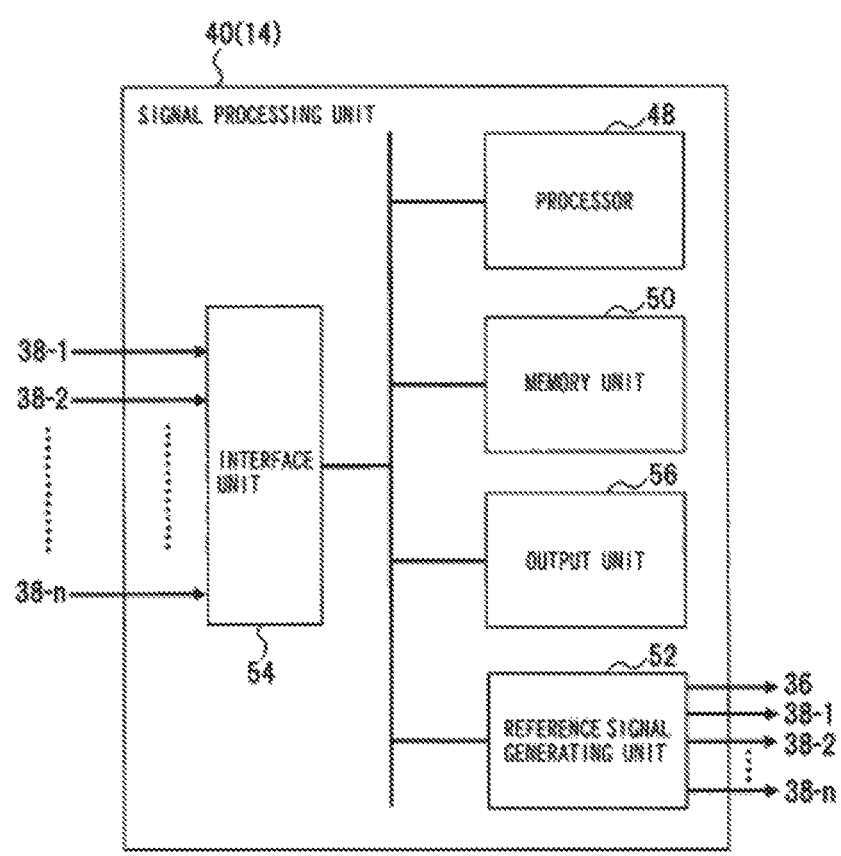
FIG. 14 is a diagram of an example of a signal processing unit.

The signal processing unit 40 is made up of a computer as shown in FIG. 14, for example. In this example, a processor 48, a memory unit 50, a reference signal generating unit 52, an interface unit 54, and an output unit 56 are included.

The processor 48 executes signal processes required for the vibration observation, including information processes for executing an OS (Operating System) and a vibration observation program stored in the memory unit 50, and controls various functional units.

The memory unit 50 is an example of a computer-readable recording medium and may include a RAM (Random Access Memory) and a ROM (Read Only Memory), for example. The RAM makes up a work area for executing various programs. The ROM is an example of a means recording programs and stores the OS and the vibration observation program described above as well as various data required for the vibration observation. The ROM may be a semiconductor memory such as an EEPROM (Electrically Erasable and Programmable Read Only Memory) and flash memory in which contents can electrically be rewritten.

The memory unit 50 is not limited to the RAM and the ROM and may be, for example, a computer-readable recording medium such as a magnetic disk, a flexible disk, a hard disk, an optical disk, a magneto-optical disk, and an SSD (solid state drive).

The reference signal generating unit 52 is an example of a signal generating means generating a reference signal. The reference signal generating unit 52 is controlled by the processor 48 to generate a reference signal serving as a synchronization signal. This reference signal is provided to the transmitting unit 36 and the receiving units 38-1, 38-2, . . . 38-n.

The interface unit 54 captures the receiving-unit output signals output from the receiving units 38-1, 38-2, . . . 38-n. To the output unit 56, the observation signal acquired through execution of the vibration observation program is output.

<Vibration Observation Process>

Figure 15:
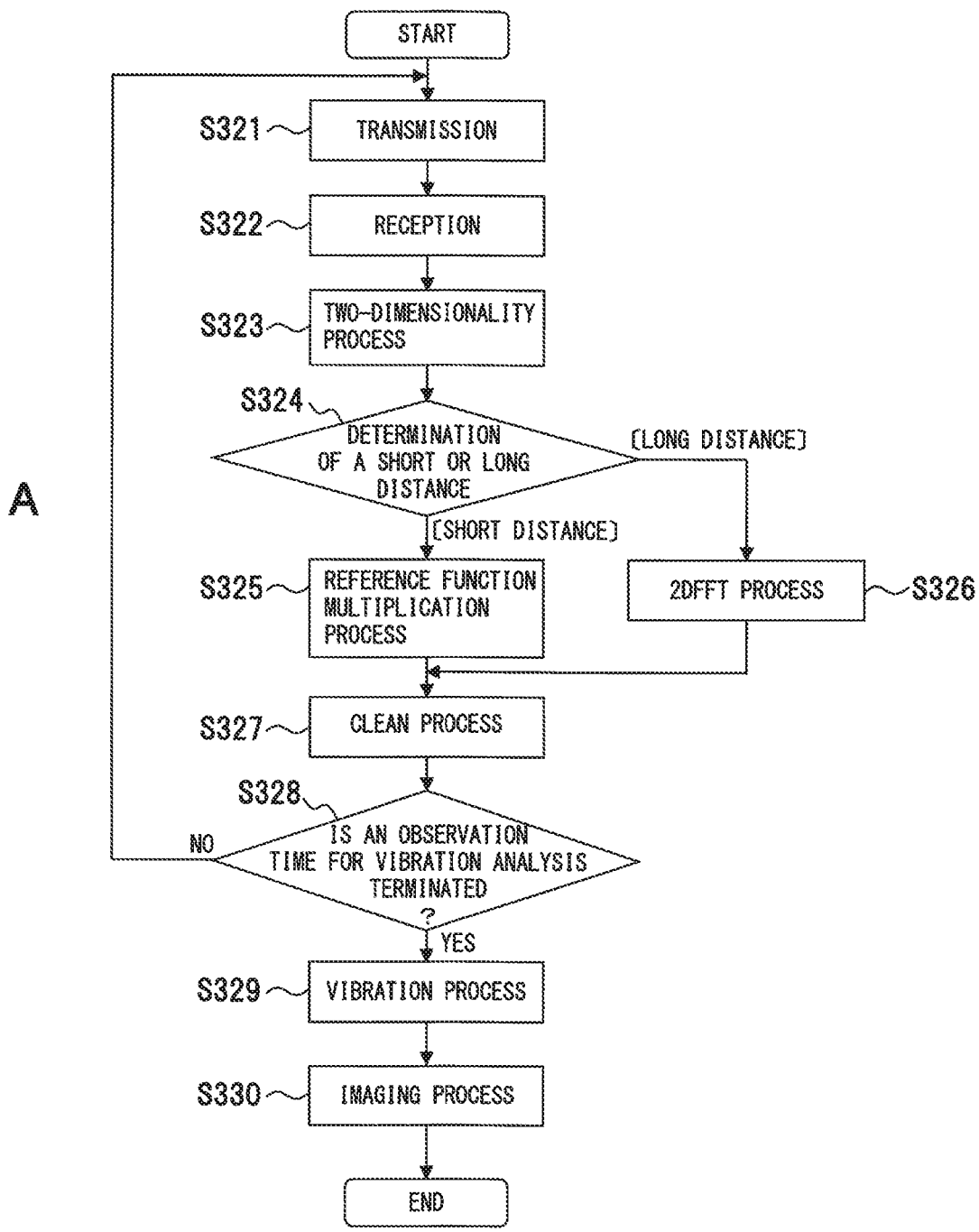
FIG. 15 is a diagram of an example of a process procedure of vibration observation.

A of FIG. 15 shows a process procedure of the vibration observation by the observation device 4.

In this process procedure, a transmission signal from the transmitting unit 36 toward the observation object 8 is transmitted from the transmitting antenna 18 (S321). As a result, the reflection wave is acquired from the observation object 8 and this reflection wave is received by the receiving antennas 20-1, 20-2, . . . 20-n, so that a receiving-unit output signal is generated by each of the receiving units 38-1, 38-2, . . . 38-n (S322). The receiving-unit output signals acquired by the receiving units 38-1, 38-2, . . . 38-n are digitalized inside the receiving units and provided to the signal processing unit 40. If the receiving antennas 20-1, 20-2, . . . 20-n are used as the two-dimensionally arranged antenna 20b, the signal processing unit 40 further executes a two-dimensionality process (S323). If the one-dimensionally arranged antenna 20a is used, the two-dimensionality process (S323) may not be included.

In this process, it is determined whether a distance from the receiving antennas 20-1, 20-2, . . . 20-n of the observation device 4 to the observation object 8 is a short distance or a long distance (S324). In the case of a short distance, an imaging process according to a reference function multiplication is executed (S325) or, in the case of a long distance, an imaging process using a 2DFFT (2-Dimensional Fast Fourier Transform) process is executed (S326). Subsequently to S325 or S326, a clean process is executed (S327), and it is determined whether an observation time for vibration analysis is terminated (S328). If a two-dimensional antenna arrangement like an L-shape or a T-shape other than a lattice-shape is used, an image in this stage is a dirty image including pseudo images. Therefore, the clean process of removing the pseudo images is executed. For details of the process procedure of the clean process, that is procedure CLEAN, for example, a process described in Non-Patent Literature 3 may be executed.

After the clean process, returning to S321 before termination of the observation time (NO at S328), and the process from S321 to S328 is continuously executed. At this observation time, images are accumulated that correspond to a period of one or more cycles of the lowest frequency of vibrations to be analyzed. When this observation time is terminated (YES at S328), the output of the reference function multiplication process (S325) or the 2DFFT process (S326) is subjected to a vibration process (S329), and an imaging process is executed by using an output observation signal (S330). These processes will be described later.

<Polarimetry Function>

Strong reflection characteristics to a vertical polarized wave or a horizontal polarized wave are known in accordance with a shape and a structure of the observation object 8 and a target thereof. Polarized waves may be converted depending on a structure of the observation object 8. To measure all the reflection waves Rw of the observation object 8 and the target thereof and improve the observation accuracy of the vibration and displacement of the observation object 8, it is desirable that both polarized waves and converted polarized waves can be received.

B of FIG. 15 shows a polarimetry function with which the transmitting antenna 18 and the receiving antennas 20-1, 20-2 . . . 20-n are equipped. The transmitting antenna 18 is enabled to transmit both a horizontal (H) polarized wave and a vertical (V) polarized wave in a switching manner, and the receiving antennas 20-1, 20-2 . . . 20-n are enabled to concurrently receive the horizontal polarized wave and the vertical polarized wave. Therefore, at the transmission and reception timings, the polarized waves are alternately transmitted in respective repetition cycles, and both polarized waves are concurrently received.

In B of FIG. 15, the concurrent reception of H and V requires the same numbers of the reception systems and the signal processing units 40 (for an H-system and a V-system). The observation signals output from the H-system and V-system signal processing units 40 are combined with each other by the image displaying unit 46 to display an observation image.

Example 1: CW Signaling System

Figure 16:
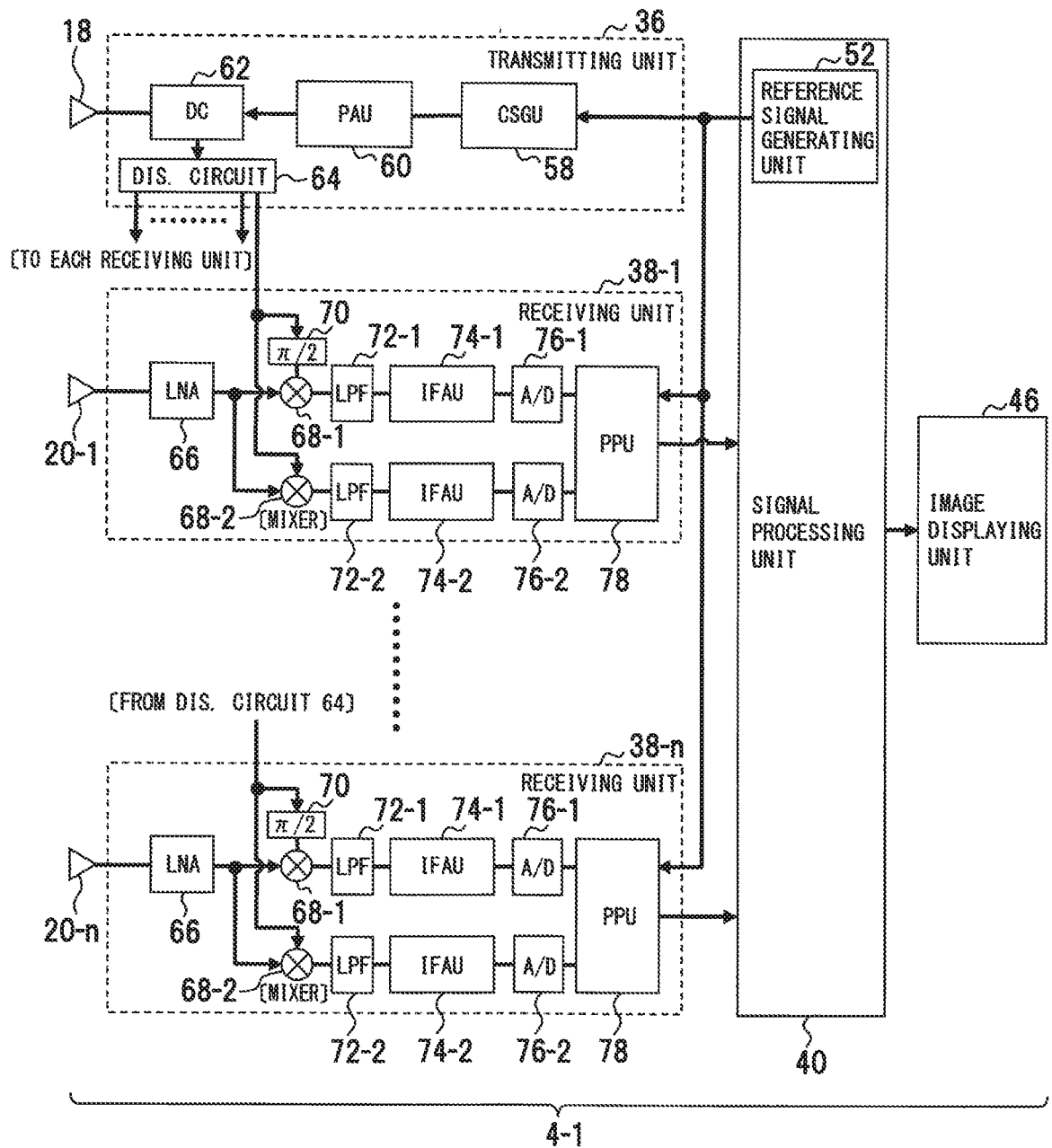
FIG. 16 is a diagram of Example 1 of the interferometric vibration observation device.

FIG. 16 shows an observation device 4-1 of the CW signaling system. In FIG. 16, the same portions as FIG. 12 are denoted by the same reference numerals.

The reference signal generating unit 52 of the signal processing unit 40 generates and supplies a reference signal with high frequency stability to the transmitting unit 36 and the receiving units 38-1, 38-2, . . . 38-n. A CW signal generating unit (CSGU) 58 of the transmitting unit 36 uses the reference signal received from the reference signal generating unit 52 to generate a CW signal at a transmission frequency.

This CW signal is amplified by the power amplifying unit (PAU) 60 to a predetermined level and is supplied through a directional coupler (DC) 62 to the transmitting antenna 18. This CW signal is applied as the transmission signal toward the observation object 8.

A portion of the transmission signal is branched by the directional coupler 62 and distributed from a distribution circuit (DIS. CIRCUIT) 64 to the receiving units 38-1, 38-2, . . . 38-n. This transmission signal is used as local signals of the receiving units 38-1, 38-2, . . . 38-n.

When the transmission signal is applied from the transmitting antenna 18 to the observation object 8, a reflection wave is generated from the observation object 8 by the transmission signal, and this reflection wave is input to the receiving antennas 20-1, 20-2, . . . 20-n so that a reception signal is acquired for each of the receiving antennas 20-1, 20-2, . . . 20-n.

The reception signals acquired by the receiving antennas 20-1, 20-2, . . . 20-n are amplified by an LNA (Low Noise Amplifier) 66 and then applied to frequency mixers (MIXERs) 68-1, 68-2. The MIXER 68-1 mixes the reception signal with the transmission signal having a phase shifted by π/2 by a phase shifter 70. The MIXER 68-2 mixes the reception signal with the transmission signal. As a result, the frequency conversion into an intermediate frequency is performed by the local signals turned into complex signals (I, Q), and intermediate frequency signals are acquired. The intermediate frequency signals are passed through LPFs (Low Pass Filters) 72-1, 72-2, then amplified by intermediate frequency amplifying units (IFAUs) 74-1, 74-2 to a predetermined level, converted into digital signals at the timing synchronized with the reference signal by analog/digital converters (hereinafter referred to as "A/Ds") 76-1, 76-2, and provided to a preprocessing unit (PPU) 78.

The preprocessing unit 78 integrates the digital signals corresponding to one observation cycle to reduce noises. As a result, the output signal of the preprocessing unit 78 of each of the receiving units 38-1, 38-2, . . . 38-n is output to the signal processing unit 40.

Figure 17:
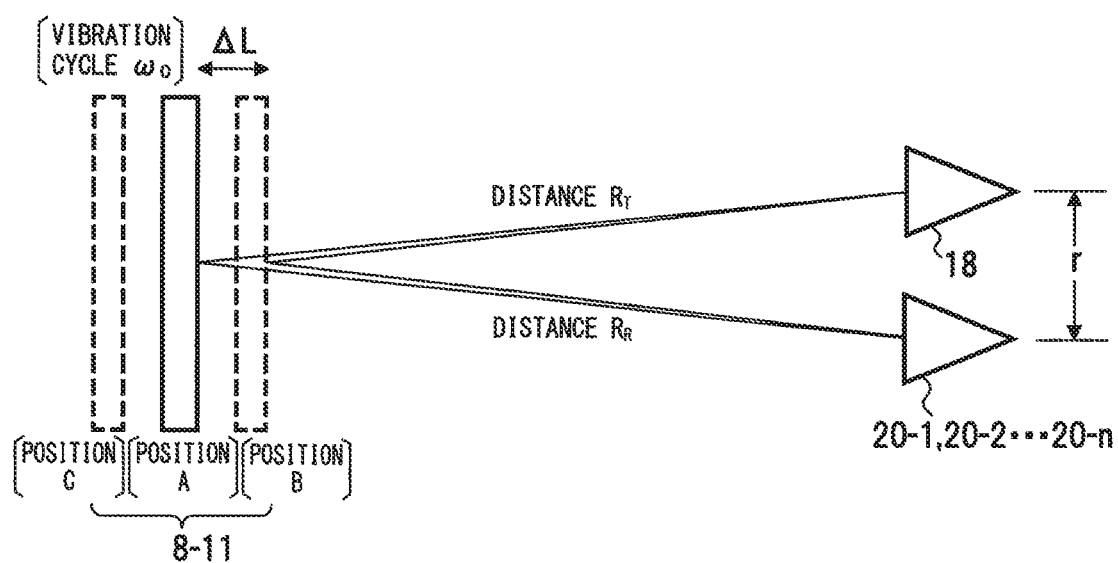
FIG. 17 is a diagram for explaining a principle of observation of distance of an observation object.

FIG. 17 shows a relationship of a reflection body 8-11 on the observation object 8 and the transmitting antenna 18 as well as any of the receiving antennas 20-1, 20-2, . . . 20-n. In this case, it is assumed that the distance from the transmitting antenna 18 and the receiving antennas 20-1, 20-2, . . . 20-n to the reflection body 8-11 is sufficiently large as compared to the distance between the transmitting antenna 18 and the receiving antennas 20-1, 20-2, . . . 20-n.

In this relationship, $R_T$ denotes a distance from the transmitting antenna 18 to a position A point of the reflection body 8-11 and, similarly, $R_R$ denotes a distance from the receiving antennas 20-1, 20-2, . . . 20-n to the position A point of the reflection body 8-11.

It is assumed that the reflection body 8-11 is vibrating with an amplitude ΔL in a vibration cycle $\omega_0$. It is also assumed that the vibration cycle $\omega_0$ is a frequency of about 1 [kHz] or less, for example. When the transmission frequency is $\omega_c$, the transmission signal $f_T$ and the reception signal $f_R$ are represented as follows.

[Math. 4]

$$f_T(t) = \cos \omega_C t \qquad (5)$$

[Math. 5]

$$f_R(t) = \cos \omega_C\left(t - \frac{R_T + R_R}{C}\right) \qquad (6)$$

When the reflection body 8-11 is vibrating, the reception signal acquired by each of the receiving antennas 20-1, 20-2, . . . 20-n is affected by the vibration of the reflection body 8-11 and represented as follows.

[Math. 6]

$$f_R(t) = \cos \omega_C\left(t - \frac{R_T + R_R + 2 \cdot \Delta L \cos\omega_0 t}{C}\right) \qquad (7)$$

When the reception signal is amplified by the LNA 66 and frequency-converted by the local signals turned into the complex signals (I, Q) and a low-frequency component is extracted by the LPFs 72-1, 72-2, the intermediate frequency signal $f_{if}$ described above is represented as follows.

[Math. 7]

$$f_{if}(t) = \exp\left(-j\omega_C\left(\frac{R_T + R_R + 2 \cdot \Delta L\cos\omega_0 t}{C}\right)\right) \qquad (8)$$

The intermediate frequency signal $f_{if}$ has a signal form acquired by modulating a phase of the transmission frequency $\omega_c$ with the amplitude of the vibration cycle $\omega_0$.

The intermediate frequency signal is amplified by the intermediate frequency amplifying units 74-1, 74-2 and converted into a digital signal by the A/Ds 76-1, 76-2. When the vibration cycle $\omega_0$ is, for example, 1 [kHz] or less, and the frequency of the A/D conversion is, for example, 2 [kHz], the vibration of the observation object 8 can be observed. In the case of sampling at a sampling frequency higher than 2 [kHz], the data may be integrated by the preprocessing unit 78 and reduced to 2 [kHz]. As a result, S/N (Signal to Noise Ratio) can be improved.

Example 2: Pulse Signaling System

Figure 18:
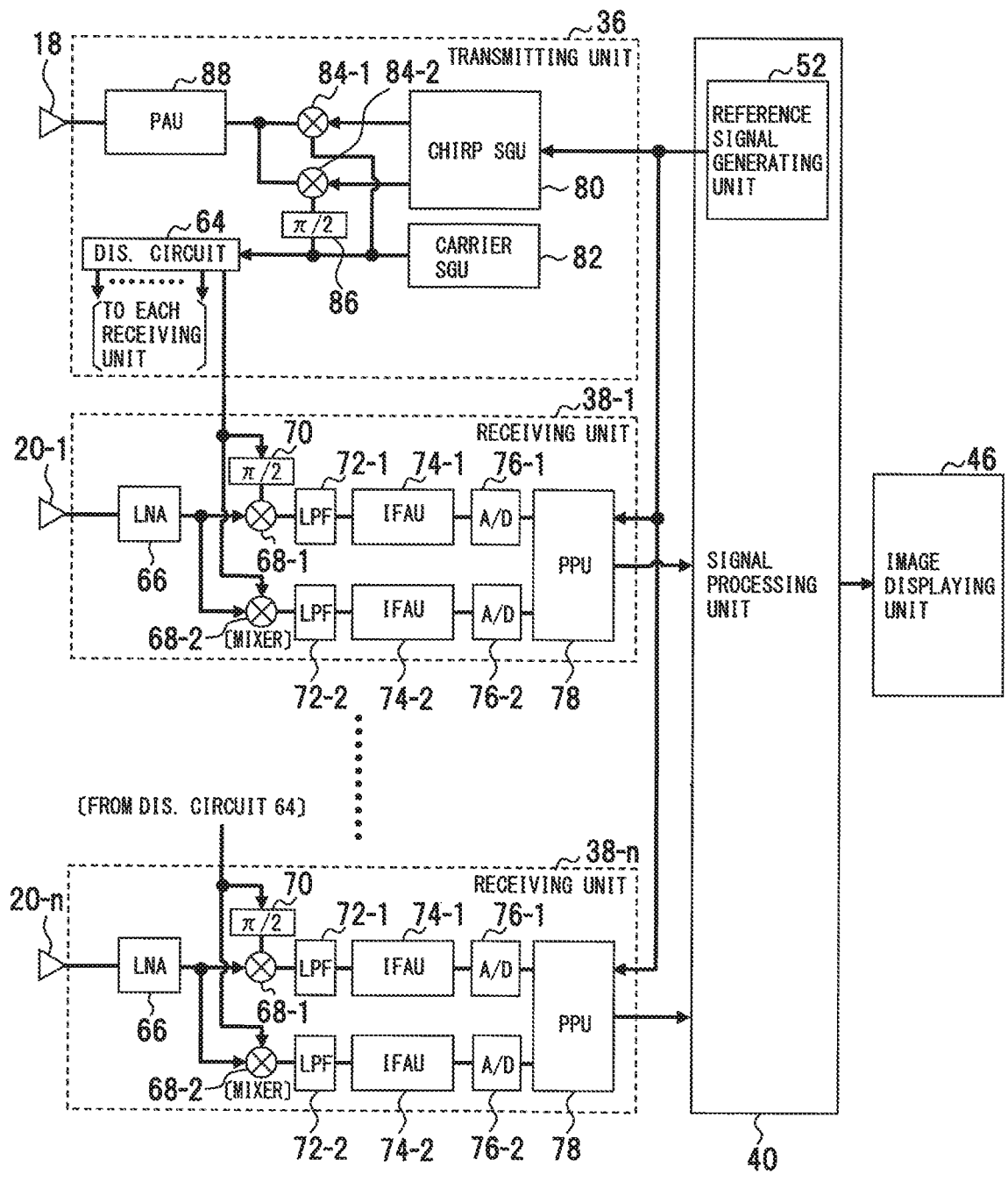
FIG. 18 is a diagram of Example 2 of the interferometric vibration observation device.

FIG. 18 shows an observation device 4-2 of the pulse signaling system. In FIG. 18, the same portions as FIG. 12 are denoted by the same reference numerals.

The reference signal generating unit 52 of the signal processing unit 40 generates and supplies a reference signal with high frequency stability to the transmitting unit 36 and the receiving units 38-1, 38-2, . . . 38-n.

In the transmitting unit 36 of the observation device 4-2, a chirp signal generating unit (CHIRP SGU) 80 generates a linear chirp signal from the reference signal provided by the reference signal generating unit 52, and a carrier signal generating unit (CARRIER SGU) 82 generates a carrier signal having a transmission frequency. The linear chirp signal is applied to MIXERs 84-1, 84-2. The MIXER 84-1 mixes the linear chirp signal with the carrier signal. The MIXER 84-2 mixes the linear chirp signal with the carrier signal having a phase shifted by π/2 by a phase shifter 86. As a result, a chirp pulse signal serving as a transmission signal is converted by the carrier signal into the transmission frequency and the transmission signal is acquired. The transmission signal is amplified by a power amplifying unit (PAU) 88 to a predetermined level and is then supplied to the transmitting antenna 18 and applied toward the observation object 8.

In this pulse signaling system, the carrier signal generated by the carrier signal generating unit 82 is distributed by the distribution circuit 64 to the receiving units 38-1, 38-2, . . . 38-n. The carrier signal is used as local signals in the receiving units 38-1, 38-2, . . . 38-n.

The reflection wave from the observation object 8 is received by the receiving antennas 20-1, 20-2, . . . 20-n so that a reception signal is acquired from each of the receiving antennas 20-1, 20-2, . . . 20-n. In each of the receiving units 38-1, 38-2, . . . 38-n, the reception signal is frequency-converted by the local signal to acquire an intermediate frequency signal. The intermediate frequency signal is amplified to a predetermined level and is then converted into a digital signal by A/D converters 76-1, 76-2. In this pulse signaling system, the receiving units 38-1, 38-2, . . . 38-n are the same as those of the observation device 4-1 of the CW signaling system described above and are therefore denoted by the same reference numerals and will not be described.

The observation device 4-2 of the pulse signaling system as described above can use a pulse compression technique as is the case with a common radar, and a range resolution can be improved by using this pulse compression technique.

Figure 19:
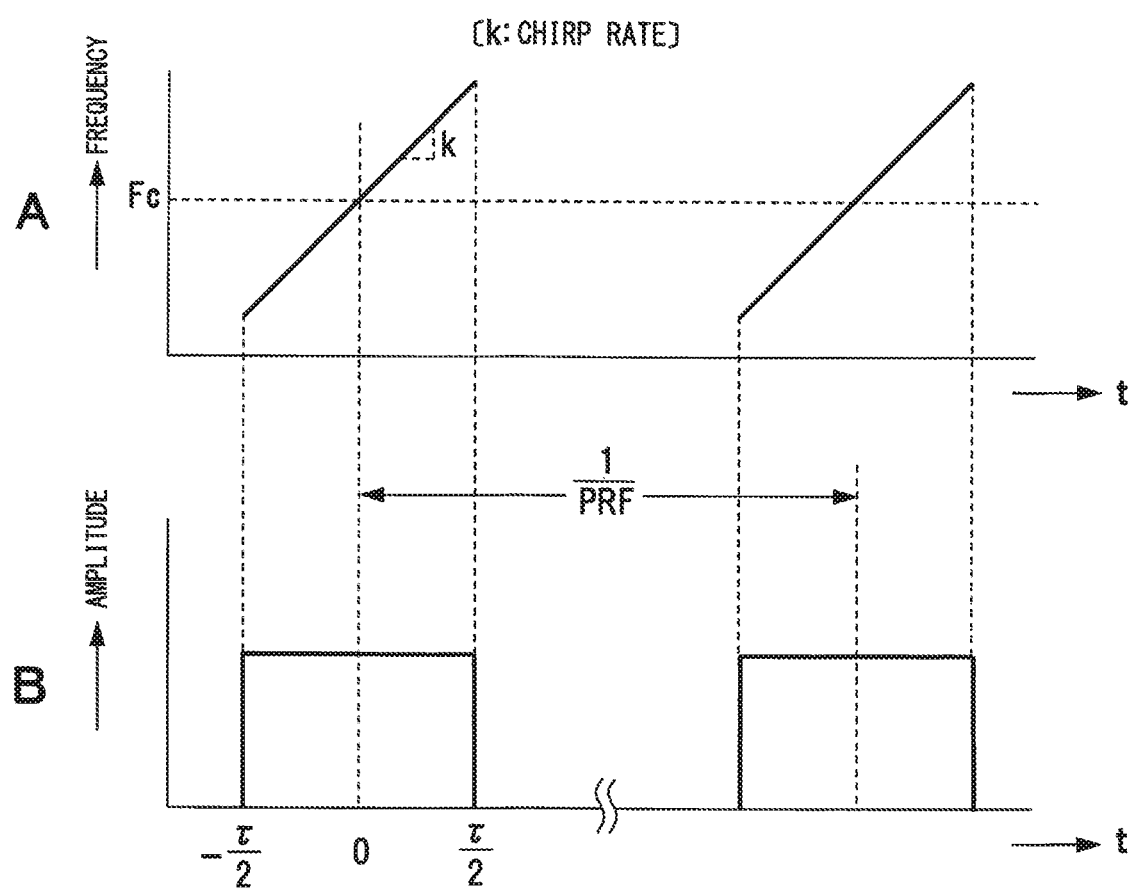
FIG. 19 is a diagram for explaining a principle of observation of a pulse signaling system.

FIG. 19 shows a state of the transmission signal of the pulse signaling system. A of FIG. 19 shows a frequency change of the transmission signal and B of FIG. 19 shows an amplitude change of the transmission signal.

In this pulse signaling system, when a chirp rate is k, the transmission signal $f_T(t)$ can be represented as follows.

[Math. 8]

$$f_T(t) = \cos 2\pi\left(\frac{k}{2}t^2 + F_C t\right) \tag{9}$$

It is assumed that a reception signal from the reflection body 8-11 of the vibrating observation object 8 is obtained in this pulse signaling system as is the case with the reception signal of the CW signaling system as shown in FIG. 17.

$R_T$ denotes a distance from the transmitting antenna 18 to the position A point of the reflection body 8-11 and, similarly, $R_R$ denotes a distance from the receiving antennas 20-1, 20-2, . . . 20-n to the position A point of the reflection body 8-11. It is assumed that the reflection body 8-11 is vibrating with the amplitude $\Delta L$ in the vibration cycle $\omega_0$. In this case, the vibration cycle $\omega_0$ may be, for example, a frequency of about 1 [kHz] or less and sufficiently lower than the transmission frequency $F_C$.

In this case, a reception signal $f_R(t)$ is represented by the following equation.

[Math. 9]

$$f_R(t) = \cos 2\pi\left(\frac{k}{2}\left(t - \frac{R_T + R_R + 2\cdot\Delta L \cos \omega_0 t}{C}\right)^2 + F_C\left(t - \frac{R_T + R_R + 2\cdot\Delta L \cos \omega_0 t}{C}\right)\right) \tag{10}$$

After the reception signal is amplified by the LNA 66, separated from the carrier signal, and frequency-converted by the local signal turned into the complex signal, a low-frequency component is extracted by the LPFs 72-1, 72-2 to acquire the intermediate frequency signal $f_{if}$.

[Math. 10]

$$f_{if}(t) = \exp j2\pi\left(\frac{k}{2}\left(t - \frac{R_T + R_R + 2\cdot\Delta L \cos \omega_0 t}{C}\right)^2 - F_C\left(\frac{R_T + R_R + 2\cdot\Delta L \cos \omega_0 t}{C}\right)\right) \tag{11}$$

The intermediate frequency signal $f_{if}$ is amplified by the intermediate frequency amplifying units 74-1, 74-2, converted by the A/Ds 76-1, 76-2 into a digital signal, and subjected to pulse compression of a chirp signal by the preprocessing unit 78, and is then output to the signal processing unit 40.

Figure 20:
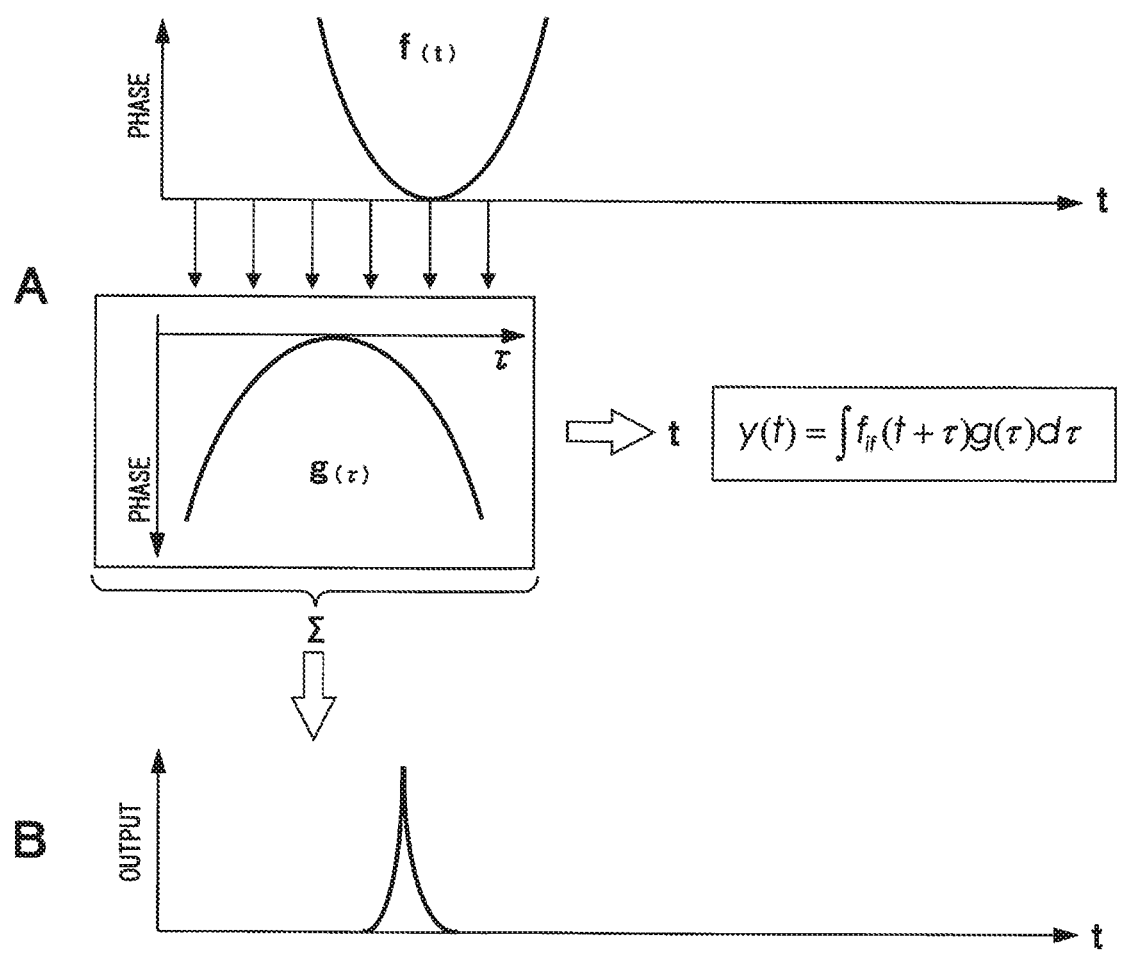
FIG. 20 is a diagram for explaining a pulse compression process.

FIG. 20 shows a pulse compression process of the preprocessing unit 78. In FIG. 20, A shows the pulse compression process, and B shows the output acquired from the pulse compression process.

This pulse compression process is executed in accordance with correlation between a chirp signal f(t) and a reference function g(T). The reference function g(T) is a conjugate function of a transmission chirp function in the chirp signal f(t) and is represented by the following equation.

[Math. 11]

$$g(t) = \exp j2\pi\left(-\frac{k}{2}t^2\right) \tag{12}$$

[Math. 12]

$$\begin{aligned} y(t) &= \int f_{if}(t+\tau)g(\tau)d\tau \\ &= \delta\left(\frac{R_T + R_R + 2\cdot\Delta L\cos\omega_0 t}{C}\right)\exp\left(-j\omega_C \frac{R_T + R_R + 2\cdot\Delta L\cos\omega_0 t}{C}\right) \end{aligned} \tag{13}$$

A process for each range of the reception signals of the receiving antennas 20-1, 20-2, . . . 20-n is the same as the process of the CW signaling system. However, an azimuth detection process of the reflection body 8-11 is executed for a distance from the observation object 8 to each of the receiving antennas 20-1, 20-2, . . . 20-n. This may be executed for a reflection point.

Example 3: FMCW Signaling System

Figure 21:
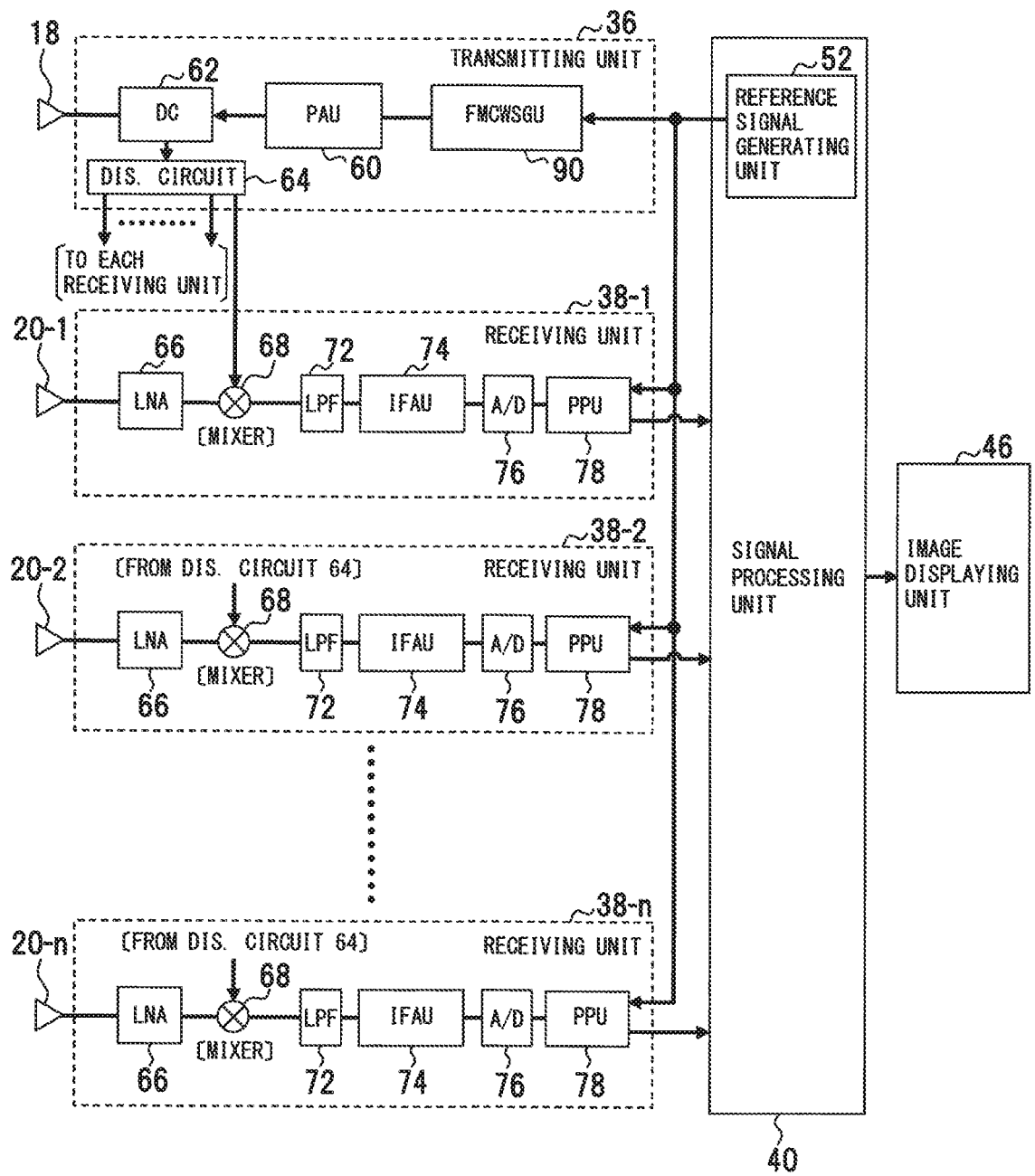
FIG. 21 is a diagram of Example 3 of the interferometric vibration observation device.

FIG. 21 shows an observation device 4-3 of the FMCW signaling system. In FIG. 21, the same portions as FIG. 12 or 16 are denoted by the same reference numerals.

In this FMCW signaling system, for example, as is the case with an FMCW radar, a transmission signal frequency can be used as a linear FM signal for scanning in a broadband so as to improve the range resolution.

The reference signal generating unit 52 of the signal processing unit 40 generates and supplies a reference signal with high frequency stability to the transmitting unit 36 and the receiving units 38-1, 38-2, . . . 38-n.

An FMCW signal generating unit (FMCWSGU) 90 of the transmitting unit 36 generates an FMCW signal of which a transmission bandwidth is linearly frequency-scanned based on the reference signal provided from the reference signal generating unit 52.

This FMCW signal is amplified by the power amplifying unit 60 to a predetermined level and is then supplied through the directional coupler 62 to the transmitting antenna 18 and applied by the transmitting antenna 18 toward the observation object 8.

A portion of the transmission signal is applied to the distribution circuit 64 and distributed by the distribution circuit 64 to the receiving units 38-1, 38-2, ... 38-n. This transmission signal is used as local signals in the receiving units 38-1, 38-2, ... 38-n.

In the FMCW signaling system, a continuous wave is used for the transmission signal, and the transmission of the transmission signal and the reception of the reception signal are concurrently performed. Since the transmission and the reception are concurrently performed, measures must be taken so that no transmission signal of the transmitting antenna 18 directly reaches the receiving antennas 20-1, 20-2, ... 20-n. For example, a distance may be set between the transmitting antenna 18 and the receiving antennas 20-1, 20-2, ... 20-n. In particular, the transmitting antenna 18 and the receiving antennas 20-1, 20-2, ... 20-n may be arranged at a separation causing no interference.

The transmission signal applied by the transmitting antenna 18 to the observation object 8 is reflected by the observation object 8, and the reflection wave thereof is received by the receiving antennas 20-1, 20-2, ... 20-n so that reception signals are acquired by the respective receiving antennas 20-1, 20-2, ... 20-n. Each of the reception signals is amplified by the LNA 66 and is then mixed with the local signal (branched and distributed form the transmission signal) by a MIXER 68 for frequency conversion, and converted into an intermediate frequency signal. A low-frequency component is extracted from the intermediate frequency signal by an LPF 72 and, after this low-frequency component signal is amplified to a predetermined level by the intermediate frequency amplifying unit 74 and is then converted by an A/D converter 76 into a digital signal, this digital signal is provided to the preprocessing unit 78. In the preprocessing unit 78, the provided digital signal is converted by an FFT process into a digital signal having a frequency domain corresponding to a range space. This digital signal is provided as a receiving-unit output signal to the signal processing unit 40.

Figure 22:
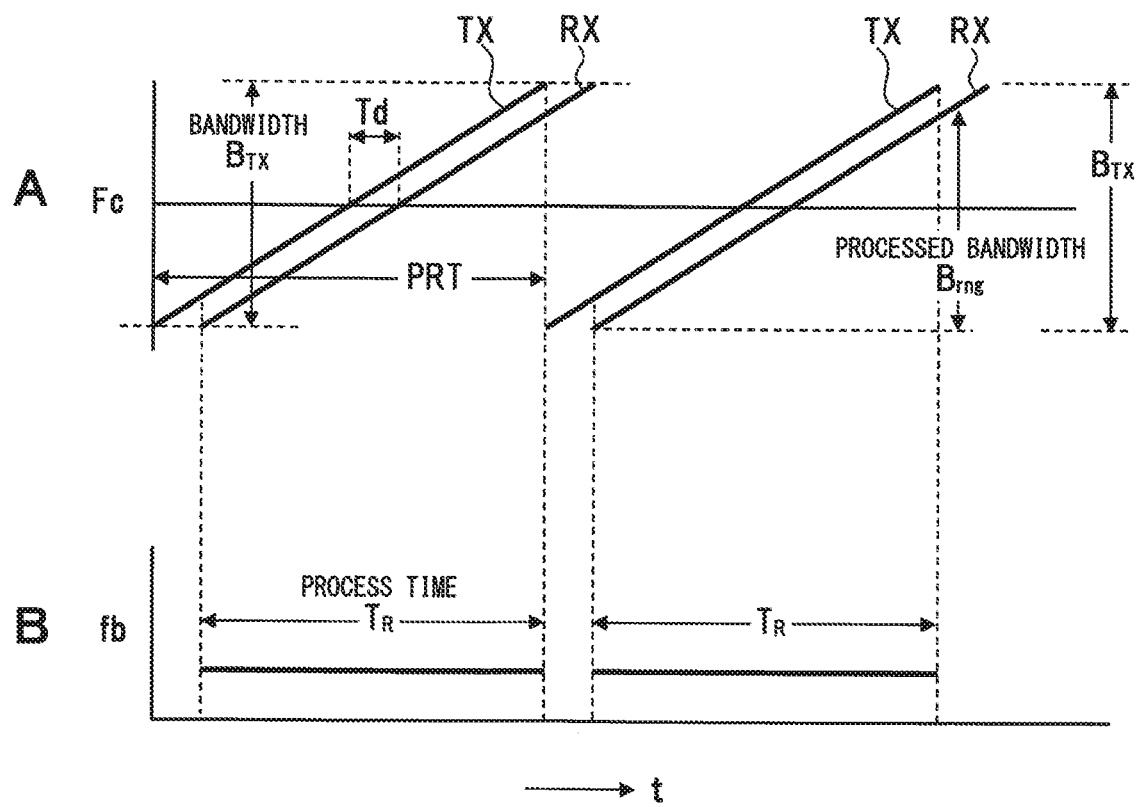
FIG. 22 is a diagram for explaining an FMCW signal.

FIG. 22 shows a state of transmission/reception signals. In FIG. 22, A shows a frequency change of the transmission/reception signals, and B shows a frequency of a mixer output signal in the receiving unit. In particular, since the reception signal is delayed by a round trip distance from the transmitting/receiving antennas to the observation object point, a frequency difference is generated due to this reception signal delay between the transmission signal and the reception signal. This frequency difference is a frequency of a mixer output signal.

When the chirp rate is k, the transmission signal $f_T(t)$ of the FMCW signaling system is represented by the following equation.

[Math. 13]

$$f_T(t) = \cos 2\pi\left(\frac{k}{2}t^2 + F_C t\right) \quad -\frac{PRT}{2} \leq t < \frac{PRT}{2} \quad (14)$$

It is assumed that a reception wave from the reflection body 8-11 of the vibrating observation object 8 is obtained as is the case with the reception signal of the CW signaling system as shown in FIG. 17. $R_T$ denotes a distance from the transmitting antenna 18 to the position A point of the reflection body 8-11 and, similarly, $R_R$ denotes a distance from the receiving antennas 20-1, 20-2, ... 20-n to the position A point of the reflection body 8-11.

It is assumed that the reflection body 8-11 is vibrating with the amplitude $\Delta L$ in the vibration cycle $\omega_0$. In this case, the vibration cycle $\omega_0$ may be, for example, a frequency of about 1 [kHz] or less and sufficiently lower than the transmission frequency $F_c$. When the transmission frequency is Fc and the chirp rate is k, the reception signal $f_R$ is represented as follows.

[Math. 14]

$$f_R(t) = \cos 2\pi\left(\frac{k}{2}\left(t - \frac{R_T + R_R + 2\cdot\Delta L\cos\omega_0 t}{C}\right)^2 + F_C\left(t - \frac{R_T + R_R + 2\cdot\Delta L\cos\omega_0 t}{C}\right)\right) \quad (15)$$

When the reception signal is amplified by the LNA 66 and is then frequency-converted by the local signal branched from the transmission signal and a low-frequency portion is extracted by the LPF 72, the following intermediate frequency signal $f_{if}$ is acquired.

[Math. 15]

$$f_R(t) = \cos 2\pi\left(k\left(\frac{R_T + R_R + 2\cdot\Delta L \cos \omega_0 t}{C}\right)t - F_C\left(\frac{R_T + R_R + 2\cdot\Delta L \cos \omega_0 t}{C}\right)\right) \quad (16)$$

This intermediate frequency signal $f_{if}$ is amplified by the intermediate frequency amplifying unit 74 and converted into a digital signal by the A/D 76, and the preprocessing unit 78 performs the frequency conversion of the FMCW signal thorough FFT (Fast Fourier Transform), so as to extract a signal component of each distance.

[Math. 16]

$$y(\omega) \Leftarrow FFT(f_{if}(t)) = \quad (17)$$
$$\delta\left(k\frac{R_T + R_R + \Delta L \cos \omega_0 t}{C}\right)\exp\left(-j\omega_C \frac{R_T + R_R + \Delta L \cos \omega_0 t}{C}\right)$$
$$y(\omega) = \delta\left(k\frac{R_T + R_R}{C}\right)\cdot\exp\left(-j\omega_C \frac{R_T + R_R + 2\cdot\Delta L \cos \omega_0 t}{C}\right)$$
$$(\because R_T, R_R \gg 2\cdot\Delta L)$$

A process for each range of the reception signals acquired by the receiving antennas 20-1, 20-2, ... 20-n is the same as the process in the CW signaling system described above. However, in this FMCW signaling system, the azimuth detection process of the reflection body 8-11 is executed for each distance. In this azimuth detection process, azimuth composition is performed from the reception signals of the receiving antennas 20-1, 20-2, . . . 20-n.

<Azimuth Composition>

Figure 23:
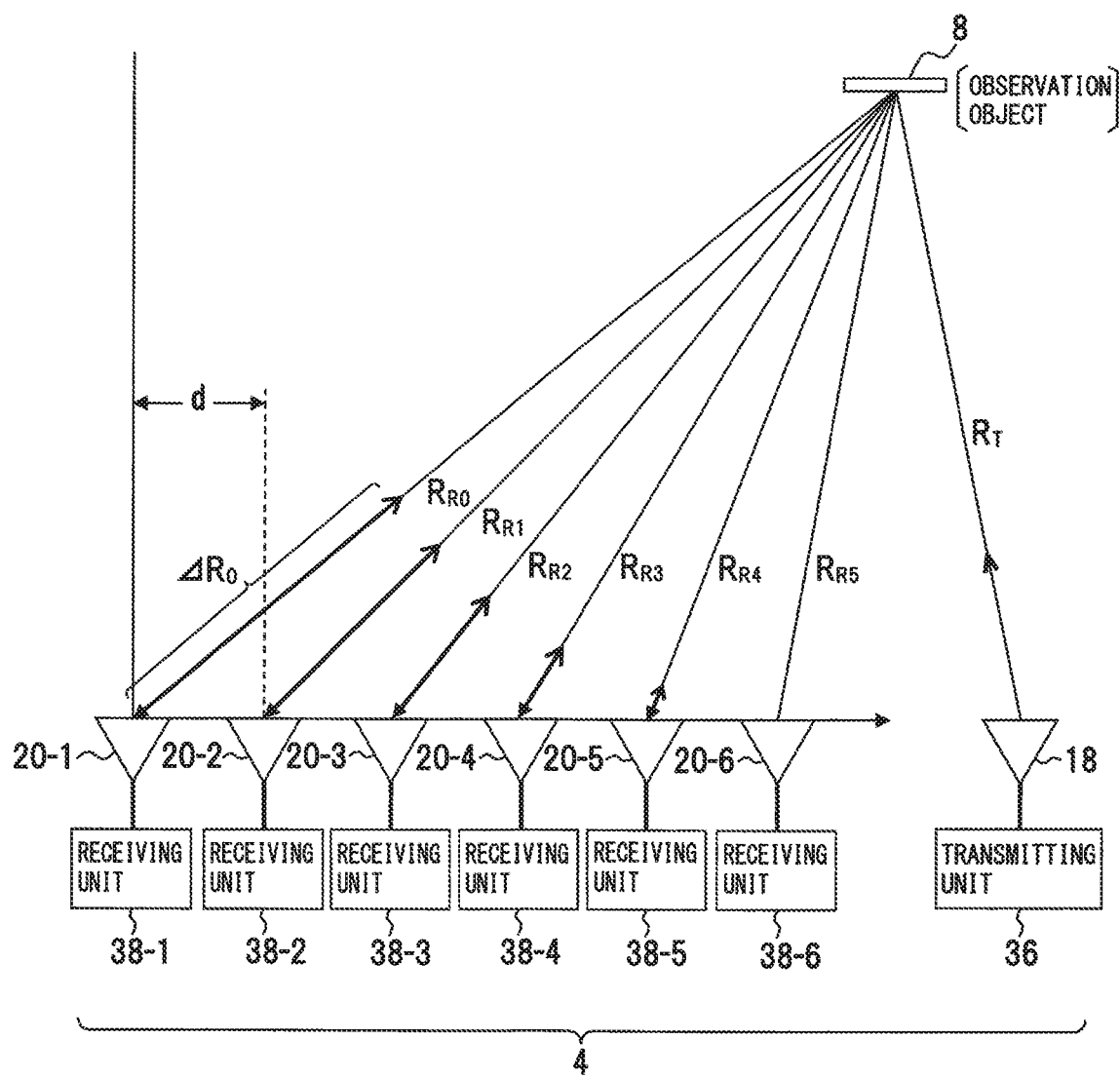
FIG. 23 is a diagram of a reception state of received waves.

The azimuth composition will be described with reference to FIG. 23. FIG. 23 is based on the assumption that the single transmitting unit 36 and the six receiving units 38-1, 38-2, . . . 38-6 are used in the observation device 4.

A transmission signal is applied to the observation object 8 at a distance $R_T$ from the transmitting antenna 18. The reflection wave acquired from the observation object 8 is received by the receiving antennas 20-1, 20-2, . . . 20-6. In any of the CW signaling system, the pulse signaling system, or the FMCW signaling system described above, the output signal from each of the receiving units 38-1, 38-2, . . . 38-6 is represented by a total distance R from the observation object 8 to the transmitting antenna 18 and the receiving antennas 20-1, 20-2, . . . 20-6 as follows.

[Math. 17]

$$f_{if}(R, n, t) = \exp\left(-j\omega_C\left(\frac{R_n + 2 \cdot \Delta L \cos \omega_0 t}{C}\right)\right) \quad (18)$$

It is noted that the following equation is satisfied.

$$R_n = R_T + R_{Rn} \quad \text{[Math. 18]}$$

In Eq. (18), n is an antenna number added to the receiving antennas 20-1, 20-2, . . . 20-6 and is 1 to 6.

When the vibration frequency is low and that the value thereof can be considered as a constant value within a repetition cycle PRT shown in A of FIG. 22, Eq. (18) can be transformed as follows.

[Math. 19]

$$f_{if}(R, n) = \exp\left(j\omega_C\left(-\frac{R_n + 2 \cdot \Delta L(t)}{C}\right)\right) \quad (19)$$

The output signals of the receiving units 38-1, 38-2, . . . 38-6 are subjected to a correlation process with a reference function by the signal processing unit 40. As a result, a signal component corresponding to an azimuth resolution is extracted by the signal processing unit 40.

The azimuth resolution can be obtained as follows. When the receiving antennas 20-1, 20-2, . . . 20-6 are arranged at equal distances d in a line, it is considered that an effect of d/2 exists at both ends. In this case, the receiving antennas 20-1, 20-2, . . . 20-6 have the following effective aperture size D.

$$D = 5 \times d + d \quad (20)$$

In the receiving antennas 20-1, 20-2, . . . 20-6 having the aperture size D as described above, when a wavelength of the transmission signal is λ, an expected azimuth resolution $\theta_{RES}$ is as follows.

$$\theta_{RES} = \lambda/D \quad (21)$$

When the transmitting antenna 18 and the receiving antennas 20-1, 20-2, . . . 20-6 each have an equal opening length and the opening length is $d_0$, an observation range $\theta_0$ is represented as follows.

$$\theta_0 = \lambda/d_0 \quad (22)$$

Sine a distance cannot be separated and identified in the CW signaling system, this is usable when only a single reflection point exists in one direction.

For a point on a fan-shaped line of the observation range $\theta_0$ at the distance $R_0$ from the center position of the receiving antennas 20-1, 20-2, . . . 20-6, a reference function g(R,n,θ) is generated on the basis of the azimuth resolution $\theta_{RES}$. This reference function g(R,n,θ) is represented as follows.

[Math. 20]

$$g(R, n, \theta) = \exp\left(-j\omega_C \frac{R_x(R, n, \theta)}{C}\right) \quad (23)$$

Rx(R,n,θ) represents a total distance from the transmitting antenna 18 to the n-th receiving antenna 20-n through a reflection point in a distance R and an azimuth θ.

By executing the correlation process between an intermediate frequency signal $f_{if}(R,n)$ and a conjugate function of the reference function g(R,n,θ), a signal h(R,θ) is extracted for each azimuth resolution. The signal h(R,θ) is represented as follows.

[Math. 21]

$$h(R, \theta) = \sum_n f_{if}(R, n) \cdot g^*(R, n, \theta) \quad (24)$$

When a target on the observation point of the observation object 8 is assumed, if a distance to this target is enough far compared to the aperture size D of deployed antennas, it is considered that the transmission signal wave to the target arrives from infinity. In this case, a reference function process can be replaced with simpler FFT. In general, this distance is a region referred to as a far field and is represented as follows when the aperture size of the deployed antennas is D and the wavelength is A.

[Math. 22]

$$R > \frac{2D^2}{\lambda} \quad (25)$$

Figure 24:
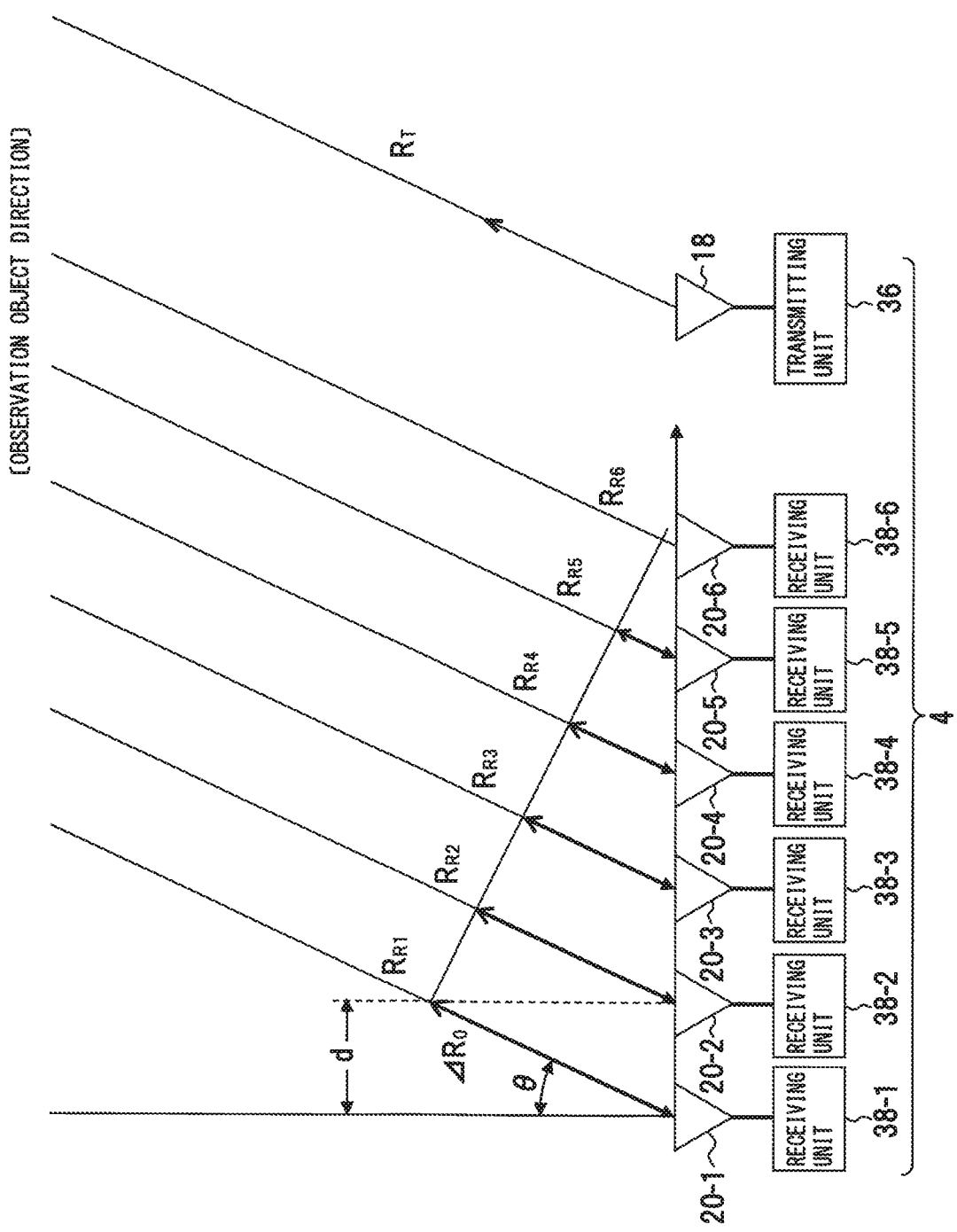
FIG. 24 is a diagram of a reception state of received waves.

In this case, as shown in FIG. 24, a phase difference between the antennas is irrelevant to the distance to the observation object 8 and is determined by an angle to the antenna plane of the receiving antennas 20-1, 20-2, . . . 20-6. By executing an FFT process for an intermediate frequency signal $f_{if}(n)$, a frequency component h(f) is converted into a signal of an azimuth direction. When the frequency of FFT output is f, the azimuth θ is as follows:

[Math. 23]

$$h(f) = \mathit{fft}(f_{if}(n)) \quad (26)$$

[Math. 24]

$$\theta = \sin^{-1}\left(\frac{f \cdot \lambda}{D}\right) \quad (27)$$

and, by analyzing signals of a certain direction including signals from the reflection body of the observation object 8 in time series, the vibration cycle and the vibration amplitude can be obtained as the vibration characteristics of the observation object 8.

<Form of Observation Object 8 and Vibration Observation Using Observation Device 4>

A form of the observation object 8 and the vibration observation will be described with reference to FIGS. 25, 26, and 27. FIG. 25 shows the case of targets A and B present on a gentle slope as two reflection points in azimuths A and B, respectively.

Figure 26:
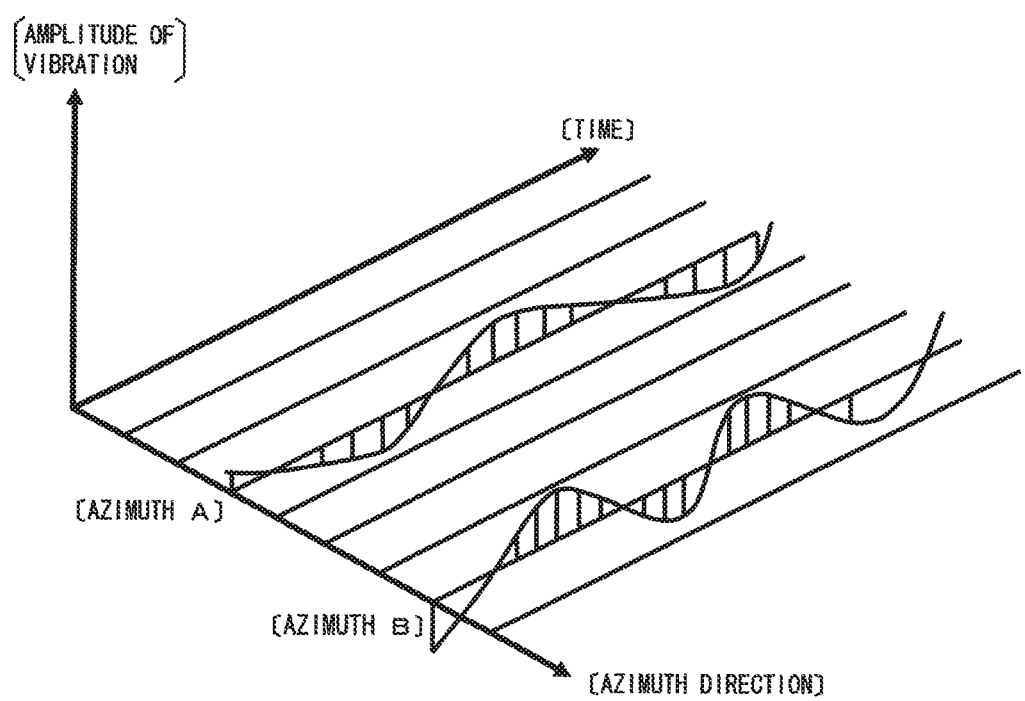
FIG. 26 is a diagram for explaining vibration observation output from CW-signaling-system one-dimensionally arranged receiving antennas.

FIG. 26 shows an example of using the observation device 4-1 of the CW signaling system to process a reception system output not including distance information by the signal processing unit 40. In this example, signal components of the azimuths A and B vary on the time axis due to the vibrations of the targets A, B.

Figure 27:
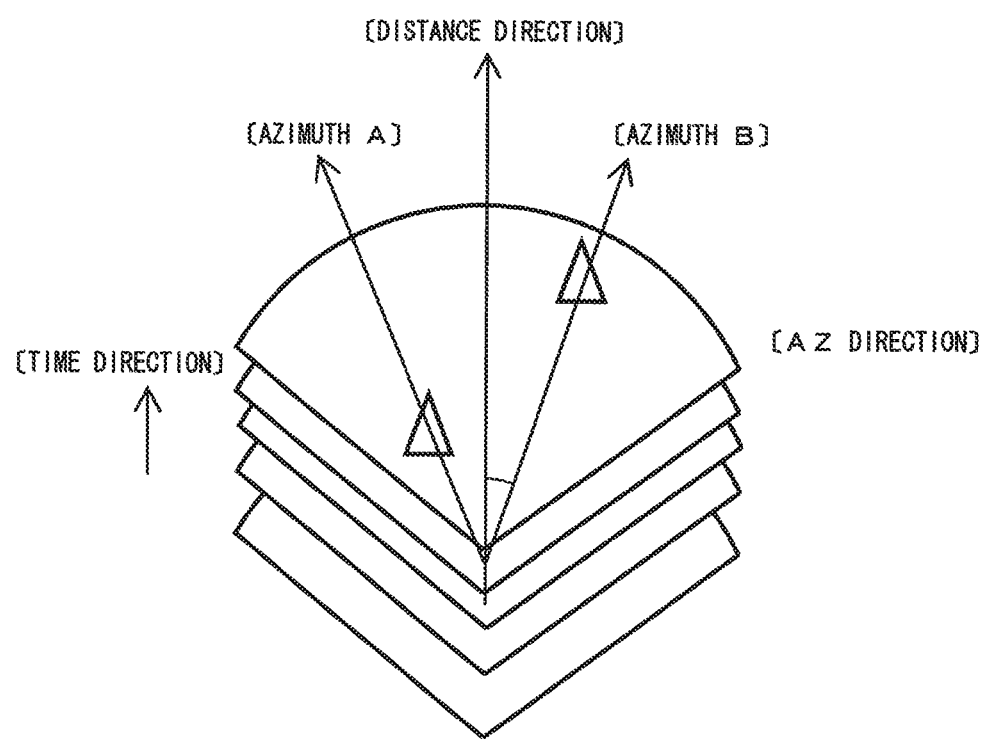
FIG. 27 is a diagram for explaining vibration observation output from pulse-signaling-system or FMCW-signaling-system one-dimensionally arranged receiving antennas.

FIG. 27 shows an example of observation of the targets shown in FIG. 25 with the receiving units 38-1, 38-2 . . . 38-$n$ of the pulse signaling system or the FMCW signaling system by using the one-dimensionally arranged receiving antenna 20$a$.

In this case, the targets A, B are mapped on a two-dimensional space of azimuth and distance for each observation and, if a repetition frequency of transmission and reception is equal to or greater than twice the vibration frequency of the targets A, B, the vibration characteristic of the observation object 8 can be observed through the analysis of the phase data including the vibration information of the targets A, B.

<Three-Dimensional Composition>

Figure 28:
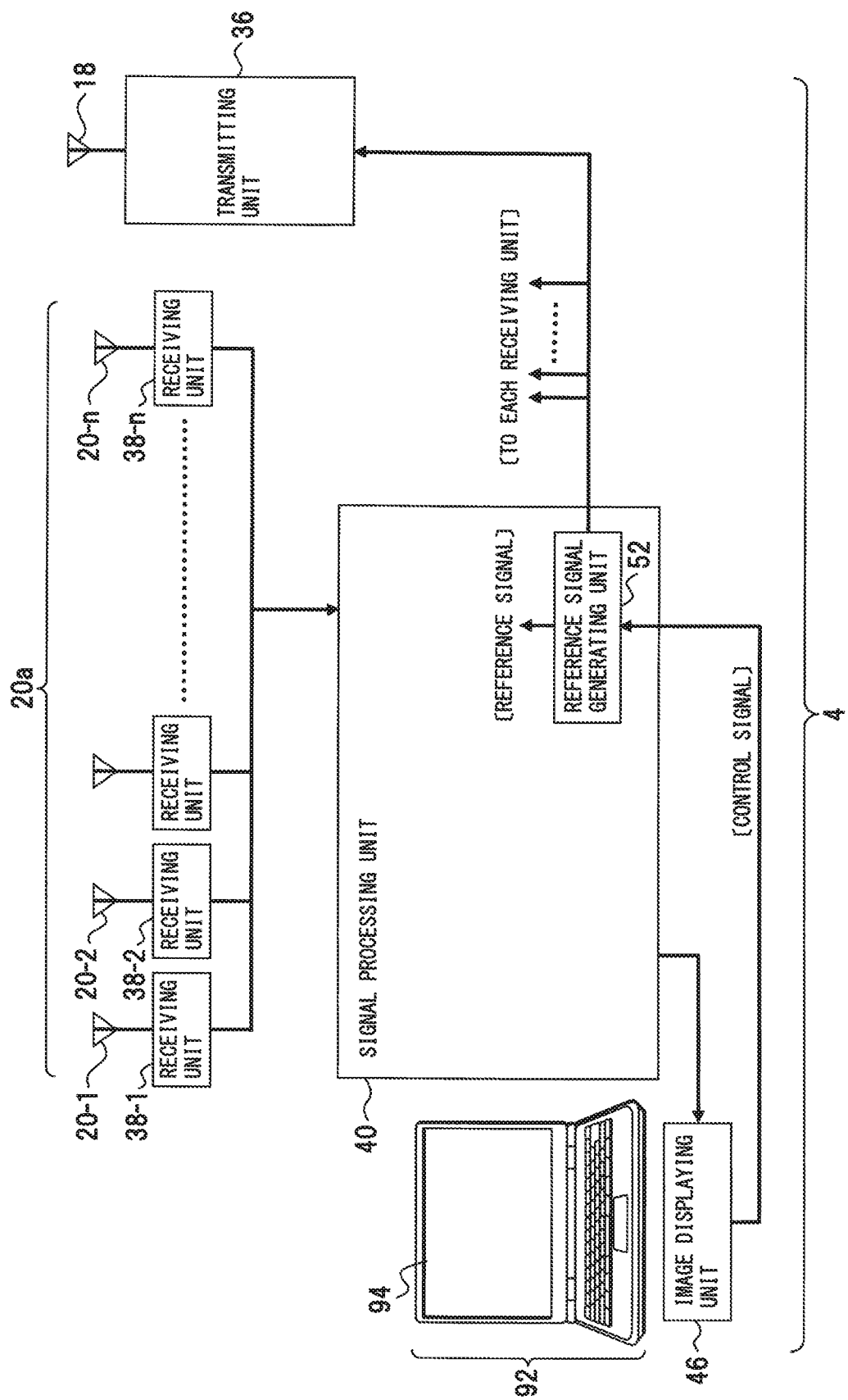
FIG. 28 is a diagram of Example 4 of the interferometric vibration observation device.

FIG. 28 shows an example of the observation device 4 using the one-dimensionally arranged receiving antenna 20$a$, and this observation device 4 may be any of the CW signaling system, the pulse signaling system, or the FMCW signaling system described above. In FIG. 28, the same portions as those of FIG. 12 are denoted by the same reference numerals. In this case, for example, a personal computer 92 is used for the image displaying unit 46 on the output side of the signal processing unit 40. A display 94 of the personal computer 92 displays an image generated from the observation signal. In this case, a control signal output from the image displaying unit 46 is applied to the reference signal generating unit 52 of the signal processing unit 40 and used for generation of the reference signal.

In the case of identifying a position in the height direction of the observation object 8 such as a large structure, the two-dimensionally arranged receiving antenna 20$b$ may be used for observation. The positions of individual structures in the observation object 8 can be identified by using an azimuth (hereinafter referred to as "AZ") angle and an elevation (hereinafter referred to as "EL") of the receiving antennas 20-1, 20-2, . . . 20-$n$.

Figure 29:
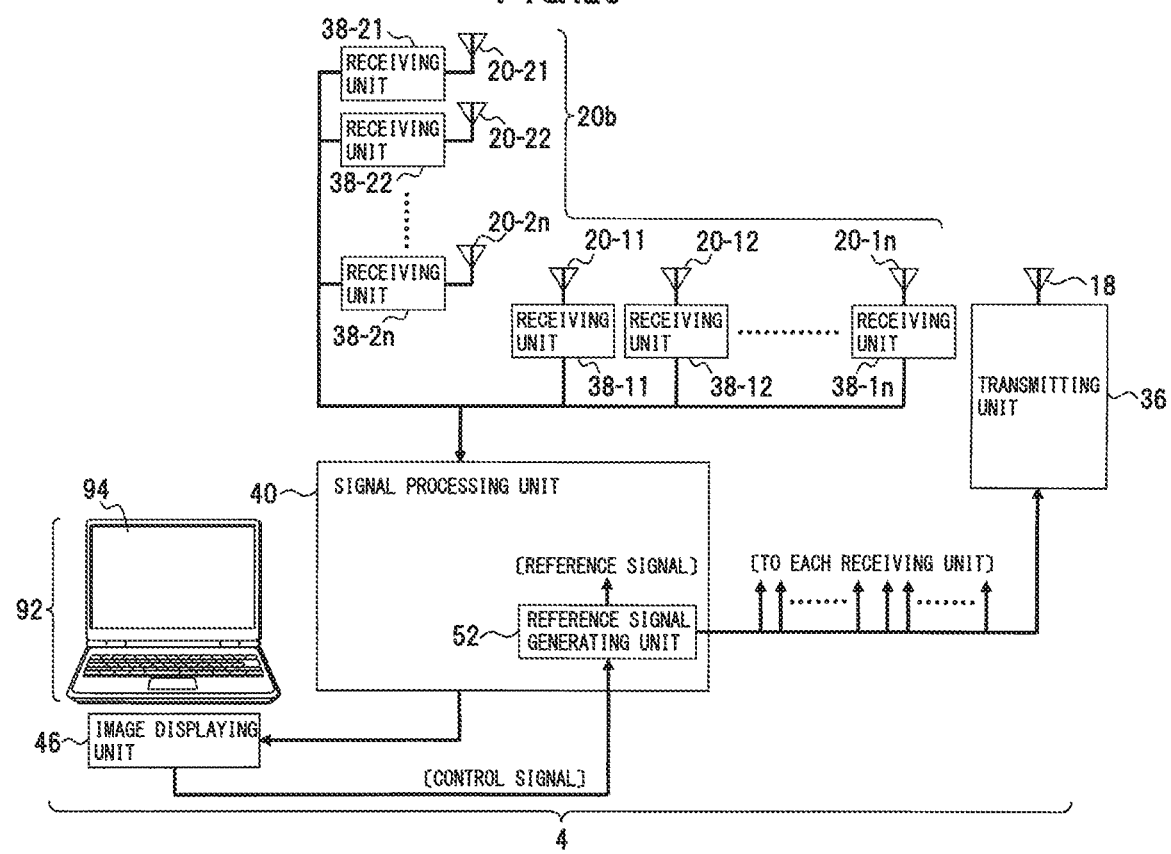
FIG. 29 is a diagram of Example 5 of the interferometric vibration observation device.

FIG. 29 is an example of the observation device 4 using the two-dimensionally arranged receiving antenna 20$b$ and this observation device 4 may be any of the CW signaling system, the pulse signaling system, or the FMCW signaling system described above. In FIG. 29, the same portions as those of FIG. 28 are denoted by the same reference numerals.

As shown in A of FIG. 30, the observation device 4 using the one-dimensionally arranged receiving antenna 20$a$ receives the receiving-unit output signals from the receiving units 38-1, 38-2, . . . 38-$n$ to perform setting depending on whether the observation object 8 is at a short distance or a long distance (S411). The reference function multiplication process is executed in the case of the short distance (S412) and the FFT process is executed in the case of the long distance (S413). The results of these processes are subjected to the vibration process (S414) and the imaging process is executed (S415). As a result, the vibration images of the observation object 8 and a certain position thereof are acquired.

In this case, the one-dimensionally arranged receiving antenna 20$a$ enables identification of the azimuth of the reflection wave from the observation object 8 from the reference function multiplication process (S412) or the FFT process (S413) of the reception signals. The transmitting unit 36 generates the transmission signal to the observation object 8 while the local signals for controlling the reception timing synchronous with the transmission signal are distributed to the receiving units 38-1, 38-2 . . . 38-$n$. Therefore, the reference signal generating unit 52 provides a synchronization signal to each of the transmitting unit 36, the receiving units 38-1, 38-2 . . . 38-$n$, and the units of the signal processing unit 40. The units of the signal processing unit 40 use the timing signal from the reference signal generating unit 52 as an input to perform reference function multiplication in the case of the short distance observation so as to identify the azimuths of the reflection waves Rw. In the case of the long distance observation, the FFT process is executed for frequency conversion of the receiving-unit output signals so as to identify the azimuths of the reflection waves Rw. Subsequently, the vibration process is executed to calculate the vibration characteristics at the points of the observation object 8.

As shown in B of FIG. 30, the observation device 4 using the two-dimensionally arranged receiving antenna 20$b$ uses the receiving-unit output signals output from receiving unit 38-11, 38-12, . . . 38-1$n$ and the receiving-unit output signals output from receiving units 38-21, 38-22, . . . 38-2$n$ to execute the two-dimensionality process (S421). In particular, if the two-dimensionally arranged receiving antenna 20$b$ is used, the output signals of the two-dimensional arrangement are generated by storing the output signals of the receiving antennas 20-21, 20-22, . . . 20-2$n$ placed in the vertical axis direction and the output signals of the receiving antennas 20-11, 20-12, . . . 20-1$n$ placed in the horizontal axis direction on a memory with two-dimensional addresses corresponding to the antenna positions. In this case, setting is performed depending on whether the observation object 8 is at a short distance or a long distance (S422). The reference function multiplication process is executed in the case of the short distance (S423) and the 2DFFT process is executed in the case of the long distance (S424). The dirty images acquired from these processes are subjected to the clean process (S425) followed by the vibration process (S426) and the imaging process is executed (S427). As a result, the vibration images of the observation object 8 and a certain position thereof are acquired.

In the two-dimensionally arranged receiving antenna 20$b$, as shown in FIG. 29, the antennas and the reception system are arranged in an L-shape. In this case, the antennas and the reception system may be arranged in a T-shape. In either case, a three-dimensional image of the observation object 8 can be generated.

The operation timings of the receiving units 38-11, 38-12, . . . 38-1$n$ and the receiving units 38-21, 38-22, . . . 38-2$n$ are controlled by using the reference signal generated by the reference signal generating unit 52 of the signal processing unit 40 as the local signal as is the case with the process described above. The signal processing unit 40 executes the two-dimensionality process for the identification of positions of the points of the observation object 8 and the vibration characteristic analysis.

In this case, since the transmission by the transmitting antenna 18 and the reception by the receiving antenna 20 are performed at the same clock time, the transmitting antenna 18 is separately installed from the receiving antennas 20 such that no interference occurs, so that no transmission signal directly reaches to the reception side. The azimuth resolution in an observation image is determined by a distance between the antennas located farthest from each other on the receiving antenna array 20 side. The observable view angle is determined by the antenna beam width of each antenna in the receiving antenna arrays 20.

Therefore, in the observation process using the two-dimensionally arranged receiving antenna 20b, by using the AZ angle and the EL angle determined by the reference function process or the two-dimensional FFT process and the distance information processed by the receiving units 38-11, 38-12, ... 38-16, 38-21, 38-22, ... 38-26, the phase history of the reflection wave from the identified position is subjected to the frequency analysis by the FFT process so as to acquire the vibration characteristics of the whole observation object 8.

It is assumed that the two-dimensionally arranged receiving antenna 20b has the six receiving antennas 20-11, 20-12, ... 20-16 in the horizontal axis direction and the six receiving antennas 20-21, 20-22, ... 20-26 in the vertical axis direction arranged in an inverted T-shape.

If the receiving-unit output signals of the receiving units 38-11, 38-12, ... 38-16, 38-21, 38-22, ... 38-26 in this case are made two-dimensional, an output signal at a lattice point (n,m) is generated as in B of FIG. 35 described later, for example.

The output signal in this case represents a signal strength and a phase in a certain range after range compression in the pulse system or the FMCW signaling system and represents a phase plane of the reflection wave, forming a kind of a hologram. The number of lattice points is the product of the number of the vertical installed lattice points and the number of the horizontal installed lattice points of the receiving antennas 20-11, 20-12, ... 20-16, 20-21, 20-22, ... 20-26.

In the two-dimensionally arranged receiving antenna 20b, the output of the receiving units 38-11, 38-12, ... 38-16 of the receiving antenna array in the horizontal axis direction is denoted by $h_{AZ}$, $h_{EL}$, and the output of the receiving units 38-21, 38-22, ... 38-26 of the receiving antenna array in the vertical axis direction is denoted by $h_{EL}(R,m,t)$. In this case, n and m are antenna numbers in the horizontal axis direction and the vertical axis direction, respectively, and R is a distance between the observation object 8 and the antennas. The two-dimensionality output h(m,n,R,t) is as follows.

$$h(m,n,R,t) = h_{AZ}(R,m_0,n,t) + h_{EL}(R,m,n_0,t) \quad (28)$$

where $n_0$ and $m_0$ are a horizontal position of a vertical-direction antenna and a vertical position of a horizontal-direction antenna, respectively.

A reference function for processing this two-dimensional data is a phase function obtained from distance from a target position to antennas of the two-dimensional antenna arrangement.

[Math. 25]
$$g_{AZ}(R,n,\theta) = \exp\left(-j\omega_C \frac{R_x(R,n,\theta)}{C}\right) \quad (29)$$

[Math. 26]
$$g_{EL}(R,m,\phi) = \exp\left(-j\omega_C \frac{R_x(R,m,\phi)}{C}\right) \quad (30)$$

[Math. 27]
$$g(R,m,n,\phi,\theta) = \exp\left(-j\omega_C\left(\frac{R_x(R,m,\phi)}{C} + \frac{R_x(R,n,\theta)}{C}\right)\right) \quad (31)$$

By obtaining a conjugate function of the reference function and a complex-multiplying sum of the reception signals subjected to the two-dimensionality process and by removing a pseudo image by the clean process, a condition of a target can be analyzed in a certain direction at a certain distance.

[Math. 28]
$$h(R,\theta,\phi,t) = \sum_{m,n} h(m,n,R,t) \cdot g^*(R,m,n,\phi,\theta) \quad (32)$$

As is the case with the one-dimensional process, if the observation object 8 is at a long distance, the two-dimensional FFT process (2DFFT) can be executed to identify the direction of the target.

<Vibration Analysis>

Figure 32:
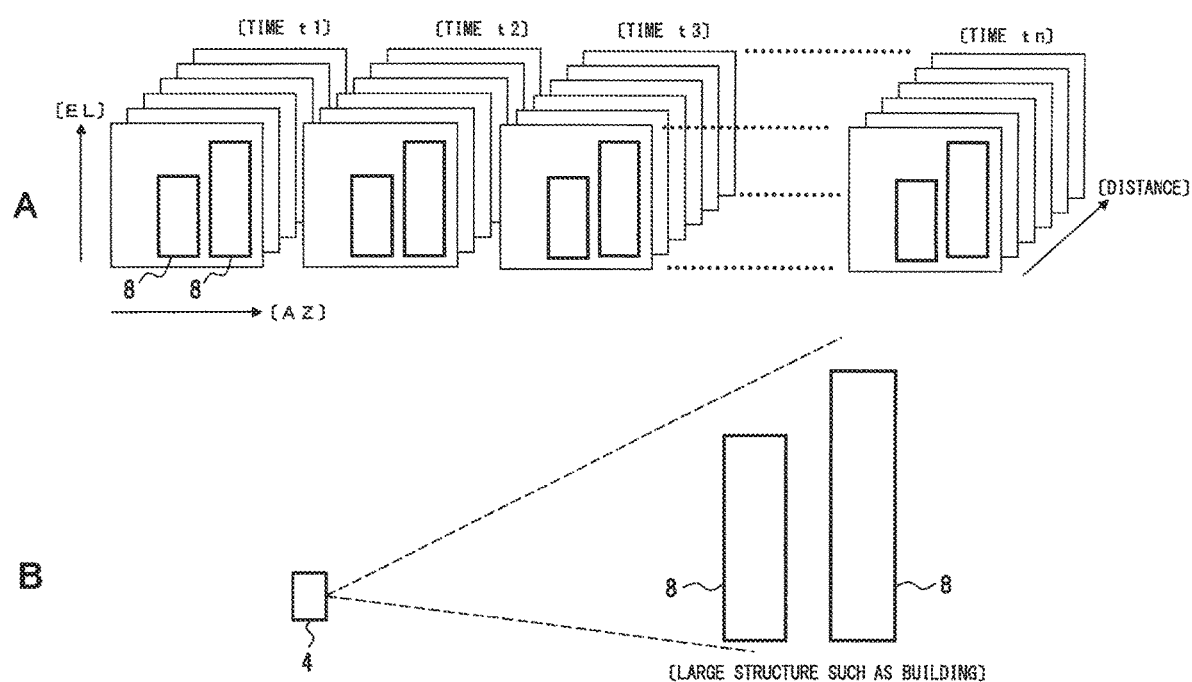
FIG. 32 is a diagram for explaining an observation form of an observation object of a three-dimensional arrangement.

FIG. 32 shows a vibration analysis example in the case of using the two-dimensionally arranged receiving antenna 20b in the observation device 4 of the pulse system or the FMCW signaling system.

In this case, a signal from a target represented by an amplitude and a phase of a reflection signal is recorded along with three-dimensional position information of azimuth, EL, and distance for each observation. By analyzing the amplitude phase information of the targets in time series, a minute displacement, a shaking, and a vibration of an arbitrary position within an observation range can be measured.

To analyze vibration at an arbitrary point of the observation object 8 such as a large structure, the two-dimensionally arranged receiving antenna 20b described above is used. The vibration characteristics of the whole observation object 8 can be obtained by executing the FFT process of the phase history of the reflection waves from all the points of the individual structures in the observation object 8 and performing the frequency analysis.

<Image Display>

Figure 33:
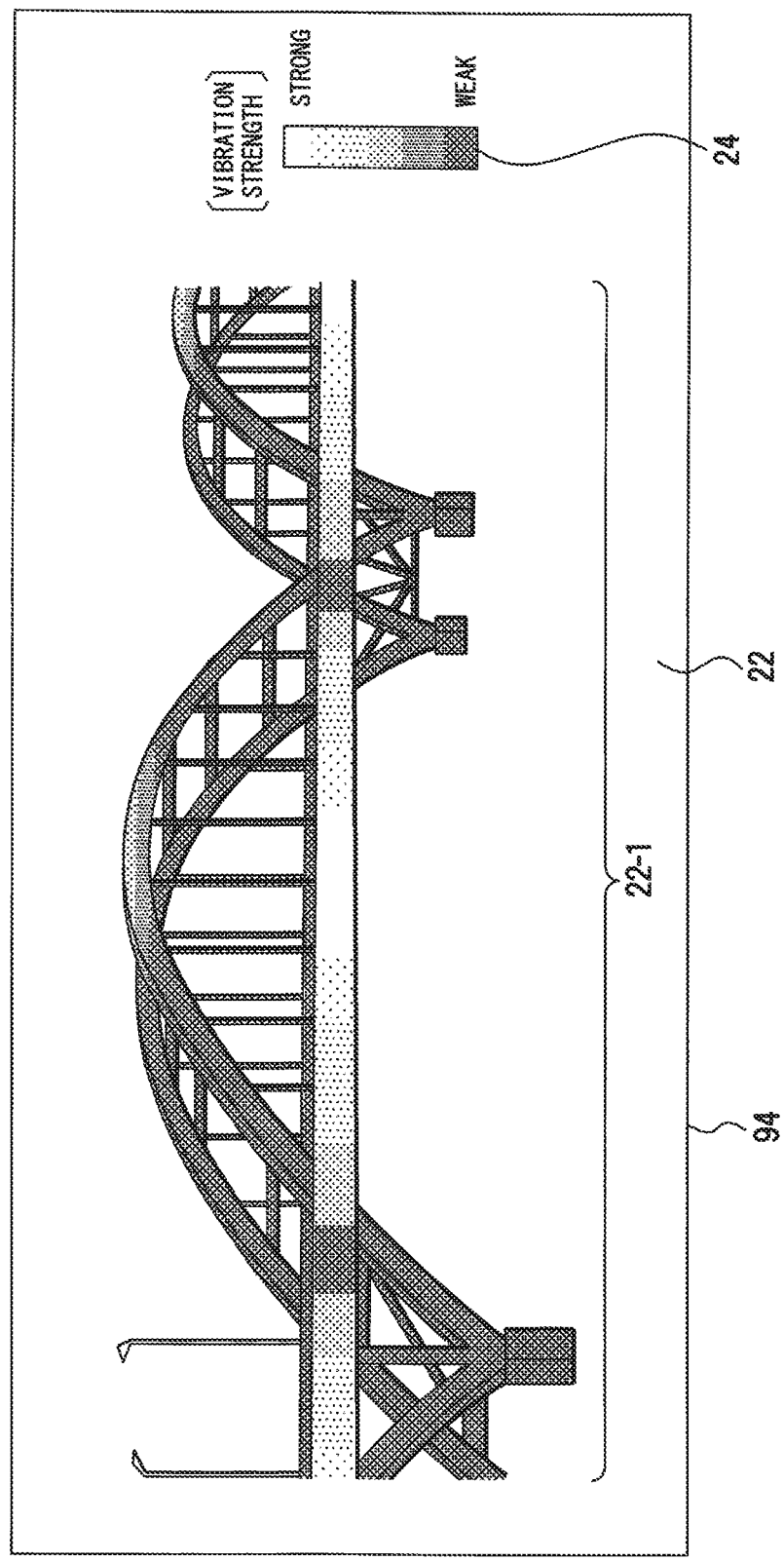
FIG. 33 is a diagram of a display image generated by an image displaying unit.

FIG. 33 shows an example of observation image display. The image 22 generated from the observation data of the signal processing unit 40 is displayed on the display 94 of the personal computer 92 described above. This image 22 includes the bridge image 22-1 representative of the bridge included in the observation data and the vibration image representative of vibration. The vibration of the vibration image is represented by a gray scale, and the vibration strength scale 24 is displayed as a gray scale for visually comparing and recognizing this vibration state. The gradation condition of the bridge image 22-1 represents a vibration strength distribution of the portions of the bridge by the image. In this example, a dark portion of the gradation represents that the observed vibration is weak, and a pale portion represents that the observed vibration is strong. From the image 22 as described above, the shape of the observation object 8 is visualized along with a vibration form and a displacement of the observation object 8 and a certain site thereof through the gray scale display and, in this example, the vibration form can visually be recognized from a gradation state.

<Range Compression>

Figure 34:
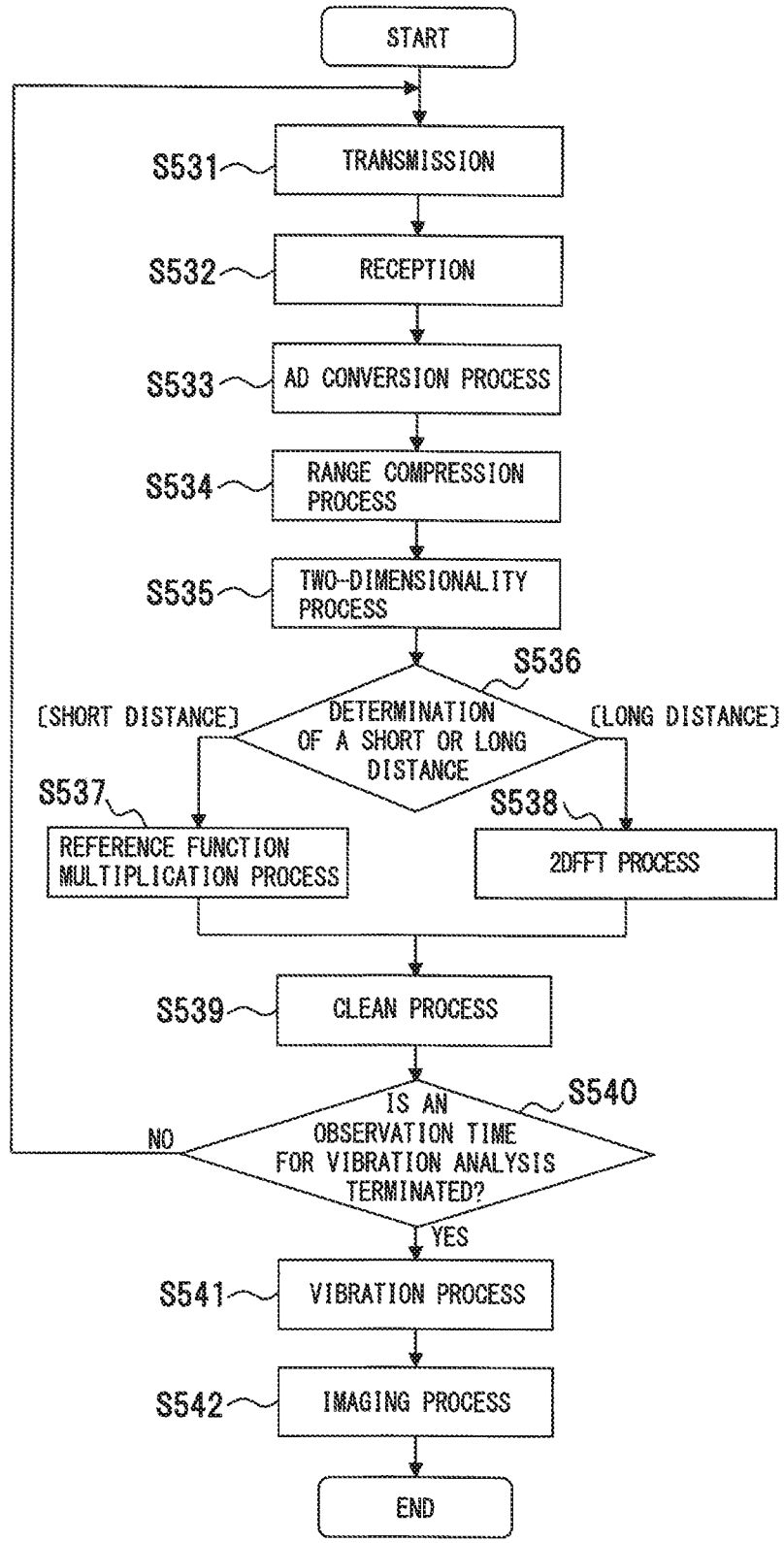
FIG. 34 is a flowchart of a modification example of the signal process.

FIG. 34 shows an example of a process procedure including the range compression process described above. In this process procedure, as is the case with the process procedure shown in A of FIG. 15, after the processes of transmission (S531) and reception (S532), an analog/digital (AD) conversion process is executed for the reception signals (S533). After this AD conversion process, a range compression process is executed (S534). This range compression process is followed by the execution of the two-dimensionality process (S535), the determination of short distance/long distance (S536), the reference function multiplication process in the case of the short distance (S537), the 2DFFT process in the case of the long distance (S538), the clean process (S539), the determination of the observation time (S540), the vibration process (S541), and the imaging process (S542). These processes are the same as the processes described above (FIG. 15), and the observation device 4 using the one-dimensionally arranged receiving antenna 20a may not include the two-dimensionality process (S535) and the clean process.

<Reference Function>

Figure 31:
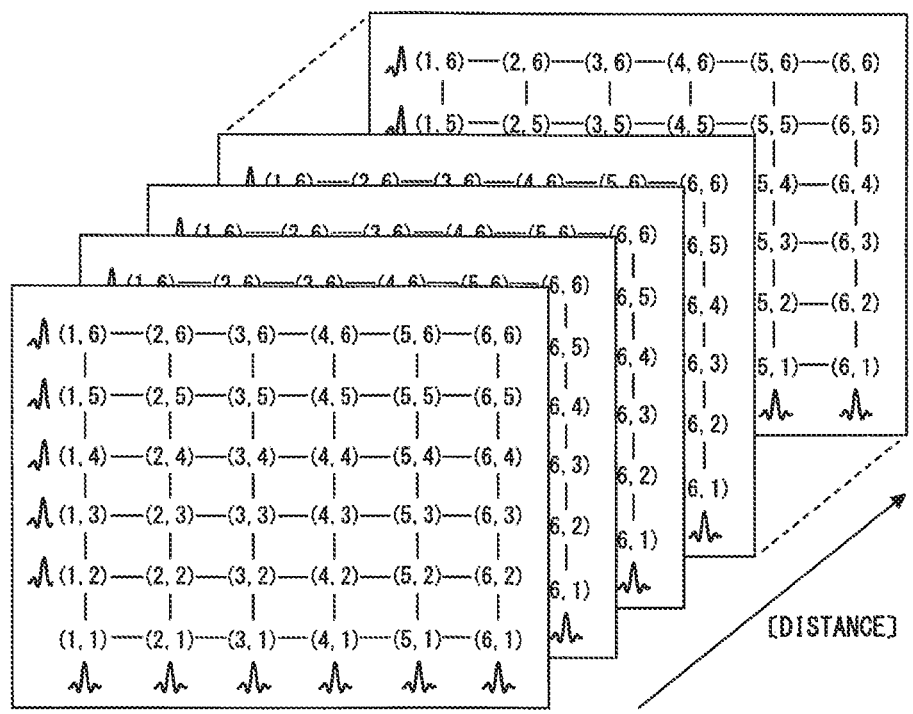
FIG. 31 is a diagram for explaining two-dimensionality process output.

When the lattice points shown in FIG. 31 are target positions to be measured, the reference function is an output signal of a reception system when the reflection from the lattice points is received. When the distance measurement is performed by the pulse system, the FMCW system, etc., a signal corresponding to the range of the target position after the range compression serves as the reference function. For example, if six antennas are horizontally arranged and six antennas are vertically arranged, the reference function for processing the target at one point is made up of 12 data of certain range outputs including the target out of the antenna outputs. When a target area to be imaged is 100 m in horizontal length (in the azimuth direction), 50 m in vertical length (in the elevation angle direction), and 90 m in depth (in the distance direction), the number of data of the reference function for processing an image with 1 m pixel intervals is 100 (horizontal)×50 (vertical)×90 (distance)×12 (the number of data).

In an arithmetic operation process of this reference function, an output image of each lattice point of an output image area can be acquired by multiplying the generated reference function and one of the output signals from the two-dimensionality process. However, if a large number of pseudo images are included in an image of this stage, the pseudo images may be removed by the clean process to extract a true image.

If the observation object 8 is at a long distance, after the two-dimensional FFT process of the output signal from the two-dimensionality process by the two-dimensional FFT process (2DFFT), the clean process is executed in the same way. As a result, the position of the output signal from the observation object 8 is identified.

<Example of Vibration Observation Using Two-Dimensional Antenna Arrangement>

A and B of FIG. 35 show an example of a process system of vibration observation using the two-dimensional antenna arrangement. In this process system, as shown in A of FIG. 35, a transmission wave Tm is transmitted from the observation device 4 to the observation object 8, for example, the bridge 8-3, and the reflection wave Rm acquired from the bridge 8-3 is received by the receiving unit group 38 of the observation device 4. This system is the same as the first embodiment to the fifth embodiment. In this embodiment, the receiving antenna 20 has a plurality of receiving antennas arranged in a T-shape. Receiving antennas 20-31, 20-32 ... 20-3n are arranged in the horizontal direction, and receiving antennas 20-41, 20-42 ... 20-4n are arranged in the vertical direction.

In this embodiment, the observation device 4 generates the reception data at the lattice points (m×n) shown in B of FIG. 35 by using H-arrangement reception signals and V-arrangement reception signals so as to turn the reception signals into two-dimensional information. A lattice point without an antenna is set to zero. In a short-distance process, since the reference function is also turned into two-dimensional information, (m×n) data are generated as is the case with the two-dimensionality process.

Figure 36:
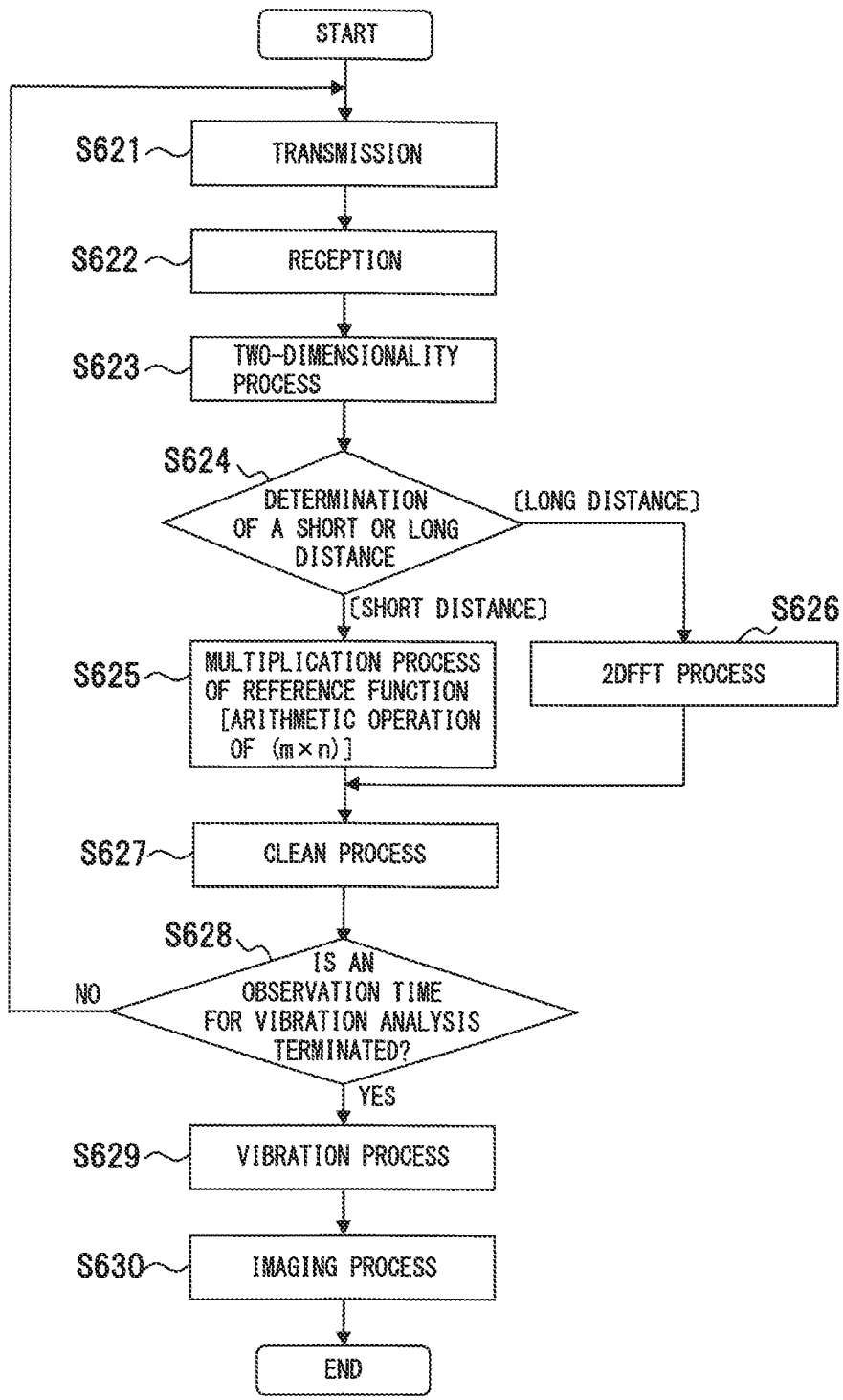
FIG. 36 is a flowchart of an example of a simplified process procedure.

FIG. 36 shows an example of a process procedure of this example. In this process procedure, the reception data may be present only on the T-shaped lattice points in the processes except the two-dimensionality process of the embodiments described above. In this case, the reference function may be generated only on the T-shaped lattice points as is the case with the reception data and the multiplication process of the reference function may be executed with the reception data.

In this process procedure, transmission (S621) and reception (S622) is followed by the two-dimensionality process (S623). The transmission (S621) and the reception (S622) are described in the above embodiments and therefore will not be described.

After the two-dimensionality process (S623), the reception signals are correlated with the two-dimensional lattice points corresponding to the reception positions of the antennas. Subsequently, a determination is made on whether a short distance or a long distance (S624), and the arithmetic operation process of the reference function is executed in the case of the short distance (S625), while the 2DFFT process is executed in the case of the long distance (S626).

In the arithmetic operation process of the reference function (S625), the m×n reference function multiplication described above is performed. After going through the process of S625 or S626, the clean process (S627) is executed, and a determination is made on whether the observation time for the vibration analysis is terminated (S628). If the observation time is not terminated (NO at S628), the processes of S621 to S628 are continuously executed until the observation time is terminated.

When the observation time is terminated (YES at S628), the vibration process (S629) and the imaging process (S630) are executed and this process is terminated.

The process procedure as described above can significantly reduce the generation of the reference function and the multiplication process of the reference function in the arithmetic operation amount, while the process accuracy and performance are the same as the embodiments.

Characteristic Points and Effects of Third Embodiment

The third embodiment produces any of the following effects.

(1) The shape of the two- or three-dimensionally spreading observation object 8 can be imaged and, at the same time, minute vibrations in the whole object and a vibration cycle thereof can remotely be measured with a radar technique without contact.

(2) The observation device 4 and the signal process thereof enables measurement of vibration characteristics of a large construction such as a bridge, a building, or an elevated road due to traffic, weather, noise etc., and can provide information for determining the change in strength and the necessity of maintenance of the structure.

(3) The device has the one transmitting unit 36 transmitting a signal toward the observation object, a plurality of the receiving units 38-1, 38-2, . . . 38-*n* receiving the reflection wave Rw reflected by the observation object 8, the signal processing unit 40 imaging a received signal and calculating the planar vibration characteristics of the observation object 8, and the image displaying unit 46 displaying a measurement result.

(4) If a two-dimensionally developed structure is mainly measured and the receiving antennas are two-dimensionally arranged, an object point can be identified by an azimuth and an elevation angle, or an azimuth, an elevation angle, and a distance; the vibration and displacement of the observation objects 8 such as structures spreading in the height direction including a high-rise building, a bridge, or an elevated road can be measured; and the measurement result can be visualized.

(5) If the transmission signal is a pulse wave or an FMCW signal wave, the range compression process can be executed for classification based on a distance of a reflection point. The direction of the objection point can be classified from the phase between the receiving antennas; the reflection strength of the object point can be imaged for each direction and distance; and minute variation and vibration can be detected and imaged from a phase change in signals from the object point.

(6) If the observation object 8 is at a short distance, the reference function arithmetic operation can be performed to calculate a reflection strength and a phase of the object point and, if the observation object 8 is at a long distance, FFT can be performed to acquire the strength of the reflection wave and phase information. In the case of the antenna arrangement generating pseudo images, the clean process described above may be executed, so that the pseudo images can be suppressed.

(7) If the transmission signal is a CW wave, the receiving units use the same signal as the transmission wave as a local signal to acquire an output signal (IQ) including a reflection strength and azimuth information of a target. If the transmission signal is a pulse wave, the receiving unit output is shifted by a delay time of propagation to the object point to acquire an output signal (IQ) corresponding to a phase difference of the transmission wave including a reflection strength and azimuth information of a target.

(8) If the transmission signal is an FMCW signal, the reception signal is frequency-converted by using the transmission signal as local into a frequency component corresponding to a propagation delay. This component signal is converted by the FFT process of the signal processing unit 40 into the frequency domain to acquire an output signal (IQ) including azimuth information corresponding to a phase difference between the reflection strength of the object point and the transmission wave at each distance.

(9) If the observation object 8 is at a short distance, the signal processing unit 40 generates the reference function and executes the multiplication process with the reception signal. This reference function is generated by estimating a phase displacement corresponding to the distance and the AZ angle of the observation object 8. Depending on the correlation arithmetic operation between the reference function and the receiving-unit output signals as well as the antenna arrangement, the position of the observation object 8 is identified by the clean process; the reception signals from the identified observation points are collected in time series as the vibration characteristics of the point; and the frequency characteristics are obtained by the FFT process.

(10) If the observation object 8 is at a long distance, the signal processing unit 40 can first execute the two-dimensionality process of the receiving-unit output signals, then perform the FFT arithmetic operation of the time-series reception signals reflected from the points of the observation object, execute the clean process depending on the antenna arrangement to identify the position of the observation object and the reflection signal, and analyze a frequency of the reflection signal of a certain position so as to calculate the vibration characteristics of the point.

(11) On an image generated from the observation signal generated by the signal processing unit 40, the image displaying unit 46 can overlap and image the vibration characteristics of the points of the observation object calculated also by the signal processing unit 40, and therefore can visualize the overall vibration condition of the observation object 8.

(12) Unlike a conventional vibration meter using a micro wave signal, the shape of the whole structure can be imaged, and the vibrating points and the vibration characteristics of the structure can be imaged and displayed on the image, without attaching a reflector to the observation object 8. Therefore, the vibrating condition of the whole structure can be comprehended and the maintenance management of the structure can quickly and accurately be provided.

(13) The distance information is obtained from multiplication by the reference function in the case of a short distance and obtained from the conversion of the reception signal into the frequency domain by FFT in the case of a long distance. In the pulse system, or the FMCW signaling system, the distance information is obtained by executing the range compression process. By applying the transmission wave to the whole of the observation object 8 without scanning of the beam of the transmitting antenna and by performing the digital beam forming of the reflection wave acquired from the receiving antennas, a high-resolution image and vibration measurement can be imaged at regular time intervals.

(14) The positions of the points of the observation object 8 can easily be obtained from the multiplication of the reception signal and the reference function in the case of a short distance and from the conversion of the reception signal into the frequency domain by the FFT arithmetic operation in the case of a long distance. A pseudo image generated depending on the antenna arrangement can be removed by the clean process.

(15) The vibration characteristics of the points of the observation object 8 can easily obtained by collecting in time series, frequency-converting, and analyzing the reflection waves from the identified observation positions.

(16) The whole of the observation object 8 can be captured as an image without attaching a radar reflector to the observation object 8, and the vibration characteristics of the whole structure can easily be imaged by frequency analysis of received information observed in time series.

(17) The vibrations generated not only by a certain portion of the observation object 8 but also by the whole observation object due to traffic or weather can be measured without attaching a reflector to the observation object 8 in a completely contactless manner. The third embodiment can be utilized for maintenance and management including measures against aging of facilities such as a large bridge, an elevated road.

Fourth Embodiment

As shown in FIG. 14, the signal processing unit 40 of the third embodiment includes the processor 48 etc. so as to use the information processing by a computer for the vibration observation. In contrast, the signal processing unit 40 may implement the above functions of achieving the vibration observation by hardware.

Figure 37:
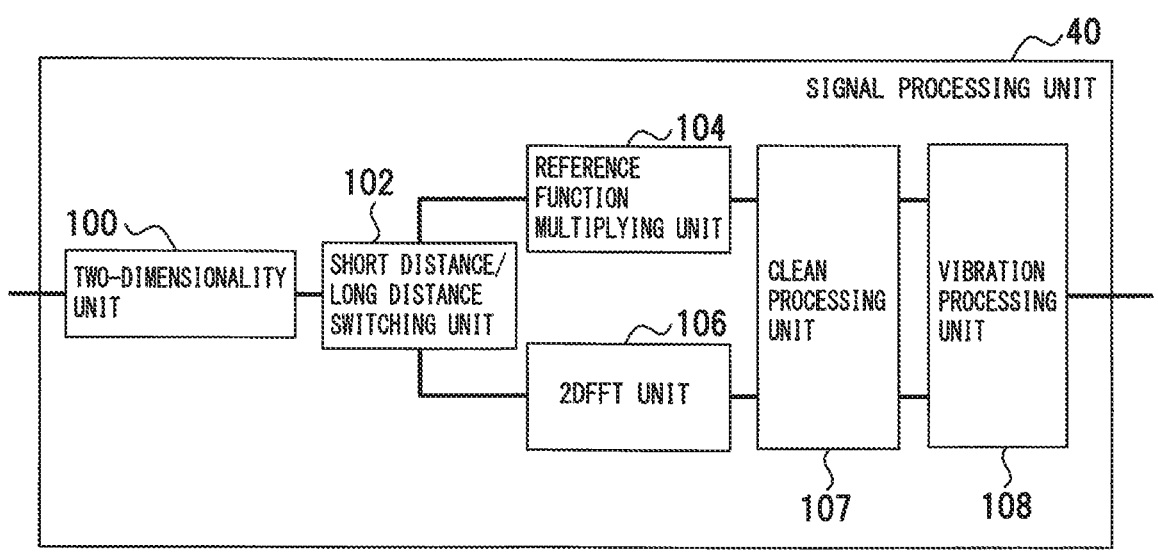
FIG. 37 is a diagram of a configuration example of a signal processing unit according to a fourth embodiment.

FIG. 37 shows an example of hardware of the signal processing unit 40 according to a fourth embodiment. The signal processing unit 40 shown in FIG. 37 includes a two-dimensionality unit 100, a short distance/long distance switching unit 102, a reference function multiplying unit 104, a 2DFFT unit 106, a clean processing unit 107, and a vibration processing unit 108 made up of hardware. The functions of the two-dimensionality unit 100, the short distance/long distance switching unit 102, the reference function multiplying unit 104, the 2DFFT unit 106, and the vibration processing unit 108 are achieved by implementing the above processes by hardware, and the details thereof are not changed and therefore will not be described. This example corresponds to the two-dimensional arranged antenna 20b described above and, if this example is applied to the one-dimensionally arranged antenna 20a described above, the two-dimensionality unit 100 may not be included.

Effect of Fourth Embodiment

According to a fourth embodiment, the observation image and the vibration image can be implemented by direct processes of hardware instead of the information processes of computer processing.

Fifth Embodiment

In a fifth embodiment, the observation device 4 of the CW signaling system, the pulse signaling system, or the FMCW signaling system will be described in detail. The observation device 4 may be configured as any of the CW signaling system, the pulse signaling system, or the FMCW signaling system, or the vibration observation according to all these systems may be enabled.

Figure 38:
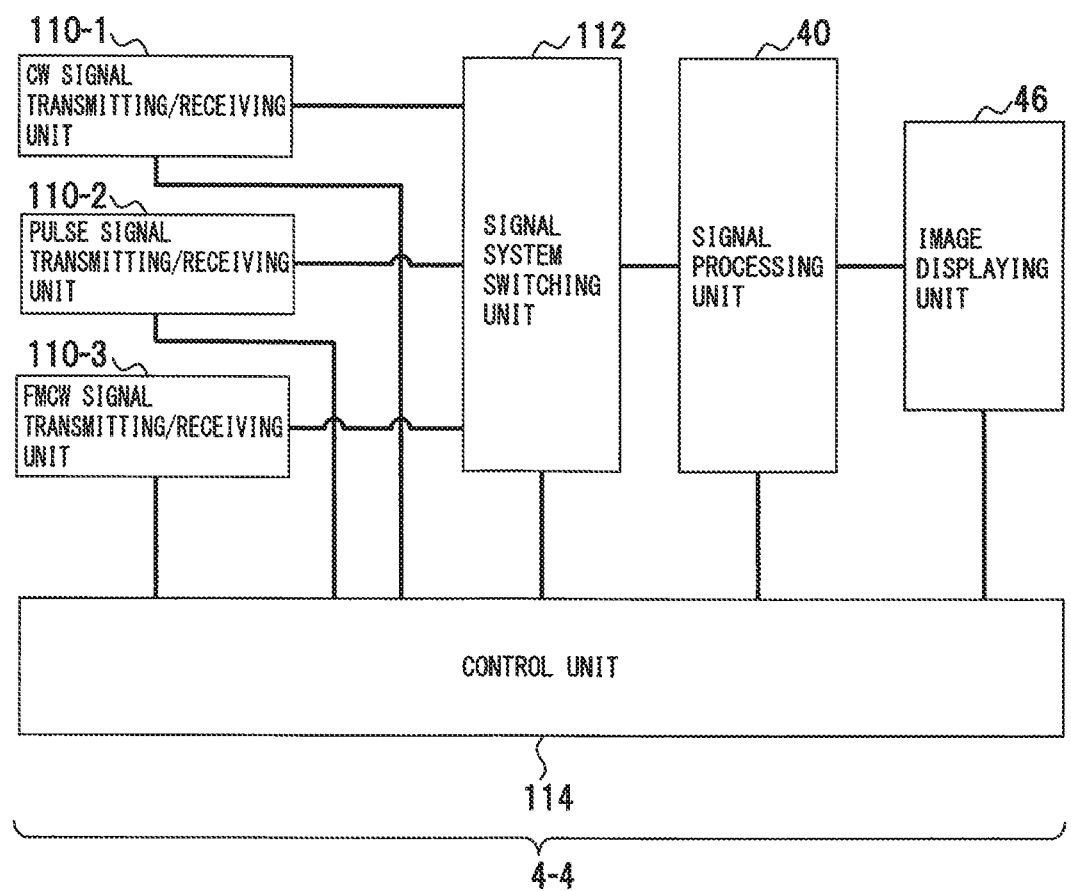
FIG. 38 is a diagram of a configuration example of an interferometric vibration observation device according to a fifth embodiment.

FIG. 38 shows an observation device 4-4 enabled to perform the vibration observation in the CW signaling system, the pulse signaling system, or the FMCW signaling system. In FIG. 38, the same portions as the embodiments are denoted by the same reference numerals.

The observation device 4-4 includes a CW signal transmitting/receiving unit 110-1, a pulse signal transmitting/receiving unit 110-2, an FMCW signal transmitting/receiving unit 110-3, a signal system switching unit 112, and a control unit 114.

The CW signal transmitting/receiving unit 110-1 performs transmission/reception in the CW signaling system as exemplarily illustrated in FIG. 16. The pulse signal transmitting/receiving unit 110-2 performs transmission/reception in the pulse signaling system as exemplarily illustrated in FIG. 18. The FMCW signal transmitting/receiving unit 110-3 performs transmission/reception in the FMCW signaling system as exemplarily illustrated in FIG. 21.

The signal system switching unit 112 receives a reception signal from the CW signal transmitting/receiving unit 110-1 in the case of the CW signaling system, receives a reception signal from the pulse signal transmitting/receiving unit 110-2 in the case of pulse signaling system, and receives a reception signal from the FMCW signal transmitting/receiving unit 110-3 in the case of the FMCW signaling system. The signal system switching unit 112 selects and provides these reception signals to the signal processing unit 40.

The signal processing unit 40 executes a signal process for the vibration observation by the CW signaling system, the pulse signaling system, or the FMCW signaling system.

The image displaying unit 46 displays an indication representative of the CW signaling system, the pulse signaling system, or the FMCW signaling system, receives an observation signal that is a process result of the signal processing unit 40, and displays an image of the CW signaling system, the pulse signaling system, or the FMCW signaling system.

The control unit 114 supports modes of the CW signaling system, the pulse signaling system, or the FMCW signaling system, operates any of the CW signal transmitting/receiving unit 110-1, the pulse signal transmitting/receiving unit 110-2, and the FMCW signal transmitting/receiving unit 110-3 in accordance with a selected mode, and selects the signal switching of the signal system switching unit 112 and the process of the signal processing unit 40. The control unit 114 may be made up of a computer.

Effects of Fifth Embodiment (1) According to the fifth embodiment, the modes of the CW signaling system, the pulse signaling system, or the FMCW signaling system can selectively be utilized to generate a desired observation image.

(2) The modes of the CW signaling system, the pulse signaling system, or the FMCW signaling system can be selected in accordance with an observation condition of the observation object 8 etc., and the observation accuracy can be increased by selecting the optimum signaling system without being affected by the observation condition.

Sixth Embodiment

FIG. 39 shows an application example of the vibration observation system 2.

In this application example, the vibration observation system 2 is utilized as a voice monitor system for contents of a conversation or a telephone call in a remote place. Although sound waves cannot be observed with radio waves, the sound waves are monitored through the medium of the vibration observation of the vibration observation system 2.

As shown in FIG. 39, an arbitrary living room in a structure is selected as the observation object 8 for monitoring a sound. The observation device 4 mounted on the platform 6 is installed outside the observation object 8.

It is assumed that, for example, a resident in the living room is talking on the phone, the sound waves emitted by the resident cause a table 8-101, a vase 8-102, a TV 8-103, a sofa 8-104, a wardrobe 8-105, tableware, etc. placed therearound to slightly vibrate due to the sound waves in accordance with the frequency of the sound waves.

By transmitting radio waves from the observation device 4 outside the living room and receiving the reflection waves thereof, the vibrations can remotely be detected from the reception signal, and the vibration analysis thereof enables the detection of the conversation and the vibrating condition of the observation object. According to this configuration, by receiving the reflection waves from a long distance or a space partitioned by walls making it unable to recognize a conversation as sound waves by the auditory sense, the conversation and the condition of the observation object 8 can be monitored as vibrations.

If the platform 6 equipped with the observation device 4 is vibrating, a fixed point considered as not vibrating can be set and the vibration component of the fixed point can be subtracted from the observation data to correctly monitor the sound.

Other Embodiments a) Although the CW signaling system, the pulse signaling system, or the FMCW signaling system is exemplified as the signaling system in the embodiments described above, other signals may be used.

b) Although a structure is exemplified as an observation object, the present invention may be utilized for monitoring an intruder etc.

c) Although the reference signal generating unit 52 is included inside the signal processing unit 40 in the embodiments, this is not a limitation of the present invention. The reference signal generating unit 52 may be included outside the signal processing unit 40 and the reference signal generated by the reference signal generating unit 52 may be provided to the signal processing unit 40, the transmitting unit 36, or the receiving units 38-1, 38-2 . . . 38-*n*.

d) The observation device 4 according to the second embodiment is not limited to being installed on the vibrating platform 6 according to the first embodiment. It is needless to say that the observation device 4 installed on a platform without vibration can perform the vibration observation.

e) Although the vibrating platform 6 is exemplified by a mobile object or a flying object such as a helicopter in the embodiments, the platform may be a fixed object such as a crane as long as the object is accompanied by a vibration, and is not limited to the platform of the embodiments.

Aspects of interferometric vibration observation devices, recording mediums, vibration observation methods and vibration observation systems extracted from the embodiments described above are as follows.

An aspect of an interferometric vibration observation device may include a transmitting means transmitting a transmission signal from a transmitting antenna toward an observation object; a receiving means receiving a reflection wave from the observation object with a plurality of receiving antennas and generating a reception signal for each of the receiving antennas; and a signal processing means obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of a vibration of the observation object or a certain site of the observation object.

The interferometric vibration observation device may further include an image displaying means displaying an image representative of the observation object from the observation signal; the interferometric vibration observation device may generate the image from the observation signal, superimpose an image representative of a vibration distribution in the observation object on an image of the whole of the observation object and display the image representative of the vibration distribution on the image displaying means.

The interferometric vibration observation device may further include a signal generating means generating a reference signal synchronizing the transmission signal of the transmitting means, the reception signals of the receiving means, and the signal process of the signal processing means in the signal processing means or outside the signal processing means.

In the interferometric vibration observation device, the transmitting means may output a pulse signal for detecting the observation object or a distance on the observation object, or a pulse signal chirp-modulated for pulse compression, and the receiving means may perform the pulse compression of the reception signals in phase-synchronization with the reference signal to separate the certain site of the observation object based on the distance.

In the interferometric vibration observation device, the transmitting means may output an FMCW (Frequency Modulated Continuous Wave) signal for detecting the observation object or a distance on the observation object, and the receiving means may analyze the FMCW signal of the reception signals in phase-synchronization with the reference signal to separate the certain site of the observation object based on the distance.

In the interferometric vibration observation device, the plurality of receiving antennas may have either a linear one-dimensional arrangement or a two-dimensional arrangement such as a T-shaped arrangement or an L-shaped arrangement, and the receiving means or the signal processing means may identify a direction of the observation object from a phase difference of the reception signals.

In the interferometric vibration observation device, the plurality of receiving antennas may have a two-dimensional arrangement such as a T-shaped arrangement or an L-shaped arrangement, and the receiving means or the signal processing means may calculate one or both of an azimuth and an elevation angle of the observation object.

An aspect of a recording medium provides a computer-readable recording medium recording a vibration observation program for driving a computer to observe a vibration or a displacement of an observation object, and the computer may be driven to execute the processes of transmitting a transmission signal from a transmitting antenna toward an observation object; receiving a reflection wave from the observation object with a plurality of receiving antennas and generating a reception signal for each of the receiving antennas; and obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of a vibration of the observation object or a certain site of the observation object.

In the recording medium, the computer may further be driven to execute the process of generating an image from the observation signal and superimposing an image representative of a vibration distribution in the observation object on an image of the whole of the observation object.

An aspect of a vibration observation method may include transmitting a transmission signal from a transmitting antenna toward an observation object; receiving a reflection wave from the observation object with a plurality of receiving antennas and generating a reception signal for each of the receiving antennas; and obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of a vibration of the observation object or a certain site of the observation object.

The vibration observation method may further include generating an image from the observation signal and superimposing an image representative of a vibration distribution in the observation object on an image of the whole of the observation object.

An aspect of an interferometric vibration observation device may include a processing means mounted on a vibrating or shaking platform, the processing means generating an image from observation data representative of a vibration of an observation object or a certain site of the observation object, determining a fixed point from the image, calculating a vibration of the platform from vibration analysis of the fixed point, and removing the vibration from the observation data.

The interferometric vibration observation device may include a transmitting means transmitting a transmission signal toward an observation object from a transmitting antenna mounted on a vibrating or shaking platform, and a receiving means receiving a reflection wave from the observation object with a plurality of receiving antennas mounted on the platform and generating a reception signal for each of the receiving antennas, and the processing means may include a first processing means obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of a vibration of the observation object or a certain site of the observation object, and a second processing means determining a fixed point from the image acquired by the first processing means, calculating a vibration or a shaking of the platform from vibration analysis of the fixed point, and removing the vibration from the observation data.

The interferometric vibration observation device may further include an image displaying means displaying an image representative of the observation object; the interferometric vibration observation device may display the image on the image displaying means; remove the vibration and shaking of the platform from the observation data to correct the image; superimpose an image representative of a vibration distribution in the observation object on an image of the whole of the observation object, and display the image representative of the vibration distribution on the image displaying means.

The interferometric vibration observation device may further include a signal generating means generating a reference signal synchronizing the transmission signal of the transmitting means, the reception signals of the receiving means, and a signal process of the first processing means in the first processing means or outside the first processing means.

In the interferometric vibration observation device, the transmitting means may output a pulse signal for detecting the observation object or a distance on the observation object, or a pulse signal chirp-modulated for pulse compression, and the receiving means may perform the pulse compression of the reception signals in phase-synchronization with the reference signal to separate the certain site of the observation object based on the distance.

In the interferometric vibration observation device, the transmitting means may output an FMCW signal for detecting the observation object or a distance on the observation object, and the receiving means may analyze the FMCW signal of the reception signals in phase-synchronization with the reference signal to separate the certain site of the observation object based on the distance.

In the interferometric vibration observation device, the plurality of receiving antennas may have either a linear one-dimensional arrangement or a two-dimensional arrangement such as a T-shaped arrangement or an L-shaped arrangement, and the receiving means or the first processing means may identify a direction of the observation object from a phase difference of the reception signals.

In the interferometric vibration observation device, the plurality of receiving antennas may have a two-dimensional arrangement such as a T-shaped arrangement or an L-shaped arrangement, and the receiving means or the first processing means may calculate one or both of an azimuth and an elevation angle of the observation object.

An aspect of a recording medium provides a computer-readable recording medium recording a vibration observation program for driving a computer to observe a vibration or a displacement of an observation object, and the computer may be driven to execute the processes of transmitting a transmission signal toward an observation object from a transmitting antenna mounted on a vibrating or shaking platform; receiving a reflection wave from the observation object with a plurality of receiving antennas mounted on the platform and generating a reception signal for each of the receiving antennas; obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of a vibration of the observation object or a certain site of the observation object; determining a fixed point from the image acquired from the observation data; and calculating a vibration of the platform from vibration analysis of the fixed point, and removing the vibration from the observation data.

In the recording medium, the computer may further be driven to execute the process of generating an image from the observation data from which the vibration of the platform is removed, and superimposing an image representative of a vibration distribution in the observation object on an image of the whole of the observation object.

An aspect of a vibration observation method may include transmitting a transmission signal toward an observation object from a transmitting antenna mounted on a vibrating or shaking platform; receiving a reflection wave from the observation object with a plurality of receiving antennas mounted on the platform and generating a reception signal for each of the receiving antennas; obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of a vibration of the observation object or a certain site of the observation object; determining a fixed point from the image acquired from the observation data; and calculating a vibration of the platform from vibration analysis of the fixed point, and removing the vibration from the observation data.

The vibration observation method may further include removing the vibration and shaking of the platform from the observation data to correct the image, and superimposing an image representative of a vibration distribution in the observation object on an image of the whole of the observation object.

An aspect of a vibration observation system may include a vibrating or shaking platform; and a vibration observation device mounted on the platform, the vibration observation device generating an image by acquiring observation data representative of a vibration and a shaking of an observation object or a certain site of the observation object, determining a fixed point from the image, calculating a vibration and a shaking of the platform from vibration analysis of the fixed point, and removing the vibration from the observation data.

The interferometric vibration observation devices, the recording mediums, the vibration observation methods, or the vibration observation systems of the embodiments produce any of the following effects.

(1) A vibrating point and vibrating characteristics of an observation object can be observed by using a plurality of reception signals acquired from the observation object without disposing a reflector on a two- or three-dimensionally spreading observation object. A vibrating condition of the whole of, or a portion such as a certain site of, a large structure can be comprehended, and the maintenance management of the structure can quickly and accurately be provided based on this vibrating condition. It can be determined from an observation signal whether a vibration factor exists on the structure side and whether an external factor such as traffic and wind exists in the case of a structure such as a bridge and an elevated road.

(2) Since a radiation beam such as a transmission wave from a transmitting antenna is applied to the whole of the observation object without scanning and a reflection wave from the observation object or a certain site is received by a plurality of receiving antennas for digital beam forming of a receiving-unit output signal acquired for each receiving antenna, an image representative of the observation object can be realized with high resolution, and the vibration measurement can be imaged at constant time intervals. As a result, vibration observation and displacement observation can be performed with high accuracy.

(3) Vibration characteristics of one or two or more observation points of the observation object can be obtained from frequency conversion and analysis of the reflection waves collected in time series from the identified observation positions, so that the observation accuracy can be improved.

(4) The vibration and displacement of the observation object can be measured in conjunction with movement, such as flying, of a platform made up of a mobile object such as a helicopter and a balloon by avoiding the influence of a vibration and a shaking of the platform. For example, even in the case of an object such as a mountainous region and an insular part where it is difficult to install a vibration measurement device, the vibration and displacement can easily be observed on the sea or from the sky. Moreover, the observation point can be changed in a short time. Also, the vibration and displacement of the observation object can be quickly and elaborately observed.

(5) By obtaining the vibration and displacement of the platform through an arithmetic operation from a fixed point on an image acquired from observation data and removing the vibration and displacement from the observation data, the vibration and displacement of the observation object can be observed with high accuracy.

Most preferable embodiments etc. of the observation device for vibration or displacement have been described above. The present invention is not limited to the description. Those skilled in the art can make various modifications and alterations based on the spirit of the present invention described in claims or disclosed in modes for carrying out the invention. It is needless to say that these modifications and alterations fall within the scope of the present invention.

As described above, according to the present invention, a mobile object such as a helicopter and a balloon accompanied by vibrations can be used as a platform, and an interferometric vibration observation device can be mounted on the platform to perform vibration observation of an observation object. This vibration observation enables the measurement of the vibrations generated not only by a certain portion of the observation object but also by the whole observation object due to a cause such as traffic or weather without attaching a reflector of radar waves to the observation object in a completely contactless manner, and can effectively and efficiently be utilized for maintenance measures of public facilities such as a large bridge and an elevated road having the risk of aging.

The invention claimed is:

1. An interferometric vibration observation device comprising:
   a transmitting means transmitting a transmission signal from a transmitting antenna toward an observation object;
   a receiving means receiving a reflection wave from the observation object with a plurality of receiving antennas and generating a reception signal for each of the receiving antennas;
   a signal processing means obtaining a phase plane of the reflection wave to an antenna plane from a phase difference between the reception signals, identifying an arrival direction and a signal strength of the reflection wave, calculating a phase variation of the reflection wave from a certain direction, and generating an observation signal representative of displacement of the observation object or a certain site of the observation object; and
   a signal generating means generating a reference signal, wherein
   the signal generating means provides the reference signal to the transmitting means and the signal processing means, and
   the transmitting means generates the transmission signal using the reference signal, and the signal processing means identifies the arrival direction of the reflection wave using the reference signal as an input to synchronize the transmission signal of the transmitting means and the signal process of the signal processing means.

2. The interferometric vibration observation device according to claim 1, further comprising
   an image displaying means displaying an image representative of the observation object from the observation signal, wherein
   the interferometric vibration observation device generates the image from the observation signal, superimposes an image representative of the displacement in the observation object on an image of the whole of the observation object and displays the image representative of the displacement on the image displaying means.

3. The interferometric vibration observation device according to claim 1, wherein
   the transmitting means outputs a pulse signal for detecting the observation object or a distance on the observation object, or a pulse signal chirp-modulated for pulse compression, and wherein
   the receiving means performs the pulse compression of the reception signals in phase-synchronization with a reference signal to separate the certain site of the observation object based on the distance.

4. The interferometric vibration observation device according to claim 1, wherein
   the transmitting means outputs an FMCW signal for detecting the observation object or a distance on the observation object, and wherein
   the receiving means analyzes the FMCW signal of the reception signals in phase-synchronization with a reference signal to separate the certain site of the observation object based on the distance.

5. The interferometric vibration observation device according to claim 1, wherein
the plurality of receiving antennas has a two-dimensional arrangement such as a T-shaped arrangement or an L-shaped arrangement, and wherein
the receiving means or the signal processing means calculates one or both of an azimuth and an elevation angle of the observation object.

6. A non-transitory computer-readable recording medium recording a vibration observation program for driving a computer to observe displacement of an observation object, the medium recording the vibration observation program for driving the computer to execute the processes of:
generating a reference signal to synchronize a transmission signal and a signal process;
generating the transmission signal using the reference signal, and transmitting the transmission signal from a transmitting antenna toward an observation object;
receiving a reflection wave from the observation object with a plurality of receiving antennas and generating a reception signal for each of the receiving antennas; and
obtaining a phase plane of the reflection wave to an antenna plane from a phase difference between the reception signals, identifying an arrival direction and a signal strength of the reflection wave by identifying the arrival direction of the reflection wave using the reference signal as an input, calculating a phase variation of the reflection wave from a certain direction, and generating an observation signal representative of displacement of the observation object or a certain site of the observation object.

7. The non-transitory computer-readable recording medium according to claim 6, recording the vibration observation program for further driving the computer to execute the process of generating an image from the observation signal and superimposing an image representative of the displacement in the observation object on an image of the whole of the observation object.

8. A vibration observation method comprising:
generating a reference signal to synchronize a transmission signal and a signal process;
generating the transmission signal using the reference signal, and transmitting the transmission signal from a transmitting antenna toward an observation object;
receiving a reflection wave from the observation object with a plurality of receiving antennas and generating a reception signal for each of the receiving antennas; and
obtaining a phase plane of the reflection wave to an antenna plane from a phase difference between the reception signals, identifying an arrival direction and a signal strength of the reflection wave by identifying the arrival direction of the reflection wave using the reference signal as an input, calculating a phase variation of the reflection wave from a certain direction, and generating an observation signal representative of displacement of the observation object or a certain site of the observation object.

9. The vibration observation method according to claim 8, further comprising
generating an image from the observation signal and superimposing an image representative of the displacement in the observation object on an image of the whole of the observation object.

10. An interferometric vibration observation device comprising: a processing means mounted on a vibrating or shaking platform, the processing means generating an image from observation data representative of displacement of an observation object or a certain site of the observation object, determining a fixed point from the image, calculating a vibration of the platform from vibration analysis of the fixed point, and removing the vibration from the observation data.

11. The interferometric vibration observation device according to claim 10, comprising
a transmitting means transmitting a transmission signal toward an observation object from a transmitting antenna mounted on a vibrating or shaking platform, and
a receiving means receiving a reflection wave from the observation object with a plurality of receiving antennas mounted on the platform and generating a reception signal for each of the receiving antennas, wherein
the processing means includes
a first processing means obtaining a phase plane of the reflection wave to an antenna plane from a phase difference between the reception signals, identifying an arrival direction and a signal strength of the reflection wave, calculating a phase variation of the reflection wave from a certain direction, and generating the observation data representative of the displacement of the observation object or the certain site of the observation object, and
a second processing means determining a fixed point from the image acquired by the first processing means, calculating a vibration of the platform from vibration analysis of the fixed point, and removing the vibration from the observation data.

12. The interferometric vibration observation device according to claim 11, further comprising
a signal generating means generating a reference signal, wherein
the signal generating means is in the first processing means or outside of the first processing means, and provides the reference signal to the transmitting means and the receiving means, or the transmitting means, the receiving means and the first processing means, and wherein
the transmitting means generates the transmission signal using the reference signal, the receiving means processes the reception signals at a timing synchronized with the reference signal, and the first processing means identifies the arrival direction of the reflection wave using the reference signal as an input to synchronize the transmission signal of the transmitting means, the reception signals of the receiving means, and the signal process of the first processing means.

13. The interferometric vibration observation device according to claim 11, wherein
the transmitting means outputs a pulse signal for detecting the observation object or a distance on the observation object, or a pulse signal chirp-modulated for pulse compression, and wherein
the receiving means performs the pulse compression of the reception signals in phase-synchronization with a reference signal to separate the certain site of the observation object based on the distance.

14. The interferometric vibration observation device according to claim 11, wherein
the transmitting means outputs an FMCW signal for detecting the observation object or a distance on the observation object, and wherein
the receiving means analyzes the FMCW signal of the reception signals in phase-synchronization with a reference signal to separate the certain site of the observation object based on the distance.

15. The interferometric vibration observation device according to claim 10, further comprising
an image displaying means displaying an image representative of the observation object, wherein
the interferometric vibration observation device displays the image on the image displaying means, removes the vibration of the platform from the observation data to correct the image, superimposes an image representative of the displacement in the observation object on an image of the whole of the observation object, and displays the image representative of the displacement on the image displaying means.

16. A non-transitory computer-readable recording medium recording a vibration observation program for driving a computer to observe displacement of an observation object, the vibration observation program for driving the computer to execute the processes of:
transmitting a transmission signal toward an observation object from a transmitting antenna mounted on a vibrating or shaking platform;
receiving a reflection wave from the observation object with a plurality of receiving antennas mounted on the platform and generating a reception signal for each of the receiving antennas;
obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of displacement of the observation object or a certain site of the observation object;
determining a fixed point from the image acquired from the observation data; and
calculating a vibration of the platform from vibration analysis of the fixed point, and removing the vibration from the observation data.

17. The non-transitory computer-readable recording medium according to claim 16, the vibration observation program for further driving the computer to execute the process of
generating an image from the observation data from which the vibration of the platform is removed, and superimposing an image representative of the displacement in the observation object on an image of the whole of the observation object.

18. A vibration observation method comprising:
transmitting a transmission signal toward an observation object from a transmitting antenna mounted on a vibrating or shaking platform;
receiving a reflection wave from the observation object with a plurality of receiving antennas mounted on the platform and generating a reception signal for each of the receiving antennas;
obtaining a phase plane of the reflection wave to an antenna plane from a phase difference between the reception signals, identifying an arrival direction and a signal strength of the reflection wave, calculating a phase variation of the reflection wave from a certain direction, and generating observation data representative of displacement of the observation object or a certain site of the observation object;
determining a fixed point from the image acquired from the observation data; and
calculating a vibration of the platform from vibration analysis of the fixed point, and removing the vibration from the observation data.

19. The vibration observation method according to claim 18, further comprising
removing the vibration of the platform from the observation data to correct the image, and superimposing an image representative of the displacement in the observation object on an image of the whole of the observation object.

20. A vibration observation system comprising:
a vibrating or shaking platform; and
a vibration observation device mounted on the platform, the vibration observation device generating an image from observation data representative of displacement of an observation object or a certain site of the observation object, determining a fixed point from the image, calculating a vibration of the platform from vibration analysis of the fixed point, and removing the vibration from the observation data.

* * * * *

UNITED STATES PATENT AND TRADEMARK OFFICE
CERTIFICATE OF CORRECTION

PATENT NO. : 10,989,589 B2
APPLICATION NO. : 16/897431
DATED : April 27, 2021
INVENTOR(S) : Hitoshi Nohmi It is certified that error appears in the above-identified patent and that said Letters Patent is hereby corrected as shown below:

In the Specification

Column 22 Lines 1-5 Change:

[Math. 13]

$$f_T(t) = \cos 2\pi\left(\frac{k}{2}t^2 + F_C t\right) \quad -\frac{PRT}{2} \leq t < \frac{PRT}{2} \quad (14)$$

To be:

[Math. 13]

$$f_T(t) = \cos 2\pi(\frac{k}{2}t^2 + F_C t) \quad -\frac{PRT}{2} \leq t < \frac{PRT}{2} \quad \cdots \cdots (14)$$

Column 22 Lines 40-44 Change:

[Math. 15]

$$f_R(t) = \cos 2\pi\left(k\left(\frac{R_T + R_R + 2 \cdot \Delta L \cos \omega_0 t}{C}\right)t - F_C\left(\frac{R_T + R_R + 2 \cdot \Delta L \cos \omega_0 t}{C}\right)\right) \quad (16)$$

Signed and Sealed this
Sixth Day of July, 2021

Drew Hirshfeld
*Performing the Functions and Duties of the
Under Secretary of Commerce for Intellectual Property and
Director of the United States Patent and Trademark Office*

To be:
[Math. 15]

$$f_B(t) = \cos 2\pi(k(\frac{R_T + R_R + 2 \cdot \Delta L \cos \omega_0 t}{c})t - F_C(\frac{R_T + R_R + 2 \cdot \Delta L \cos \omega_0 t}{c})) \cdots (16)$$